(12) United States Patent  
Lei et al.

(10) Patent No.: US 12,402,000 B2  
(45) Date of Patent: Aug. 26, 2025

(54) IDENTITY AUTHENTICATION METHOD AND COMMUNICATIONS APPARATUS

(71) Applicant: Huawei Technologies Co., Ltd., Shenzhen (CN)

(72) Inventors: Zhongding Lei, Singapore (SG); Xin Kang, Singapore (SG); Haiguang Wang, Singapore (SG); Bo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 570 days.

(21) Appl. No.: 17/736,750

(22) Filed: May 4, 2022

(65) Prior Publication Data

US 2022/0272533 A1     Aug. 25, 2022

Related U.S. Application Data

(63) Continuation of application No. PCT/CN2019/115441, filed on Nov. 4, 2019.

(51) Int. Cl.
*H04W 12/06*          (2021.01)

(52) U.S. Cl.
CPC .................................. *H04W 12/06* (2013.01)

(58) Field of Classification Search
CPC ....... H04W 12/06; H04W 4/40; H04W 12/50; H04W 12/08
See application file for complete search history.

(56) References Cited

U.S. PATENT DOCUMENTS

2018/0068567 A1 * 3/2018 Gong .................... B64C 39/024
2018/0090013 A1    3/2018 Park et al.

(Continued)

FOREIGN PATENT DOCUMENTS

CN     101521660 A     9/2009
CN     108702356 A     10/2018
(Continued)

OTHER PUBLICATIONS

"3rd Generation Partnership Project; Technical Specification Group Services and System Aspects; Remote Identification of Unmanned Aerial Systems; Stage 1 (Release 16)," 3GPP Draft; S1-182355, 3GPP TR 22.8de V1.0.0, XP051534832, Total 23 pages, 3rd Generation Partnership Project, Valbonne, France (May 2018).

(Continued)

*Primary Examiner* — Rafael Perez-Gutierrez
*Assistant Examiner* — Gilbert M. Grant
(74) *Attorney, Agent, or Firm* — Leydig, Voit & Mayer, Ltd.

(57) ABSTRACT

Embodiments of the present disclosure disclose an identity authentication method, including: A first network device receives first authentication indication information from a first terminal device, wherein the first request carries first authentication indication information and a unmanned aerial system (UAS) identifier of the first terminal device, and sends the UAS identifier of the first terminal device to a second network device. The second network device performs UAS authentication on the first terminal device based on the UAS identifier, and sends a UAS authentication result of the first terminal device to the first network device. By implementing embodiments of this application, a terminal device manufactured by an unmanned aerial system device vendor that has not signed with an operator of a mobile communications network can be prevented from using the mobile communications network.

17 Claims, 30 Drawing Sheets

(56) References Cited

U.S. PATENT DOCUMENTS

| | | | |
|---|---|---|---|
| 2018/0253092 A1* | 9/2018 | Trapero Esteban | G05D 1/0022 |
| 2018/0281946 A1 | 10/2018 | Obaidi | |
| 2020/0260242 A1* | 8/2020 | Hong | G08G 5/0013 |
| 2021/0076202 A1* | 3/2021 | Park | H04W 76/11 |

FOREIGN PATENT DOCUMENTS

| | | |
|---|---|---|
| CN | 109511115 A | 3/2019 |
| WO | 2019028746 A1 | 2/2019 |
| WO | 2019047066 A1 | 3/2019 |
| WO | 2019052227 A1 | 3/2019 |
| WO | 2019056971 A1 | 3/2019 |
| WO | 2021041143 A1 | 3/2021 |

OTHER PUBLICATIONS

"3rd Generation Partnership Project; Technical Specification Group Services and System Aspects; Unmanned Aerial System support in 3GPP; Stage 1; Release 16," 3GPP TS 22.125 V1.0.0, pp. 1-9, 3rd Generation Partnership Project, Valbonne, France (Dec. 2018).

"3rd Generation Partnership Project; Technical Specification Group Services and System Aspects; Unmanned Aerial System (UAS) support in 3GPP; Stage 1; Release 17," 3GPP TS 22.125 V17.0.0, pp. 1-12, 3rd Generation Partnership Project, Valbonne, France (Sep. 2019).

"3rd Generation Partnership Project; Technical Specification Group Services and System Aspects; Remote Identification of Unmanned Aerial Systems; Stage 1 (Release 16)," 3GPP TR 22.825 V16.0.0, pp. 1-22, 3rd Generation Partnership Project, Valbonne, France (Sep. 2018).

"3rd Generation Partnership Project; Technical Specification Group Services and System Aspects; Procedures for the 5G System (5GS); Stage 2 (Release 16)," 3GPP TS 23.502 V16.2.0, pp. 1-525, 3rd Generation Partnership Project, Valbonne, France (Sep. 2019).

"3rd Generation Partnership Project; Technical Specification Group Core Network and Terminals; Mobile radio Interface signalling layer 3; General aspects (Release 16)," 3GPP TS 24.007 V16.1.0, pp. 1-155, 3rd Generation Partnership Project, Valbonne, France (Jun. 2019).

"3rd Generation Partnership Project; Technical Specification Group Core Network and Terminals; Non-Access-Stratum (NAS) protocol for 5G System (5GS); Stage 3 (Release 15)," 3GPP TS 24.501 V16.2.0, pp. 1-609, 3rd Generation Partnership Project, Valbonne, France (Sep. 2019).

"Study on supporting Unmanned Aerial Systems Connectivity, Identification, and Tracking," TSG SA Meeting #SP-82, Sorrento, Italy, SP-181114 (S2-1813341), Total 3 pages, 3rd Generation Partnership Project, Valbonne, France (Dec. 12-14, 2018).

* cited by examiner

CONT. FROM FIG. 4A

CONT. FROM FIG. 4A

CONT. FROM FIG. 4A

407: Determine whether to perform UAS authentication on the first terminal device Manner 1: Determine, based on a UAS authentication status identifier of the first terminal device, whether to perform UAS authentication on the first terminal device Manner 2: Determine, based on received UAS type information, whether to perform UAS authentication on the first terminal device Manner 3: Determine, based on the UAS identifier of the first terminal device and an SUPI or a GPSI of the first terminal device, whether to perform UAS authentication on the first terminal device Manner 4: Determine whether the first terminal device exists in a list of devices for which UAS authentication is allowed Manner 5: Determine whether the first terminal device exists in a list of devices for which UAS authentication is not allowed 408: The second network device performs UAS authentication on the first terminal device based on the UAS identifier of the first terminal device 409: Send a UAS authentication result of the first terminal device 410: Send the UAS authentication result of the first terminal device

FIG. 4B

IDENTITY AUTHENTICATION METHOD AND COMMUNICATIONS APPARATUS

CROSS-REFERENCE TO RELATED APPLICATIONS

This application is a continuation of International Application No. PCT/CN2019/115441, filed on Nov. 4, 2019, the disclosure of which is hereby incorporated by reference in its entirety.

TECHNICAL FIELD

The present disclosure relates to the communications field, and in particular, to an identity authentication method and a communications apparatus.

BACKGROUND

An unmanned aerial system (UAS) generally includes two devices, namely, an unmanned aerial vehicle (UAV) and a UAV controller. The unmanned aerial vehicle can fly autonomously or by receiving and following an instruction from the UAV controller. In addition, data may be transmitted between the unmanned aerial vehicle and the UAV controller. For example, the unmanned aerial vehicle sends a photo and a video to the UAV controller (including data receiving and storage functions) through aerial photography. Communication (control and data transmission) between the UAV controller and the unmanned aerial vehicle is usually performed through a point-to-point direct connection between wireless signals (such as Wi-Fi).

Recently, an idea of using a mobile communications network to implement communication between the unmanned aerial vehicle and the UAV controller has attracted widespread attention. The mobile communications network has many commercial advantages: wide area coverage, high reliability, high-speed mobility, and the like. By using a network connection, the unmanned aerial system can fly beyond visual line of sight with high-reliability. In addition, the mobile communications network also provides regulatory authorities with a more reliable supervision method, to prevent the unmanned aerial vehicle from interfering with aircraft flight operations, launching terrorist attacks, and the like. This ensures security of the unmanned aerial system and public security. However, after the unmanned aerial system is introduced into the mobile communications network, how to improve security of accessing and using the mobile communications network by a device in the unmanned aerial system is an urgent problem to be resolved currently.

SUMMARY

Embodiments of the present disclosure provide an identity authentication method and an apparatus, so that UAS authentication can be performed on a device in an unmanned aerial system in a mobile communications network. This improves security of accessing and using the mobile communications network by the device in the unmanned aerial system.

According to a first aspect, an embodiment of this application provides an identity authentication method. The method includes: A first network device receives a first request sent by a first terminal device, where the first request carries first authentication indication information, the first authentication indication information is used to request to perform unmanned aerial system UAS authentication on the first terminal device, and the first terminal device is a device in a UAS. The first network device sends a second request to the first terminal device, where the second request is used to request to obtain a UAS identifier of the first terminal device. The first network device receives the UAS identifier of the first terminal device that is sent by the first terminal device, and sends the UAS identifier of the first terminal device to a second network device. The second network device performs UAS authentication on the first terminal device based on the UAS identifier. The second network device sends a UAS authentication result of the first terminal device to the first network device. The first network device sends the UAS authentication result of the first terminal device to the first terminal device.

It can be learned that, in the method described in the first aspect, authentication can be performed on the first terminal device based on the UAS identifier of the first terminal device. The UAS identifier of the first terminal device is an identifier configured by a device vendor for the first terminal device, or the UAS identifier of the first terminal device is an unmanned aerial system user/unmanned aerial system service identifier provided by a UAS service provider/vertical industry for an unmanned aerial system user or a UAS unmanned aerial system service/unmanned aerial system business that uses the UAS system. Therefore, based on the method described in the first aspect, a terminal device manufactured by a device vendor that has not signed with an operator can be prevented from using a mobile communications network, or an unmanned aerial system user/unmanned aerial system service/unmanned aerial system business of a service provider or a vertical industry that has not signed with an operator can be prevented from using an unmanned aerial vehicle (or a UAV controller) to access a mobile communications network. This improves security of the mobile communications network.

In an embodiment, the first authentication indication information is registration type information or UAS type information of the first terminal device, and the UAS type information indicates a device type, a business type, or a service type of the first terminal device in the UAS. The registration type information is used to request to perform UAS authentication on the first terminal device, so that a new type of information does not need to be added to request to perform UAS authentication on the first terminal device, and changes to an existing communication procedure can be minimized. The UAS type information of the first terminal device is used as the first authentication indication information. In this way, the first network device can be notified of a UAS type of the first terminal device, and the first network device can be requested to perform UAS authentication. In other words, two objectives can be achieved by sending one type of information. This helps reduce signaling overheads.

In an embodiment, after the first network device receives the first request sent by the first terminal device, the method further includes: The first network device determines whether to perform UAS authentication on the first terminal device. That the first network device sends a second request to the first terminal device includes: When the first network device determines to perform UAS authentication on the first terminal device, the first network device sends the second request to the first terminal device. Based on this possible implementation, a terminal device that does not meet a UAS authentication requirement may be first screened out, and UAS authentication is performed only on a terminal device that meets the UAS authentication requirement. This helps reduce an authentication workload of the second network device.

In an embodiment, a specific implementation in which the first network device determines whether to perform UAS authentication on the first terminal device is: The first network device determines, based on a UAS authentication status identifier of the first terminal device, whether to perform UAS authentication on the first terminal device. For example, when a UAS authentication status indicated by the UAS authentication status identifier of the first terminal device is authentication to be performed, the first network device determines to perform UAS authentication on the first terminal device. When the UAS authentication status indicated by the UAS authentication status identifier of the first terminal device is authentication successful or authentication failed, the first network device determines not to perform UAS authentication on the first terminal device. Based on this possible implementation, an authentication workload of the second network device is reduced.

In an embodiment, the first request carries the UAS type information of the first terminal device, and the UAS type information indicates the device type, the business type, or the service type of the first terminal device in the UAS. A specific implementation in which the first network device determines whether to perform UAS authentication on the first terminal device is: The first network device determines, based on the received UAS type information, whether to perform UAS authentication on the first terminal device.

For example, when the UAS type information received by the first network device is consistent with UAS type information corresponding to an SUPI or a GPSI of the first terminal device, the first network device determines to perform UAS authentication on the first terminal device. When the UAS type information received by the first network device is inconsistent with the UAS type information corresponding to the SUPI or the GPSI of the first terminal device, the first network device determines not to perform UAS authentication on the first terminal device. The UAS type information corresponding to the SUPI or the GPSI of the first terminal device may be understood as a UAS type supported by a smart card in the first terminal device. If the first network device determines that the UAS type information received by the first network device does not match the UAS type information corresponding to the SUPI or the GPSI of the first terminal device, it indicates that the smart card (for example, a SIM card) in the first terminal device is incorrectly used or stolen on the first terminal device. Therefore, if the first network device determines that the UAS type information received by the first network device is inconsistent with the UAS type information corresponding to the SUPI or the GPSI of the first terminal device, the first network device may not continue to perform a subsequent UAS authentication procedure. In this way, the first terminal device can be prevented from using a mobile communications network when the first terminal device incorrectly uses a smart card or uses a stolen smart card.

For another example, when the UAS type information received by the first network device is inconsistent with the UAS type information corresponding to the SUPI or the GPSI of the first terminal device, the first network device determines to perform UAS authentication on the first terminal device. When the UAS type information received by the first network device is consistent with the UAS type information corresponding to the SUPI or the GPSI of the first terminal device, the first network device determines not to perform UAS authentication on the first terminal device. The UAS type information corresponding to the SUPI or the GPSI may be understood as UAS type information that is not supported by a smart card corresponding to the SUPI or the GPSI.

In an embodiment, after the second network device receives the UAS identifier sent by the first network device, the second network device determines whether to perform UAS authentication on the first terminal device. A specific implementation in which the second network device performs UAS authentication on the first terminal device is: When the second network device determines to perform UAS authentication on the first terminal device, the second network device performs UAS authentication on the first terminal device based on the UAS identifier. Based on this possible implementation, authentication workloads of the first network device and the second network device are reduced.

In an embodiment, a specific implementation in which the second network device determines whether to perform UAS authentication on the first terminal device is: The second network device determines, based on the UAS authentication status identifier of the first terminal device, whether to perform UAS authentication on the first terminal device. For specific implementations and beneficial effects of this possible implementation, refer to the specific implementations and beneficial effects of the implementation in which the first network device determines, based on the UAS authentication status identifier of the first terminal device, whether to perform UAS authentication on the first terminal device. Details are not described herein again.

In an embodiment, the first request carries the UAS type information of the first terminal device, and the UAS type information indicates the device type, the business type, or the service type of the first terminal device in the UAS. The first network device may further send the UAS type information of the first terminal device to the second network device. A specific implementation in which the second network device determines whether to perform UAS authentication on the first terminal device is: The second network device determines, based on the received UAS type information, whether to perform UAS authentication on the first terminal device. For specific implementations and beneficial effects of this possible implementation, refer to the specific implementations and beneficial effects of the implementation in which the first network device determines, based on the UAS type information, whether to perform UAS authentication on the first terminal device. Details are not described herein again.

In an embodiment, the second request is further used to request to obtain the UAS type information of the first terminal device, and the UAS type information indicates the device type, the business type, or the service type of the first terminal device in the UAS. After the first network device sends the second request to the first terminal device, the first network device may further receive the UAS type information of the first terminal device that is sent by the first terminal device. The first network device sends the UAS type information of the first terminal device to the second network device. A specific implementation in which the second network device determines whether to perform UAS authentication on the first terminal device is: The second network device determines, based on the received UAS type information, whether to perform UAS authentication on the first terminal device. For specific implementations and beneficial effects of this possible implementation, refer to the specific implementations and beneficial effects of the implementation in which the first network device determines, based on the UAS type information, whether to perform UAS authentication on the first terminal device. Details are not described herein again.

In an embodiment, the first request further carries a subscription concealed identifier (SUCI) or a globally unique temporary UE identity (GUTI) of the first terminal device. The first network device may further send a subscriber permanent identifier (SUPI) or a GPSI of the first terminal device to the second network device, where the SUPI or the GPSI of the first terminal device is obtained based on the SUCI or the GUTI of the first terminal device. A specific implementation in which the second network device determines whether to perform UAS authentication on the first terminal device is: The second network device determines, based on the UAS identifier and the SUPI or the GPSI of the first terminal device, whether to perform UAS authentication on the first terminal device. Based on this possible implementation, random replacement of the smart card in the first terminal device can be prevented.

In an embodiment, the first network device and the second network device may further update the UAS authentication status identifier of the first terminal device based on the UAS authentication result. In this way, the UAS authentication status of the first terminal device can be found subsequently.

In an embodiment, after the second network device receives the UAS identifier of the first terminal device, the method further includes the following steps: The second network device determines a UAS identifier of a second terminal device associated with the first terminal device. The second network device performs UAS authentication on the second terminal device based on the UAS identifier of the second terminal device. The second network device sends a UAS authentication result of the second terminal device to the first network device. The first network device sends the UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The first network device sends the UAS authentication result of the second terminal device and the UAS authentication result of the first terminal device to the second terminal device, or sends the UAS authentication result of the second terminal device and the association indication information to the second terminal device. Based on this possible implementation, UAS authentication can be performed on the first terminal device and the second terminal device, and authentication can be performed on a stored association relationship between the first terminal device and the second terminal device.

In an embodiment, after determining the UAS identifier of the second terminal device associated with the first terminal device, the second network device determines whether to allow UAS authentication on the first terminal device and the second terminal device. If the second network device allows UAS authentication on the first terminal device and the second terminal device, the second network device performs UAS authentication on the first terminal device based on the UAS identifier of the first terminal device, and performs UAS authentication on the second terminal device based on the UAS identifier of the second terminal device. Optionally, if the second network device determines not to allow UAS authentication for the first terminal device and the second terminal device, the second network device sends indication information to the first network device, where the indication information indicates that the first terminal device fails to be associated with the second terminal device. The first network device sends the indication information to the first terminal device and the second terminal device. Based on this possible implementation, an authentication workload of the second network device is reduced.

In an embodiment, the second network device may specifically determine, based on locations of the first terminal device and the second terminal device and a distance between the first terminal device and the second terminal device, whether to allow UAS authentication on the first terminal device and the second terminal device. The distance between the first terminal device and the second terminal device may be used as a limitation condition, so that pairing between the first terminal device and the second terminal device that do not meet the distance limitation condition is denied. Therefore, authentication does not need to be performed on the association relationship between the first terminal device and the second terminal device. Based on this possible implementation, security is improved, and an authentication workload of the second network device is reduced.

In an embodiment, after the second network device receives the UAS identifier of the first terminal device, the method further includes the following steps: The second network device determines a UAS identifier, an SUPI, or a GPSI of a second terminal device associated with the first terminal device. The second network device sends, to the first network device, the UAS identifier, the SUPI, or the GPSI of the second terminal device associated with the first terminal device. After receiving the UAS identifier, the SUPI, or the GPSI of the second terminal device, the first network device sends the UAS identifier of the second terminal device to the second network device. The second network device performs UAS authentication on the second terminal device based on the UAS identifier of the second terminal device. The second network device sends a UAS authentication result of the second terminal device to the first network device. After receiving the UAS authentication result of the second terminal device, the first network device sends the UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The first network device sends the UAS authentication result of the second terminal device and the UAS authentication result of the first terminal device or the association indication information to the second terminal device. Based on this possible implementation, UAS authentication can be performed on the first terminal device and the second terminal device, and authentication can be performed on a stored association relationship between the first terminal device and the second terminal device.

In an embodiment, after receiving the UAS identifier, the SUPI, or the GPSI of the second terminal device associated with the first terminal device, the first network device determines whether to perform UAS authentication on the second terminal device. If yes, the first network device sends the UAS identifier of the second terminal device to the second network device. Optionally, if the first network device determines not to allow UAS authentication for the second terminal device, the first network device sends indication information to the first terminal device, where the indication information indicates that the first terminal device fails to be associated with the second terminal device. For example, the first network device may determine, based on whether the second terminal device is powered on, whether to perform UAS authentication on the second terminal device. For another example, the first network device may determine, based on locations of the first terminal device and the second terminal device and a distance between the first terminal device and the second terminal device, whether to perform UAS authentication on the second terminal device.

In an embodiment, the first request further carries newly-added-association indication information. A specific implementation in which the first network device sends the UAS identifier of the first terminal device to a second network device is: The first network device sends the UAS identifier of the first terminal device and the newly-added-association indication information to the second network device. After the second network device receives the UAS identifier of the first terminal device and the newly-added-association indication information, the method further includes the following steps: The second network device sends, to the first network device, a request used to obtain first association information of the first terminal device. The first network device sends, to the first terminal device, the request used to obtain the first association information of the first terminal device. The first network device receives the first association information of the first terminal device that is sent by the first terminal device. The first network device sends the first association information of the first terminal device to the second network device. The second network device determines that the first association information matches second association information. A specific implementation in which the second network device sends a UAS authentication result of the first terminal device to the first network device is: The second network device sends the UAS authentication result of the first terminal device and a UAS identifier, an SUPI, or a GPSI of a second terminal device to the first network device. After the first network device receives the UAS authentication result of the first terminal device and the UAS identifier, the SUPI, or the GPSI of the second terminal device, the first network device further sends a UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The first network device may further send the UAS authentication result of the first terminal device or association indication information to the second terminal device. Based on this possible implementation, UAS authentication can be performed on the first terminal device and the second terminal device, and authentication or authorization can be performed on a newly added association relationship between the first terminal device and the second terminal device.

In an embodiment, after receiving the first request, the first network device may determine whether to allow newly adding the association relationship with the first terminal device. If the first network device allows newly adding the association relationship with the first terminal device, the first network device sends the second request to the first terminal device. Optionally, if the first network device does not allow newly adding the association relationship with the first terminal device, the first network device sends, to the first terminal device, indication information indicating that the newly added association fails. Based on this possible implementation, an authentication workload of the second network device is reduced.

In an embodiment, after receiving the UAS identifier of the first terminal device and the newly-added-association indication information, the second network device may determine whether to allow newly adding the association relationship with the first terminal device. If the second network device allows newly adding the association relationship with the first terminal device, the second network device performs UAS authentication on the first terminal device based on the UAS identifier of the first terminal device. Optionally, if the second network device does not allow newly adding the association relationship with the first terminal device, the second network device sends, to the first network device, indication information indicating that the newly added association fails, and the first network device sends, to the first terminal device, the indication information indicating that the newly added association fails. Based on this possible implementation, an authentication workload of the second network device is reduced.

In an embodiment, after determining that the first association information matches the second association information, the second network device may further store the association relationship between the first terminal device and the second terminal device. Optionally, the second network device may further store the association relationship between the first terminal device and the second terminal device only when determining that both the UAS authentication result of the first terminal device and the UAS authentication result of the second terminal device indicate that the authentication succeeds. The association relationship between the first terminal device and the second terminal device is stored, so that when the first terminal device and the second terminal device need to be paired for use next time, the association relationship does not need to be re-established. This helps reduce a pairing time.

In an embodiment, the first request further carries newly-added-association indication information, where the newly-added-association indication information is used to request to newly add an association relationship. After the first network device receives the first request, the first network device may further perform the following steps: The first network device sends, to the first terminal device, a request used to obtain first association information of the first terminal device. The first network device receives the first association information sent by the first terminal device. The first network device determines that the first association information matches second association information sent by a second terminal device. The first network device sends a UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The first network device sends the UAS authentication result of the first terminal device or the association indication information to the second terminal device. Based on this possible implementation, UAS authentication can be performed on the first terminal device and the second terminal device, and authentication can be performed on the newly added association relationship between the first terminal device and the second terminal device.

In an embodiment, after receiving the first request, the first network device may determine whether to allow newly adding the association relationship with the first terminal device. If the first network device allows newly adding the association relationship with the first terminal device, the first network device sends the second request to the first terminal device. Optionally, if the first network device does not allow newly adding the association relationship with the first terminal device, the first network device sends, to the first terminal device, indication information indicating that the newly added association fails. Based on this possible implementation, an authentication workload of the second network device is reduced.

In an embodiment, after determining that the first association information matches the second association information, the first network device may further store the association relationship between the first terminal device and the second terminal device. Optionally, the first network device may further store the association relationship between the first terminal device and the second terminal device only when determining that both the UAS authentication result of the first terminal device and the UAS authentication result of the second terminal device indicate that the authentication succeeds. Optionally, the first network device may further send the association relationship to the second network device for storage. The association relationship between the first terminal device and the second terminal device is stored, so that when the first terminal device and the second terminal device need to be paired for use next time, the association relationship does not need to be re-established. This helps reduce a pairing time.

In an embodiment, after the UAS authentication on the first terminal device succeeds, the method further includes the following steps:

The first network device receives a first association request sent by the first terminal device, where the first association request is used to request to newly add an association relationship. The first network device sends the first association request to the second network device. The second network device sends a first obtaining request to the first network device. The first network device sends the first obtaining request to the first terminal device. The first network device receives first association information sent by the first terminal device. The first network device sends the first association information to the second network device. The first network device receives a second association request sent by a second terminal device, where the second association request is used to request to newly add an association relationship. The first network device sends the second association request to the second network device. The second network device sends a second obtaining request to the first network device. The first network device sends the second obtaining request to the second terminal device. The first network device receives second association information sent by the second terminal device. The first network device sends the second association information to the second network device. The second network device determines that the first association information matches the second association information. The second network device sends association success indication information to the first network device. The first network device sends the association success indication information to the first terminal device and the second terminal device. Based on this possible implementation, authentication or authorization can be performed on the newly added association relationship between the first terminal device and the second terminal device. This avoids pairing of any two devices, and improves security of the mobile communications network.

In an embodiment, after receiving the first association request, the second network device may further determine whether to allow newly adding the association relationship with the first terminal device. If the second network device determines to allow newly adding the association relationship with the first terminal device, the second network device sends the first association request to the first network device. After receiving the second association request, the second network device may further determine whether to allow newly adding the association relationship with the second terminal device. If the second network device determines to allow newly adding the association relationship with the second terminal device, the second network device sends the second association request to the first network device. Based on this possible implementation, an authentication workload of the second network device is reduced.

In an embodiment, after determining that the first association information matches the second association information, the second network device may store the association relationship between the first terminal device and the second terminal device. Alternatively, after receiving the association indication information, the first network device may store the association relationship between the first terminal device and the second terminal device. The association relationship between the first terminal device and the second terminal device is stored, so that when the first terminal device and the second terminal device need to be paired for use next time, the association relationship does not need to be re-established. This helps reduce an association time or a pairing time.

In an embodiment, after the UAS authentication on the first terminal device succeeds, the method further includes the following steps: The first network device receives a first association request from the first terminal device, where the first association request is used to request to newly add an association relationship with a second terminal device. The first network device sends the first association request to the second network device. The second network device sends the first association request to the first network device. The first network device sends the first association request to the second terminal device. The first network device receives association acknowledgement indication information sent by the second terminal device. The first network device sends the association acknowledgement indication information to the second network device. The second network device sends association success indication information to the first network device. The first network device sends the association success indication information to the first terminal device and the second terminal device. Based on this possible implementation, authentication can be performed on the newly added association relationship between the first terminal device and the second terminal device.

In an embodiment, after receiving the first association request, the second network device may further determine whether to allow newly adding the association relationship with the first terminal device. If the second network device determines to allow newly adding the association relationship with the first terminal device, the second network device sends the first association request to the first network device. Optionally, if the second network device does not allow newly adding the association relationship with the first terminal device, the second network device sends, to the first network device, indication information indicating that the newly added association fails. Based on this possible implementation, an authentication workload of the second network device is reduced.

In an embodiment, after receiving the association acknowledgement indication information, the second network device may store the association relationship between the first terminal device and the second terminal device.

In an embodiment, after receiving the association success indication information, the first network device may store the association relationship between the first terminal device and the second terminal device.

In an embodiment, the first request may further carry the UAS identifier of the first terminal device. In this way, the first network device does not need to send the second request to the first terminal device, and does not need to receive the UAS identifier sent by the first terminal device in response to the second request. In this possible implementation, after receiving the first request that carries the first authentication indication information and the UAS identifier of the first terminal device, the first network device sends the UAS identifier of the first terminal device to the second network device. Based on this possible implementation, the first network device may obtain the first authentication indication information and the UAS identifier of the first terminal device through one information exchange. This helps perform UAS authentication on the first terminal device more quickly.

According to a second aspect, an embodiment of this application provides an identity authentication method. The method includes: A first network device receives a first request sent by a first terminal device, where the first request carries first authentication indication information, the first authentication indication information is used to request to perform unmanned aerial system UAS authentication on the first terminal device, and the first terminal device is a device in a UAS. The first network device sends a second request to the first terminal device, where the second request is used to request to obtain a UAS identifier of the first terminal device. The first network device receives the UAS identifier of the first terminal device that is sent by the first terminal device. The first network device sends the UAS identifier of the first terminal device to a second network device. The first network device receives a UAS authentication result of the first terminal device that is sent by the second network device. The first network device sends the UAS authentication result of the first terminal device to the first terminal device.

In an embodiment, the first authentication indication information is registration type information or UAS type information of the first terminal device, and the UAS type information indicates a device type, a business type, or a service type of the first terminal device in the UAS.

In an embodiment, after the first network device receives the first request sent by the first terminal device, the first network device may further determine whether to perform UAS authentication on the first terminal device. A specific implementation in which the first network device sends a second request to the first terminal device is: When the first network device determines to perform UAS authentication on the first terminal device, the first network device sends the second request to the first terminal device.

In an embodiment, a specific implementation in which the first network device determines whether to perform UAS authentication on the first terminal device is: The first network device determines, based on a UAS authentication status identifier of the first terminal device, whether to perform UAS authentication on the first terminal device.

In an embodiment, the first request carries the UAS type information of the first terminal device, and the UAS type information indicates the device type, the business type, or the service type of the first terminal device in the UAS. A specific implementation in which the first network device determines whether to perform UAS authentication on the first terminal device is: The first network device determines, based on the received UAS type information, whether to perform UAS authentication on the first terminal device.

In an embodiment, the first request carries the UAS type information of the first terminal device, and the UAS type information indicates the device type, the business type, or the service type of the first terminal device in the UAS. The first network device may further send the UAS type information of the first terminal device to the second network device.

In an embodiment, the second request is further used to request to obtain the UAS type information of the first terminal device, and the UAS type information indicates the device type, the business type, or the service type of the first terminal device in the UAS. After the first network device sends the second request to the first terminal device, the first network device may further receive the UAS type information of the first terminal device that is sent by the first terminal device. The first network device may further send the UAS type information of the first terminal device to the second network device.

In an embodiment, the first network device updates a UAS authentication status of the first terminal device based on the UAS authentication result.

In an embodiment, after the second network device receives the UAS identifier of the first terminal device, the method further includes the following steps: The first network device receives a UAS authentication result that is of a second terminal device associated with the first terminal device and that is sent by the second network device. The first network device sends the UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The first network device sends the UAS authentication result of the second terminal device and the UAS authentication result of the first terminal device to the second terminal device, or sends the UAS authentication result of the second terminal device and the association indication information to the second terminal device. Based on this possible implementation, UAS authentication can be performed on the first terminal device and the second terminal device, and authentication or authorization can be performed on a stored association relationship between the first terminal device and the second terminal device. This avoids pairing of any two devices, and improves security of a mobile communications network.

In an embodiment, after the first network device sends the UAS identifier of the first terminal device to the second network device, the method further includes the following steps: The first network device receives a UAS identifier, an SUPI, or a GPSI of a second terminal device that is sent by the second network device, and sends the UAS identifier of the second terminal device to the second network device. After receiving a UAS authentication result of the second terminal device, the first network device sends the UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The first network device sends the UAS authentication result of the second terminal device and the UAS authentication result of the first terminal device or the association indication information to the second terminal device.

In an embodiment, after receiving the UAS identifier, the SUPI, or the GPSI of the second terminal device associated with the first terminal device, the first network device determines whether to perform UAS authentication on the second terminal device. If yes, the first network device sends the UAS identifier of the second terminal device to the second network device. Optionally, if the first network device determines not to allow UAS authentication for the second terminal device, the first network device sends indication information to the first terminal device, where the indication information indicates that the first terminal device fails to be associated with the second terminal device. For example, the first network device may determine, based on whether the second terminal device is powered on, whether to perform UAS authentication on the second terminal device. For another example, the first network device may determine, based on locations of the first terminal device and the second terminal device and a distance between the first terminal device and the second terminal device, whether to perform UAS authentication on the second terminal device.

In an embodiment, the first request further carries newly-added-association indication information. A specific implementation in which the first network device sends the UAS identifier of the first terminal device to a second network device is: The first network device sends the UAS identifier of the first terminal device and the newly-added-association indication information to the second network device. After the first network device sends the UAS identifier of the first terminal device and the newly-added-association indication information to the second network device, the method further includes the following steps: The first network device sends, to the first terminal device, a request used to obtain first association information of the first terminal device. The first network device receives the first association information of the first terminal device that is sent by the first terminal device. The first network device sends the first association information of the first terminal device to the second network device. A specific implementation in which the first network device receives a UAS authentication result of the first terminal device that is sent by the second network device is: The first network device receives the UAS authentication result of the first terminal device and a UAS identifier, an SUPI, or a GPSI of a second terminal device that are sent by the second network device. After the first network device receives the UAS authentication result of the first terminal device and the UAS identifier, the SUPI, or the GPSI of the second terminal device, the first network device further sends a UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The first network device may further send the UAS authentication result of the first terminal device or association indication information to the second terminal device.

In an embodiment, after receiving the first request, the first network device may determine whether to allow newly adding the association relationship with the first terminal device. If the first network device allows newly adding the association relationship with the first terminal device, the first network device sends the second request to the first terminal device. Optionally, if the first network device does not allow newly adding the association relationship with the first terminal device, the first network device sends, to the first terminal device, indication information indicating that the newly added association fails. Based on this possible implementation, an authentication workload of the second network device is reduced.

In an embodiment, the first request further carries newly-added-association indication information, where the newly-added-association indication information is used to request to newly add an association relationship. After the first network device receives the first request, the first network device may further perform the following steps: The first network device sends, to the first terminal device, a request used to obtain first association information of the first terminal device. The first network device receives the first association information sent by the first terminal device. The first network device determines that the first association information matches second association information sent by a second terminal device. The first network device sends a UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The first network device sends the UAS authentication result of the first terminal device or the association indication information to the second terminal device.

In an embodiment, after receiving the first request, the first network device may determine whether to allow newly adding the association relationship with the first terminal device. If the first network device allows newly adding the association relationship with the first terminal device, the first network device sends the second request to the first terminal device. Optionally, if the first network device does not allow newly adding the association relationship with the first terminal device, the first network device sends, to the first terminal device, indication information indicating that the newly added association fails. Based on this possible implementation, an authentication workload of the second network device is reduced.

In an embodiment, after determining that the first association information matches the second association information, the first network device may further store the association relationship between the first terminal device and the second terminal device. Optionally, the first network device may further store the association relationship between the first terminal device and the second terminal device only when determining that both the UAS authentication result of the first terminal device and the UAS authentication result of the second terminal device indicate that the authentication succeeds. Optionally, the first network device may further send the association relationship to the second network device for storage. The association relationship between the first terminal device and the second terminal device is stored, so that when the first terminal device and the second terminal device need to be paired for use next time, the association relationship does not need to be re-established. This helps reduce a pairing time.

In an embodiment, the first request may further carry the UAS identifier of the first terminal device. In this way, the first network device does not need to send the second request to the first terminal device, and does not need to receive the UAS identifier sent by the first terminal device in response to the second request. In this possible implementation, after receiving the first request that carries the first authentication indication information and the UAS identifier of the first terminal device, the first network device sends the UAS identifier of the first terminal device to the second network device. Based on this possible implementation, the first network device may obtain the first authentication indication information and the UAS identifier of the first terminal device through one information exchange. This helps perform UAS authentication on the first terminal device more quickly.

For beneficial effects of the second aspect and the possible implementations of the second aspect, refer to the beneficial effects of the first aspect and the possible implementations of the first aspect. Details are not described herein again.

According to a third aspect, an embodiment of this application provides an identity authentication method. The method includes: A first terminal device sends a first request to a first network device, where the first request carries first authentication indication information, and the first authentication indication information is used to request to perform UAS authentication on the first terminal device. The first terminal device receives a second request sent by the first network device, where the second request is used to request to obtain a UAS identifier of the first terminal device. The first terminal device sends the UAS identifier of the first terminal device to the first network device in response to the second request. The first terminal device receives a UAS authentication result of the first terminal device that is sent by the first network device.

In an embodiment, the first authentication indication information is registration type information or UAS type information of the first terminal device, and the UAS type information indicates a device type, a business type, or a service type of the first terminal device in a UAS.

In an embodiment, the first request carries the UAS type information of the first terminal device, and the UAS type information indicates the device type, the business type, or the service type of the first terminal device in the UAS.

In an embodiment, the second request is further used to request to obtain the UAS type information of the first terminal device, and the first terminal device may further send the UAS type information of the first terminal device to the first network device.

In an embodiment, the first terminal device may further receive a UAS authentication result of a second terminal device associated with the first terminal device. The first terminal device determines a result of association between the first terminal device and the second terminal device based on the UAS authentication result of the first terminal device and the UAS authentication result of the second terminal device. Alternatively, the first terminal device may receive association indication information, where the association indication information indicates a result of association between the first terminal device and a second terminal device, and the association indication information is obtained based on the UAS authentication result of the first terminal device and a UAS authentication result of the second terminal device.

In an embodiment, the first request further carries newly-added-association indication information. The first terminal device may further receive a UAS authentication result of a second terminal device. The first terminal device determines a result of association between the first terminal device and the second terminal device based on the UAS authentication result of the first terminal device and the UAS authentication result of the second terminal device. Alternatively, the first terminal device may receive association indication information, where the association indication information indicates a result of association between the first terminal device and a second terminal device, and the association indication information is obtained based on the UAS authentication result of the first terminal device and a UAS authentication result of the second terminal device.

In an embodiment, the first terminal device receives a request that is sent by the first network device and that is used to obtain first association information of the first terminal device. The first terminal device sends the first association information of the first terminal device to the first network device. The first terminal device may further receive a UAS authentication result of a second terminal device. The first terminal device determines a result of association between the first terminal device and the second terminal device based on the UAS authentication result of the first terminal device and the UAS authentication result of the second terminal device. Alternatively, the first terminal device may receive association indication information, where the association indication information indicates a result of association between the first terminal device and a second terminal device, and the association indication information is obtained based on the UAS authentication result of the first terminal device and a UAS authentication result of the second terminal device.

In an embodiment, after the UAS authentication on the first terminal device succeeds, the first terminal device sends a first association request to the first network device, where the first association request is used to request to newly add an association relationship. The first terminal device receives a first obtaining request sent by the first network device. The first terminal device sends first association information to the first network device. The first terminal device receives association success indication information, where the association success indication information indicates that the first terminal device is successfully associated with the second terminal device.

In an embodiment, after the UAS authentication on the first terminal device succeeds, the first terminal device sends a first association request to the first network device, where the first association request is used to request to newly add an association relationship with the second terminal device. The first terminal device receives association success indication information.

In an embodiment, the first request may further carry the UAS identifier of the first terminal device. In this way, the first network device does not need to send the second request to the first terminal device, and does not need to receive the UAS identifier sent by the first terminal device in response to the second request.

For beneficial effects of the third aspect and the possible implementations of the third aspect, refer to the beneficial effects of the first aspect and the possible implementations of the first aspect. Details are not described herein again.

According to a fourth aspect, a communications apparatus is provided. The apparatus may be a network device, an apparatus in the network device, or an apparatus that can be used together with the network device. The communications apparatus may alternatively be a chip system. The communications apparatus may perform the method in the second aspect. Functions of the communications apparatus may be implemented by hardware, or may be implemented by hardware by executing corresponding software. The hardware or software includes one or more units corresponding to the functions. The units may be software and/or hardware. For operations performed by the communications apparatus and beneficial effects thereof, refer to the method in the second aspect and the beneficial effects thereof. Details are not described again.

According to a fifth aspect, a communications apparatus is provided. The apparatus may be a terminal device, an apparatus in the terminal device, or an apparatus that can be used together with the terminal device. The communications apparatus may alternatively be a chip system. The communications apparatus may perform the method in the third aspect. Functions of the communications apparatus may be implemented by hardware, or may be implemented by hardware by executing corresponding software. The hardware or software includes one or more units corresponding to the functions. The units may be software and/or hardware. For operations performed by the communications apparatus and beneficial effects thereof, refer to the method in the third aspect and the beneficial effects thereof. Details are not described again.

According to a sixth aspect, an embodiment of this application provides a communications apparatus. The communications apparatus may be a network device, an apparatus in the network device, or an apparatus that can be used together with the network device. The communications apparatus may alternatively be a chip in the network device. The communications apparatus includes a communications interface and a processor. The communications interface is used by the apparatus to communicate with another device, for example, to receive and send data or a signal. For example, the communications interface may be a transceiver, a circuit, a bus, a module, or a communications interface of another type, and the another device may be a terminal device or a network device. The processor is configured to invoke a group of programs, instructions, or data, to perform the method described in the second aspect. The apparatus may further include a memory, configured to store the programs, the instructions, or the data invoked by the processor. The memory is coupled to the processor, and when executing the instructions or the data stored in the memory, the processor can implement the method described in the second aspect.

According to a seventh aspect, an embodiment of this application provides a communications apparatus. The communications apparatus may be a terminal device, an apparatus in the terminal device, or an apparatus that can be used together with the terminal device. The communications apparatus may alternatively be a chip in the terminal device. The communications apparatus includes a communications interface and a processor. The communications interface is used by the apparatus to communicate with another device, for example, to receive and send data or a signal. For example, the communications interface may be a transceiver, a circuit, a bus, a module, or another type of communications interface, and the another device may be a network device. The processor is configured to invoke a group of programs, instructions, or data, to perform the method described in the third aspect. The apparatus may further include a memory, configured to store the programs, the instructions, or the data invoked by the processor. The memory is coupled to the processor, and when executing the instructions or the data stored in the memory, the processor can implement the method described in the third aspect.

According to an eighth aspect, an embodiment of this application provides a chip system. The chip system includes a processor, and may further include a memory, to implement the method in the second aspect or the third aspect. The chip system may include a chip, or may include a chip and another discrete component.

According to a ninth aspect, an embodiment of this application provides a computer-readable storage medium. The computer-readable storage medium is configured to store instructions, and when the instructions are executed, the method in the first aspect or the third aspect is implemented.

According to a tenth aspect, an embodiment of this application provides a computer program product including instructions. When the instructions are executed, the method in the first aspect or the third aspect is implemented.

BRIEF DESCRIPTION OF DRAWINGS

FIG. 4A and FIG. 4B are a schematic flowchart of another identity authentication method according to an embodiment of this application;

DESCRIPTION OF EMBODIMENTS

The following further describes specific embodiments of this application in detail with reference to accompanying drawings.

A communications system to which embodiments of this application are applied is first described.

Technical solutions of embodiments of this application may be applied to various communications systems, such as a global system for mobile communications (GSM), a code division multiple access (CDMA) system, a wideband code division multiple access, (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system or a new radio (NR) system, and a future communications system.

An example in which embodiments of this application are applied to a 5G system is used. Related network elements in the 5G system are described in detail below.

Figure 1:
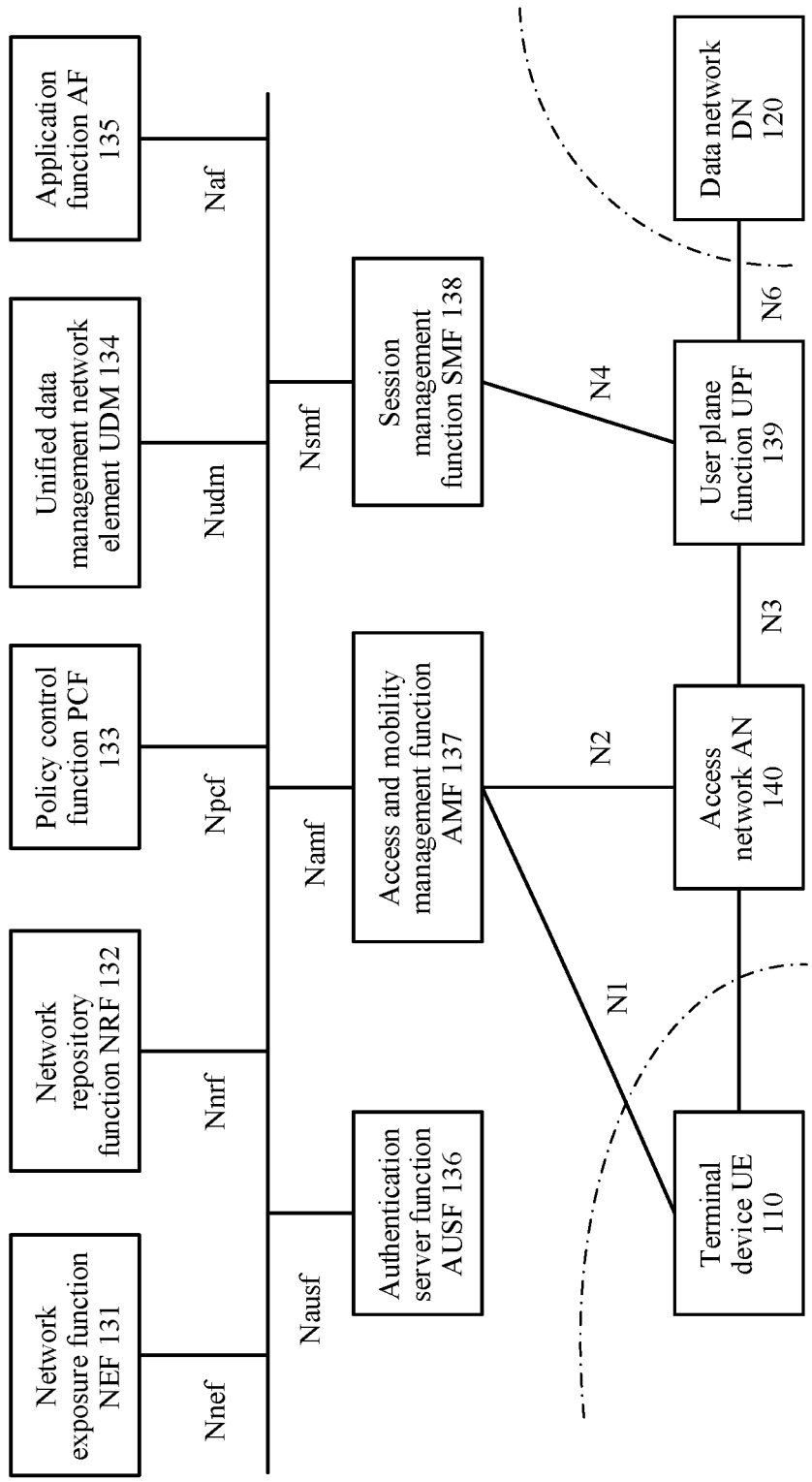
FIG. 1 is a schematic diagram of a 5G system architecture according to an embodiment of this application.

The network architecture shown in FIG. 1 uses a 5G network architecture based on a service-based architecture defined in a 3GPP standardization process as an example. As shown in FIG. 1, the network architecture may include three parts: a terminal device part, an operator network, and a data network (DN).

The terminal device part includes a terminal device 110, and the terminal device 110 may also be referred to as user equipment (UE). The terminal device 110 in embodiments of this application is a device with a wireless transceiver function, and may communicate with one or more core networks (CNs) by using an access network device in an access network (AN) 140. The terminal device 110 may also be referred to as an access terminal, a terminal, a subscriber unit, a subscriber station, a mobile station, a mobile console, a remote station, a remote terminal, a mobile device, a user terminal, a wireless network device, a user agent, a user apparatus, or the like. The terminal device 110 may be deployed on land, including an indoor device, an outdoor device, a handheld device, or a vehicle-mounted device, or may be deployed on a water surface (such as a ship), or may be deployed in the air (for example, on aircraft, a balloon, or a satellite). The terminal device 110 may be a cellular phone, a cordless phone, a session initiation protocol (SIP) phone, a smartphone, a mobile phone, a wireless local loop (WLL) station, a personal digital assistant (PDA), a handheld device with a wireless communication function, a computing device or another device connected to a wireless modem, a vehicle-mounted device, a wearable device, an unmanned aerial system device or the internet of things, a terminal in the internet of vehicles, a terminal in any form in a fifth-generation (5G) network and a future network, relay user equipment, a terminal in a future evolved public land mobile network (PLMN), or the like. The relay user equipment may be, for example, a 5G residential gateway (RG). For example, the terminal device 110 may be a virtual reality (VR) terminal, an augmented reality (AR) terminal, a wireless terminal in industrial control, a wireless terminal in self-driving, a wireless terminal in remote medical, a wireless terminal in smart grid, a wireless terminal in transportation safety, a wireless terminal in smart city, or a wireless terminal in smart home. This is not limited in embodiments of this application.

Some of various communications systems that are operated by an operator may be referred to as the operator network. The operator network may also be referred to as a public land mobile network (PLMN), is a network established and operated by a government or an operator approved by the government to provide a land mobile communications service for the public, and is mainly a public network in which a mobile network operator (MNO) provides a mobile broadband access service for a user. The operator network or the PLMN described in embodiments of this application may be specifically a network that meets a requirement of a 3rd Generation Partnership Project (3GPP) standard, and is referred to as a 3GPP network. Usually, the 3GPP network is operated by the operator, and includes but is not limited to a 5th-generation (5G) mobile communications network (5G network for short), a 4th-generation (4G) mobile communications network (4G network for short), a 3rd-generation (3G) mobile communications technology network (3G network for short), a 2nd-generation wireless telephone technology (2G) network (2G network for short), and the like. For ease of description, the operator network (namely, an MNO network) is used as an example for description in embodiments of this application.

The operator network may include a network exposure function (NEF) 131, a network repository function (NRF) 132, a policy control function (PCF) 133, a unified data management (UDM) network element 134, an application function (AF) 135, an authentication server function (AUSF) 136, an access and mobility management function (AMF) 137, a session management function (SMF) 138, a user plane function (user plane function, UPF) 139, a (radio) access network ((R)AN) 140, and the like. In the operator network, a part other than the (radio) access network 140 part may be referred to as a core network (CN) part or a core network part. For ease of description, in embodiments of this application, an example in which the (R)AN 140 is a RAN is used for description.

A data network DN 120 may also be referred to as a packet data network (PDN), and is usually a network outside the operator network, for example, a third-party network. The operator network may access a plurality of data networks DNs 120. A plurality of services may be deployed on the data network DN 120, and the data network DN 120 may provide services such as data and/or voice for the terminal device 110. For example, the data network DN 120 may be a private network of a smart factory, a sensor installed in a workshop of the smart factory may be the terminal device 110, a control server of the sensor is deployed in the data network DN 120, and the control server may provide a service for the sensor. The sensor may communicate with the control server to, for example, obtain an instruction of the control server and transmit collected sensor data to the control server based on the instruction. For another example, the data network DN 120 may be an internal office network of a company, a mobile phone or a computer of an employee of the company may be the terminal device 110, and the mobile phone or the computer of the employee may access information, data resources, and the like on the internal office network of the company.

The terminal device 110 may establish a connection to the operator network through an interface (for example, N1) provided by the operator network, and use the services such as data and/or voice provided by the operator network. The terminal device 110 may further access the data network DN 120 through the operator network, and use an operator service deployed on the data network DN 120 and/or a service provided by a third party. The third party may be a service provider other than the operator network and the terminal device 110, and may provide the services such as data and/or voice for the terminal device 110. A specific expression form of the third party may be specifically determined depending on an actual application scenario. This is not limited herein.

The following briefly describes a network function in the operator network.

The access network RAN 140 is a sub-network of the operator network, and is an implementation system between a service node in the operator network and the terminal device 110. To access the operator network, the terminal device 110 first passes through the RAN 140, and then may be connected to the service node in the operator network through the RAN 140. The access network device (RAN device) in embodiments of this application is a device that provides a wireless communication function for the terminal device 110, and may also be referred to as a network device. The RAN device includes but is not limited to a next-generation NodeB (gNB) in a 5G system, an evolved NodeB (eNB) in long term evolution (LTE), a radio network controller (RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a pico base station device, a mobile switching center, a network device in a future network, or the like. It should be understood that a specific type of the access network device is not limited in this specification. In systems using different radio access technologies, devices with functions of the access network device may have different names. For ease of description, in all the embodiments of this application, the foregoing apparatuses that provide the wireless communication function for the terminal device 110 are collectively referred to as the access network device.

The access and mobility management function AMF (which may also be referred to as an AMF network function or an AMF network function entity) 137 is a control plane network function provided by the operator network, and is responsible for access control and mobility management when the terminal device 110 accesses the operator network, for example, including functions such as mobility status management, temporary user identity assignment, and user authentication and authorization.

The session management function SMF (which may also be referred to as an SMF network function or an SMF network function entity) 138 is a control plane network function provided by the operator network, and is responsible for managing a protocol data unit (PDU) session of the terminal device 110. The PDU session is a channel used to transmit a PDU, and the terminal device and the data network DN 120 need to transmit the PDU to each other through the PDU session. The SMF network function 138 is responsible for establishment, maintenance, deletion, and the like of the PDU session. The SMF network function 138 includes functions related to a session, for example, session management (for example, session establishment, modification, and release, including tunnel maintenance between the user plane function UPF 139 and the access network AN 140), selection and control of the UPF network function 139, service and session continuity (SSC) mode selection, and roaming.

The user plane function UPF (which may also be referred to as a UPF network function or a UPF network function entity) 139 is a gateway provided by an operator, and is a gateway for communication between the operator network and the data network DN 120. The UPF network function 139 includes functions related to a user plane, for example, packet routing and transmission, packet detection, service usage reporting, quality of service (QoS) processing, lawful interception, uplink packet detection, and downlink packet storage.

The unified data management UDM network element (which may also be referred to as a UDM network function or a UDM network function entity) 134 is a control plane function provided by the operator, and is responsible for storing information such as a subscription permanent identifier (SUPI), a credential, a security context, and subscription data of a subscriber in the operator network. The SUPI is first encrypted during transmission, and the encrypted SUPI is referred to as a subscription concealed identifier (SUCI). The information stored in the UDM network function 134 may be used for authentication and authorization when the terminal device 110 accesses the operator network. The subscriber of the operator network may be specifically a subscriber using a service provided by the operator network, for example, a subscriber using a mobile phone smart card of China Telecom or a subscriber using a mobile phone smart card of China Mobile. The subscription permanent identifier SUPI of the subscriber may be a number of the mobile phone smart card or the like. The credential and the security context of the subscriber may be a small file storing, for example, an encryption key of the mobile phone smart card or information related to encryption of the mobile phone smart card, and is used for authentication and/or authorization. The security context may be cookie, a token, or the like stored in a local terminal (for example, a mobile phone) of the user. The subscription data of the subscriber may be a service accompanying the mobile phone smart card, for example, a traffic package for or a network for use by the mobile phone smart card. It should be noted that the permanent identifier, the credential, the security context, the cookie, and the token are equivalent to information related to authentication and authorization, and are not limited or distinguished between each other for ease of description in embodiments of this application. Unless otherwise specified, the security context is used as an example for description in embodiments of this application. However, embodiments of this application are also applicable to authentication and/or authorization information described in another expression manner.

The authentication server function AUSF (which may also be referred to as an AUSF network function or an AUSF network function entity) 136 is a control plane function provided by the operator, and is usually used for primary authentication, to be specific, authentication between the terminal device 110 (subscriber) and the operator network. After receiving an authentication request initiated by the subscriber, the AUSF network function 136 may perform authentication and/or authorization on the subscriber by using authentication information and/or authorization information stored in the UDM network function 134, or generate authentication and/or authorization information of the subscriber by using the UDM network function 134. The AUSF network function 136 may feed back the authentication information and/or authorization information to the subscriber.

The network exposure function NEF (which may also be referred to as an NEF network function or an NEF network function entity) 131 is a control plane function provided by the operator. The NEF network function 131 securely exposes an external interface of the operator network to the third party. When the SMF network function 138 needs to communicate with a third-party network function, the NEF network function 131 may serve as a relay for communication between the SMF network function 138 and a third-party network entity. When the NEF network function 131 serves as the relay, the NEF network function 131 may translate identification information of the subscriber and identification information of the third-party network function. For example, when the NEF network function 131 sends the SUPI of the subscriber from the operator network to the third party, the NEF network function 131 may translate the SUPI into an external identity (identity, ID) corresponding to the SUPI. On the contrary, when the NEF network function 131 sends an external ID (an ID of the third-party network entity) to the operator network, the NEF network function 131 may translate the external ID into the SUPI.

The policy control function PCF (which may also be referred to as a PCF network function or a PCF network function entity) 133 is a control plane function provided by the operator, and is configured to provide a policy of the PDU session for the SMF network function 138. The policy may include an accounting-related policy, a QoS-related policy, an authorization-related policy, and the like.

A network slice selection function (network slice selection function, NSSF) (not shown in the figure) is responsible for determining a network slice instance, selecting the AMF network function 137, and the like.

In FIG. 1, Nnef, Nausf, Nnrf, Npcf, Nudm, Naf, Namf, Nsmf, N1, N2, N3, N4, and N6 are interface serial numbers. For meanings of these interface serial numbers, refer to definitions in the 3GPP standard protocol. This is not limited herein. It should be noted that in FIG. 1, only an example in which the terminal device 110 is UE is used for description. Names of interfaces between network functions in FIG. 1 are merely examples. In specific implementation, the names of the interfaces in the system architecture may be other names. This is not specifically limited in embodiments of this application.

A mobility management network function in embodiments of this application may be the AMF network function 137 shown in FIG. 1, or may be another network function that has the AMF network function 137 in a future communication system. Alternatively, the mobility management network function in this application may be a mobility management entity (mobility management entity, MME) in long term evolution (long term evolution, LTE), or the like.

For ease of description, in embodiments of this application, an example in which the mobility management network function is the AMF network function 137 is used for description. Further, the AMF network function 137 is briefly referred to as an AMF, and the terminal device 110 is referred to as UE. In other words, in embodiments of this application, all AMFs described below may be replaced with the mobility management network function, and all UEs may be replaced with the terminal device.

The network architecture (for example, the 5G network architecture) shown in FIG. 1 uses a service-based architecture and a universal interface, and a conventional network element function is split into several self-contained, self-managed, and reusable network function service modules based on a network function virtualization, (NFV) technology. A service module set is flexibly defined to implement customized network function reconstruction and form a service process through unified service invoking interfaces. The schematic diagram of the network architecture shown in FIG. 1 may be understood as a schematic diagram of a service-based 5G network architecture in a non-roaming scenario. Embodiments of this application are also applicable to a roaming scenario.

Recently, an idea of using a mobile communications network to implement communication between the unmanned aerial vehicle and the UAV controller has attracted widespread attention. The mobile communications network has many commercial advantages: wide area coverage, high reliability, high-speed mobility, and the like. By using a network connection, the unmanned aerial system can achieve high-reliability flight beyond line of sight. In addition, the mobile communications network also provides regulatory authorities with a more reliable supervision method, to prevent the unmanned aerial vehicle from interfering with aircraft flight operations, launching terrorist attacks, and the like. This ensures security of the unmanned aerial system and public security.

To improve security of accessing or using a mobile communications network by an unmanned aerial vehicle, authentication needs to be performed on a terminal device of an unmanned aerial system that uses the mobile communications network, or authentication needs to be performed on an unmanned aerial system user that uses the terminal device, or authentication needs to be performed on an unmanned aerial system service/unmanned aerial system business performed by using the terminal device. The terminal device, the unmanned aerial system user, or the unmanned aerial system service/unmanned aerial system business can use the mobile communications network only after the authentication succeeds. In an existing device authentication procedure, a core network device in a mobile communications network performs identity authentication on a terminal device based on a terminal identifier (for example, an SUPI) and a corresponding credential that are preconfigured in a PLMN. However, the terminal identifier preconfigured in the PLMN is in a one-to-one correspondence with a smart card (for example, a SIM card or a subscriber identification module card, also referred to as a subscriber identification module/card). When a same SIM card is configured in any terminal device, authentication results are the same in a same case. That is, the terminal identifier and the corresponding credential that are preconfigured in the PLMN are not directly related to the terminal device. For example, if a SIM card is configured in a terminal device 1, the terminal device 1 can succeed in identity authentication based on a terminal identifier (for example, an SUPI) corresponding to the SIM card. In a same case, the SIM card is configured in a terminal device 2, and the terminal device 2 may also succeed in identity authentication based on the terminal identifier (for example, the SUPI) corresponding to the SIM card. Therefore, if authentication is performed on the terminal device by using the existing device authentication procedure, an unmanned aerial vehicle or a UAV controller, which is considered as a terminal device, that is manufactured by a device vendor that has not signed with an operator may also access the mobile communications network. This affects security of the mobile communications network. Likewise, if authentication is performed on the terminal device by using the existing device authentication procedure, an unmanned aerial system user of a service provider or a vertical industry that has not signed with an operator may also access the mobile communications network when using an unmanned aerial vehicle or a UAV controller (the existing SIM card-based device authentication succeeds), or an unmanned aerial system service/ unmanned aerial system business of a service provider or a vertical industry that has not signed with an operator may also access the mobile communications network when using an unmanned aerial vehicle or a UAV controller (the existing SIM card-based device authentication succeeds). This affects security of the mobile communications network.

Therefore, embodiments of this application provide an identity authentication method and an apparatus, so that identity authentication can be performed on a terminal device (an unmanned aerial vehicle or a UAV controller) based on a UAS identifier of the terminal device. The UAS identifier of the terminal device may be: (1) an identity assigned by a device vendor to the device; (2) an identifier of an unmanned aerial system user/unmanned aerial system service/unmanned aerial system business provided by a UAS service provider/vertical industry for the unmanned aerial system user or the unmanned aerial system service/ unmanned aerial system business that uses a UAS system; or (3) another identifier related to an unmanned aerial system and different from a SIM card. The UAS identifier of the terminal device, the identifier of the UAS user or service/ business, or the like is a user identifier different from a SIM card identifier. Therefore, identity authentication is performed on the terminal device based on the UAS identifier of the terminal device, so that an unmanned aerial vehicle (or a UAV controller) manufactured by a device vendor that has not signed with an operator can be prevented from accessing a mobile communications network, or an unmanned aerial system user/unmanned aerial system service/unmanned aerial system business of a service provider or a vertical industry that has not signed with an operator can be prevented from using an unmanned aerial vehicle (or a UAV controller) to access a mobile communications network. This improves security of the mobile communications network. In addition, identity authentication is performed on the terminal device based on the UAS identifier of the terminal device, so that an unmanned aerial system device vendor/unmanned aerial system service provider/vertical industry has control and management rights on whether an unmanned aerial system produced/serviced/owned by the unmanned aerial vehicle can access the mobile communications network.

It should be noted that the identifier in the present disclosure is not limited to an entity such as a device vendor, a service provider, or a vertical industry, and may alternatively be any other entity. The following merely uses an identifier issued by a device vendor to a device as an example. For other identifiers, embodiments of this application are also applicable.

The following describes a system architecture in embodiments of this application.

Figure 2:
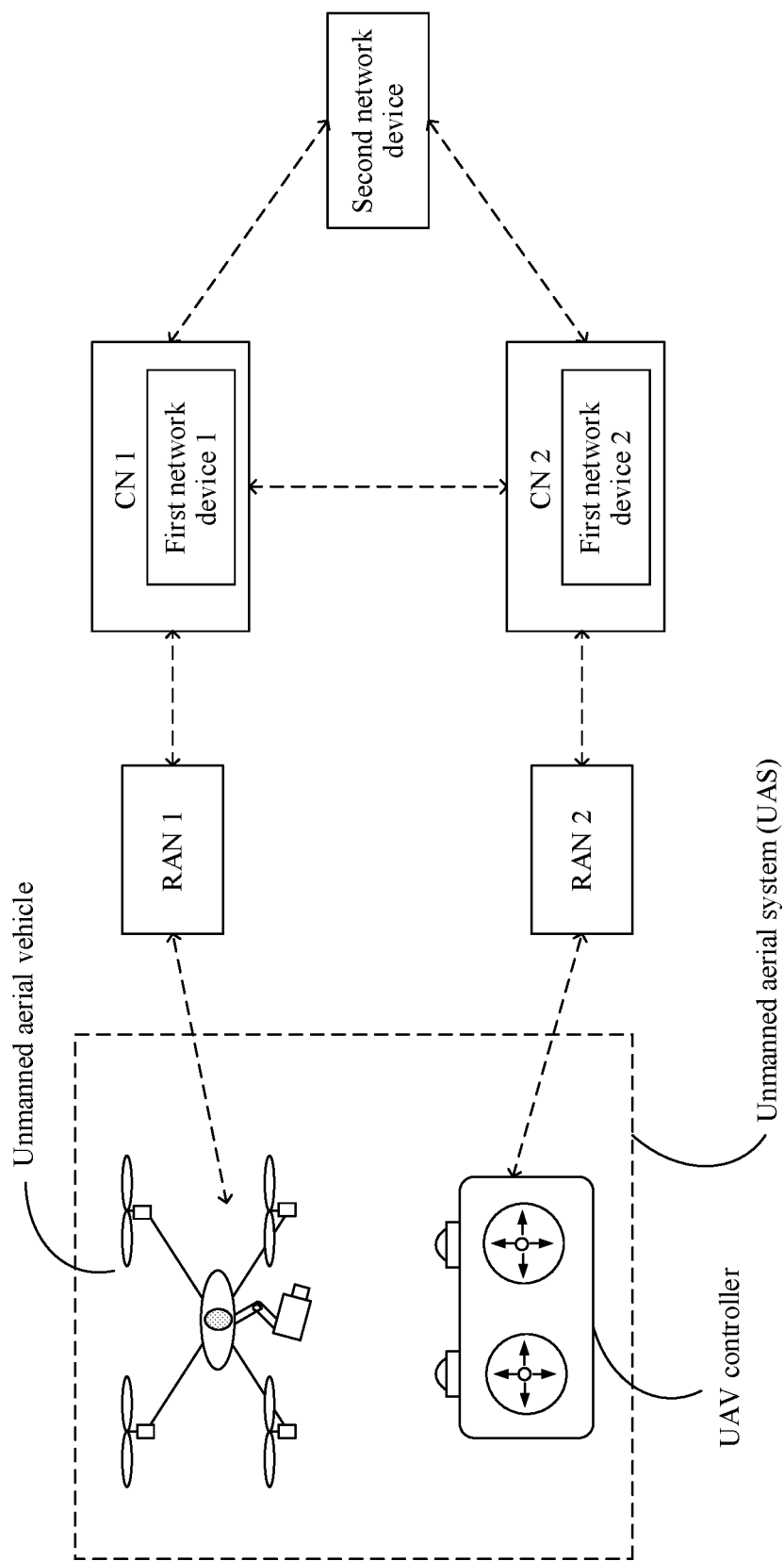
FIG. 2 is a schematic flowchart of an unmanned aerial system based on a mobile communications network according to an embodiment of this application.

FIG. 2 shows a system architecture of an unmanned aerial system based on a mobile communications network according to an embodiment of this application. As shown in FIG. 2, the system architecture includes an unmanned aerial vehicle, a UAV controller, a radio access network (radio access network, RAN), a core network (core network, CN), and a second network device. The core network includes a first network device. The second network device may be located in the core network, or may be located outside the core network.

A mobile communications network may be applied to the mobile communications network described above, for example, may be a mobile communications network in a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system or a new radio (NR) system, and a future communications system.

A RAN 1 and a RAN 2 respectively provide services for a UAV controller and an unmanned aerial vehicle. If the UAV controller and the unmanned aerial vehicle are covered by a same RAN, the two RANs may also be a same RAN. Likewise, a CN 1 and a CN 2 respectively provide services for the RAN 1 and the RAN 2. If the RANs (the RAN 1 and the RAN 2 may be the same or different) accessed by the unmanned aerial vehicle and the UAV controller are served by a same CN. In this case, the two core networks may also be a same core network. Two first network devices may be a same first network device. In the system shown in FIG. 2, the UAV controller controls the unmanned aerial vehicle by using a network, and communicates and interacts with the unmanned aerial vehicle. For example, the UAV controller sends an instruction to the unmanned aerial vehicle through the RAN 1, the CN 1, the CN 2, and the RAN 2. When the mobile communications system is a 5G communications system, in contrast to FIG. 1, in FIG. 2, an unmanned aerial vehicle (UAV) and a UAV controller in an unmanned aerial system (UAS) correspond to two different UEs 110 in FIG. 1. The RANs herein correspond to two access networks ANs 140 in FIG. 1.

The unmanned aerial vehicle may also be referred to as a drone, an aircraft, or the like. The UAV controller may be a device specially produced for remote control of the unmanned aerial vehicle, or may be any one of the terminal devices 110 described above, such as a smartphone, a wearable device, and the like.

The first network device may be an access and mobility management function (AMF), a security anchor function (SEAF), or another core network device.

AMF: For descriptions of the AMF, refer to the foregoing descriptions of the AMF in FIG. 1. Details are not described herein again.

SEAF: The SEAF is an authentication function that interacts with the AUSF and NG-UE in the core network, and receives, from the AUSF, an intermediate key generated in an NG-UE authentication process. The SEAF also interacts with an MM function and an SMF. The SEAF is located in a secure environment of an operator network and is not exposed to unauthorized access. In a roaming scenario, the SEAF is located on a visited network.

The second network device may be located in the core network, or may be located outside the core network. The second network device may be an unmanned aerial vehicle traffic management (UTM) device, or may be another core network device or a non-core network device.

In embodiments of this application, the second network device stores related information of the unmanned aerial vehicle and the UAV controller. For example, the second network device stores a UAS identifier and a credential that are assigned by a signed device vendor to the unmanned aerial vehicle (or the UAV controller) during delivery from factory. Each unmanned aerial vehicle (or UAV controller) has a unique (one or more) UAS identifier and a corresponding credential (credentials) that are configured during delivery from factory. Different unmanned aerial vehicles (or UAV controllers) correspond to different UAS identifiers and credentials. When the unmanned aerial vehicle (or the UAV controller) needs to access the mobile communications network, the second network device may perform identity authentication on the unmanned aerial vehicle (or the UAV controller) based on the UAS identifier and the corresponding credential of the unmanned aerial vehicle (or the UAV controller). If the identity authentication on the unmanned aerial vehicle (or the UAV controller) fails, the unmanned aerial vehicle (or the UAV controller) cannot use the mobile communications network. The UAS identifier of the terminal device may be an identity assigned by a device vendor to the device, and the UAS identifier of the terminal device is an identifier of the device. Therefore, if identity authentication is performed on the terminal device based on the UAS identifier of the terminal device, an unmanned aerial vehicle (or a UAV controller) that is manufactured by a device vendor that has not signed with an operator can be prevented from accessing the mobile communications network. This improves security of the mobile communications network. Likewise, the UAS identifier and the credential may alternatively be issued and configured by an entity such as an unmanned aerial system service provider, a vertical industry, or the like. When initializing an unmanned aerial vehicle service or business, the service provider or the vertical industry may configure a unique (one or more) UAS identifier and a corresponding credential for the unmanned aerial vehicle user/unmanned aerial vehicle service/unmanned aerial vehicle business. If identity authentication performed by the second network device based on the identifier and the corresponding credential that are provided by the unmanned aerial system service provider or the vertical industry fails, the unmanned aerial vehicle (or the UAV controller) cannot use the mobile communications network. Therefore, identity authentication is performed on the terminal device based on the UAS identifier of the terminal device, so that an unmanned aerial system user/unmanned aerial system service/unmanned aerial system business of a service provider or a vertical industry that has not signed with an operator can be prevented from using an unmanned aerial vehicle (or a UAV controller) to access a mobile communications network. This improves security of the mobile communications network.

The following further describes the identity authentication method and the apparatus that are provided in this application.

Figure 3:
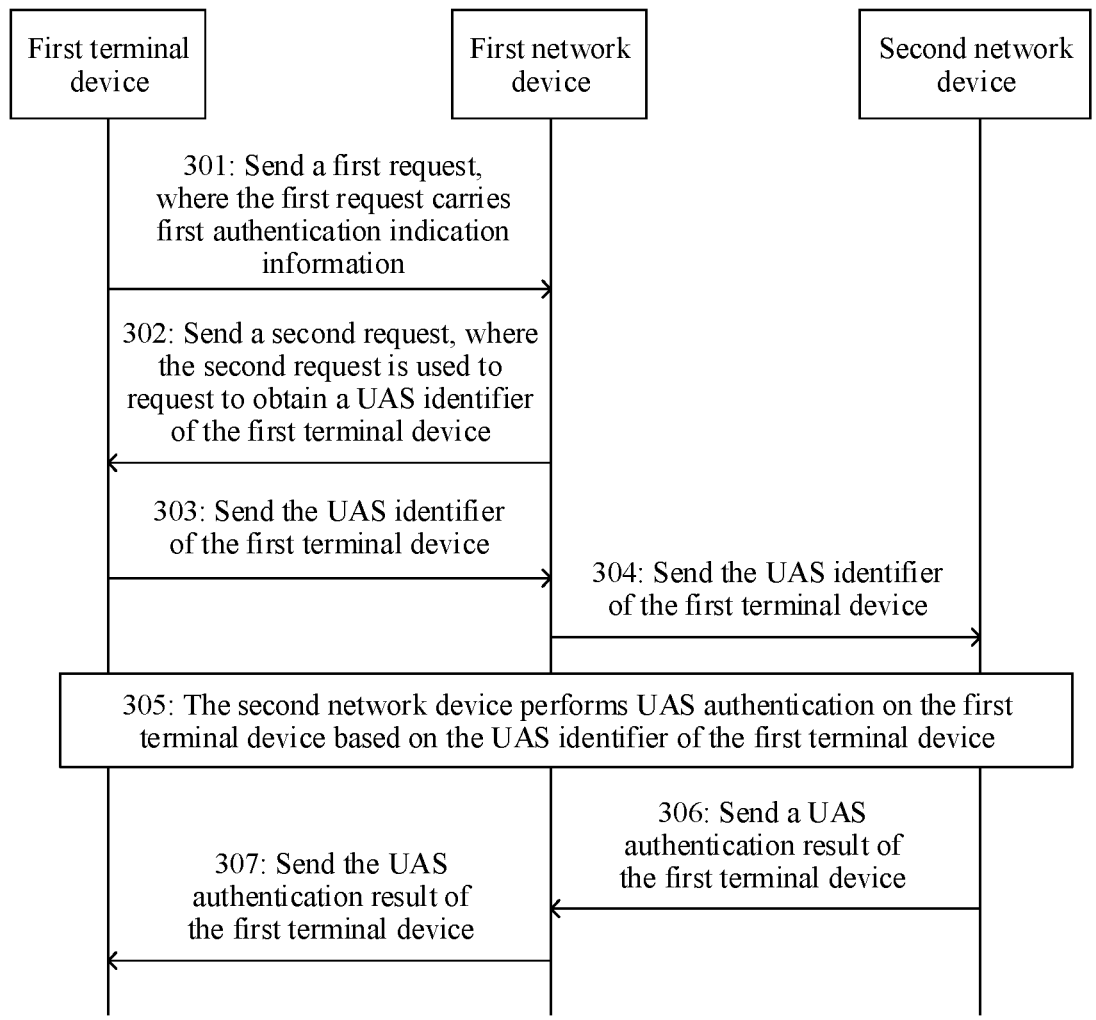
FIG. 3 is a schematic flowchart of an identity authentication method according to an embodiment of this application.

FIG. 3 is a schematic flowchart of an identity authentication method according to an embodiment of this application. As shown in FIG. 3, the identity authentication method includes step 301 to step 307. The method shown in FIG. 3 may be performed by a first terminal device, a first network device, and a second network device. Alternatively, the method shown in FIG. 3 may be performed by a chip in the first terminal device, a chip in the first network device, and a chip in the second network device. FIG. 3 is described by using an example in which the method is performed by the first terminal device, the first network device, and the second network device. The first terminal device is a device in an unmanned aerial system, for example, may be an unmanned aerial vehicle or a UAV controller. The first network device may be an AMF, an SEAF, or another core network device. The second network device may be a UTM or another network device that can perform authentication on an unmanned aerial system. This goes the same for an execution body of the identity authentication method shown in other accompanying drawings in embodiments of this application. Details are not described subsequently.

301: The first terminal device sends a first request to the first network device.

The first request may be a registration request (registration request), a service request, or a request of another type. The first request carries first authentication indication information, and the first authentication indication information is used to request to perform UAS authentication on the first terminal device. UAS authentication is identity authentication performed on a device in a UAS based on a UAS identifier of the device. If the UAS authentication succeeds, it indicates that the device in the UAS is valid. If the UAS authentication fails, it indicates that the device in the UAS is invalid and cannot access a mobile communications network.

A UAS identifier is an identity (ID) assigned by an unmanned aerial vehicle vendor to an unmanned aerial vehicle and a UAV controller during delivery from factory. Different unmanned aerial vehicles and UAV controllers correspond to different UAS identifiers. Each unmanned aerial vehicle and each UAV controller have unique (one or more) UAS identifiers and corresponding credentials that are configured during delivery from factory. Alternatively, the UAS identifier and the credential may be assigned and configured by an unmanned aerial system service provider or a vertical industry. For descriptions of the UAS identifier, refer to the foregoing descriptions. This is not limited herein.

The first authentication indication information may have the following three forms: a, b, and c.

a. The first authentication indication information is registration type (Registration Type) information in the first request. In the form a, the first request may be a registration request. The registration type information is a parameter or an information element (Information Element) existing in an existing registration request. In the form a, a value may be newly added to the registration type information. For example, the newly added value of the registration type information may be UAS registration or UAS authentication. When the value of the registration type information in the registration request is UAS registration or UAS authentication, the registration type information indicates the first authentication indication information, and is used to request to perform UAS authentication on the first terminal device. The registration type information is used to request to perform UAS authentication on the first terminal device, so that a new parameter or information element does not need to be added to request to perform UAS authentication on the first terminal device, and changes to an existing communication procedure can be minimized.

b. The first authentication indication information is UAS type information of the first terminal device. The UAS type information indicates a device type, a service type, or a business type of the first terminal device in a UAS. For example, the UAS type information may be an unmanned aerial vehicle type or a UAV controller type. In the form b, the UAS type information of the first terminal device is used as the first authentication indication information. In this way, the first network device can be notified of a UAS type of the first terminal device, and the first network device can be requested to perform UAS authentication. In other words, two objectives can be achieved by sending one type of information. This helps reduce signaling overheads.

c. The first authentication indication information is indication information other than the registration type information and the UAS type information. For example, an information element or a parameter may be additionally added to the first request to indicate the first authentication indication information.

In an embodiment, the first request carries the UAS type information of the first terminal device. For example, if the first authentication indication information is in the form a and the form c, the first request may further carry the UAS type information of the first terminal device. Alternatively, the first authentication indication information is in the form b. In subsequent step 304, the first network device may further send the UAS type information of the first terminal device to the second network device, so that the second network device can perform UAS authentication on the first terminal device based on the UAS type information of the first terminal device by using a corresponding authentication method. For example, the second network device may perform UAS authentication on an unmanned aerial vehicle and a UAV controller by using different authentication methods, or security strength or security procedures required for performing UAS authentication on an unmanned aerial vehicle and a UAV controller may be different.

In an embodiment, the first request further carries a subscription concealed identifier (SUCI) or a globally unique temporary UE identity (GUTI) of the first terminal device.

302: The first network device sends a second request to the first terminal device.

In this embodiment of this application, after receiving the first request, the first network device sends the second request to the first terminal device. The second request is used to request to obtain a UAS identifier of the first terminal device.

In an embodiment, after receiving the first request, the first network device may first perform initial authentication with the first terminal device, and establish NAS security with the first terminal device. The first network device sends the second request to the first terminal device after the initial authentication with the first terminal device succeeds and the NAS security with the first terminal device is established.

The initial authentication is two-way authentication performed between a network and the first terminal device. In a 5G standard, the initial authentication includes two authentication procedures: 5G-AKA (AKA: Authentication and Key Agreement) and EAP-AKA'. In the two authentication procedures, authentication is performed on the first terminal device based on a terminal identifier (for example, an SUPI in a 5G system) and a corresponding credential (Credentials) that are preconfigured in a PLMN.

After the NAS security is established between the first network device and the first terminal device, a message exchanged between the first terminal device and the first network device has security protection, for example, encryption protection and integrity protection. Therefore, after the NAS security is established between the first network device and the first terminal device, the UAS identifier is obtained from the first terminal device. This helps prevent the UAS identifier from being disclosed and tampered with.

In an embodiment, after receiving the first request, the first network device may further first detect whether initial authentication with the first terminal device needs to be performed. If the initial authentication with the first terminal device needs to be performed, the initial authentication with the first terminal device is performed, and NAS security with the first terminal device is established.

In an embodiment, for example, UAS authentication is performed on the first terminal device by using an extensible authentication protocol (EAP) mechanism. The first network device may add the second request to an EAP message for sending.

303: The first terminal device sends the UAS identifier of the first terminal device to the first network device in response to the second request.

In this embodiment of this application, after receiving the second request, the first terminal device sends the UAS identifier of the first terminal device to the first network device in response to the second request.

In an embodiment, for example, UAS authentication is performed on the first terminal device by using the EAP mechanism. The first terminal device may add the UAS identifier to the EAP message and send the EAP message to the first network device. Likewise, the UAS identifier may be transmitted hereinafter by using the EAP message.

In an embodiment, the first terminal may further send a UAS type of the first terminal device to the first network device in response to the second request. It should be noted that a UAS type message generally cannot be carried in the EAP message, and needs to be sent in another manner. That is, in an embodiment, the first terminal device needs to send the UAS identifier and the UAS type in different messages or different locations (or manners) in a same message (for example, the UAS identifier is placed in an EAP container, and the UAS type is placed outside the EAP container).

In another possible implementation, the first device may directly obtain the UAS identifier based on the first request in step 301. In this case, steps 302 and 303 are optional steps, and do not need to be performed. For example, the first request optionally includes a subscription identifier SUCI or a GUTI of the terminal. The first network device obtains an SUPI based on the SUCI or the GUTI. If the first network device stores a correspondence between the identifier SUPI and the UAS identifier of the terminal, the first network may directly obtain the UAS identifier by using the correspondence.

304: The first network device sends the UAS identifier of the first terminal device to the second network device.

In this embodiment of this application, after obtaining the UAS identifier of the first terminal device, the first network device sends the UAS identifier of the first terminal device to the second network device.

In an embodiment, the first network device may further send the UAS type of the first terminal device and/or the identifier (for example, the SUPI or the GPSI) of the terminal device to the second network device. It should be noted that the UAS type and the identifier of the terminal device generally cannot be carried in the EAP message, and need to be sent in another manner. That is, in an embodiment, the first network device needs to send the UAS identifier and the UAS type (and/or the identifier of the terminal device) in different messages or different locations (or manners) in a same message. For example, in an embodiment, the UAS identifier may be placed in an EAP container, and the UAS type (and/or the identifier of the terminal device) is placed outside the EAP container for sending.

305: The second network device performs UAS authentication on the first terminal device based on the UAS identifier of the first terminal device.

In this embodiment of this application, after receiving the UAS identifier of the first terminal device, the second network device performs UAS authentication on the first terminal device based on the UAS identifier of the first terminal device. The second network device performs UAS authentication on the first terminal device based on the UAS identifier of the first terminal device and a corresponding credential. For example, the second network device may perform UAS authentication on the first terminal device by using the EAP mechanism. For example, UAS authentication is performed on the first terminal device based on the UAS identifier by using an EAP-TLS authentication method in the EAP mechanism.

306: The second network device sends a UAS authentication result of the first terminal device to the first network device.

In this embodiment of this application, after the second network device performs UAS authentication on the first terminal device based on the UAS identifier, the second network device sends the UAS authentication result of the first terminal device to the first network device.

In an embodiment, the second network device may further update a UAS authentication status identifier of the first terminal device based on the UAS authentication result of the first terminal device.

The UAS authentication status identifier is used to indicate a UAS authentication status. The UAS authentication status of the first terminal device may include four states: UAS authentication successful, UAS authentication failed, UAS authentication to be completed, and UAS authentication to be performed. For example, when the UAS authentication status identifier is 01, it indicates that the authentication succeeds. When the UAS authentication status identifier is 00, it indicates that the authentication fails. When the UAS authentication status identifier is 10, it indicates that the authentication is to be completed. When the UAS authentication status identifier is 11, it indicates that the authentication is to be performed. The UAS authentication result includes UAS authentication successful and UAS authentication failed. For example, if the UAS authentication result is UAS authentication successful, the UAS authentication status identifier may be updated to 01. Likewise, if the UAS authentication result is UAS authentication failed, the UAS authentication status may be updated to 00. In this optional manner, the second network device may update the UAS authentication status of the first terminal device, so that the UAS authentication status of the first terminal device can be viewed subsequently. It should be noted that the authentication status of UAS authentication successful or UAS authentication failed may be accompanied by information such as a validity period, indicating duration for which the authentication status is valid. If the authentication status is successful or failed and is within the validity period, the authentication does not need to be performed again. If the validity period expires, the authentication status is no longer valid and needs to be updated. A length of the validity period or the like is not limited in this patent.

In an embodiment, the second network device stores a correspondence between the UAS authentication status identifier and the UAS identifier, a subscription permanent identifier (subscriber permanent identifier, SUPI), or a generic public subscription identifier GPSI of the first terminal device. The second network device finds the UAS authentication status identifier of the first terminal device based on the UAS identifier, the SUPI, or the GPSI of the first terminal device, and updates the UAS authentication status identifier of the first terminal device based on the UAS authentication result of the first terminal device. Alternatively, if the second network device does not store the UAS authentication status identifier of the first terminal device, the second network device obtains the UAS authentication status identifier of the first terminal device based on the UAS authentication result, and stores a correspondence between the UAS authentication status identifier of the first terminal device and the UAS identifier, the SUPI, or the GPSI of the first terminal device, so that the UAS authentication status identifier of the first terminal device can be found subsequently based on the UAS identifier, the SUPI, or the GPSI of the first terminal device.

In an embodiment, the first terminal device adds a subscription concealed identifier (SUCI) (or a GUTI) of the first terminal device to the first request sent in step 301. After receiving the first request, the first network device may obtain an SUPI or a GPSI of the first terminal device based on the SUCI (or the GUTI) of the first terminal device, and then send the SUPI or the GPSI of the first terminal device to the second network device. If the second network device may store a correspondence between the UAS authentication status identifier and the SUPI or the GPSI of the first terminal device, the second network device searches for, stores, or updates the UAS authentication status identifier of the first terminal device based on the SUPI or the GPSI that is sent by the first terminal device. If the second network device is located in a core network or the first network device and the second network device belong to a same security domain, the first network device obtains the SUPI of the first terminal device based on the SUCI (or the GUTI) of the first terminal device, and sends the SUPI of the first terminal device to the second network device. Otherwise, the first network device obtains the GPSI of the first terminal device based on the SUCI (or the GUTI) of the first terminal device, and sends the GPSI of the first terminal device to the second network device. Optionally, if the first network device is an AMF, the first network device may send the SUCI (or the GUTI) of the first terminal device to a UDM, and the UDM converts the SUCI (or the GUTI) of the first terminal device into the SUPI or the GPSI of the first terminal device, and then sends the SUPI or the GPSI of the first terminal device to the first network device.

In an embodiment, if the second network device does not store a correspondence between the UAS identifier and the SUPI or the GPSI of the first terminal device, after the authentication on the first terminal device succeeds, the second network device may store the correspondence between the UAS identifier and the SUPI or the GPSI of the first terminal device.

307: The first network device sends the UAS authentication result of the first terminal device to the first terminal device.

Specifically, after receiving the UAS authentication result of the first terminal device, the first network device sends the UAS authentication result of the first terminal device to the first terminal device. Correspondingly, the first terminal device may receive the UAS authentication result of the first terminal device. In an embodiment, if the UAS authentication result is authentication successful, the first terminal device can subsequently use the mobile communications network. If the UAS authentication result is authentication failed, the first terminal device cannot subsequently use the mobile communications network.

In an embodiment, the first network device may further update a UAS authentication status identifier of the first terminal device based on the UAS authentication result of the first terminal device.

In an embodiment, the second network device may send the UAS authentication result of the first terminal device and the SUPI or the GPSI of the first terminal device to the first network device. After receiving the UAS authentication result of the first terminal device and the SUPI or the GPSI of the first terminal device, the first network device may find the UAS authentication status identifier of the first terminal device based on the SUPI or the GPSI of the first terminal device, and update the UAS authentication status identifier of the first terminal device based on the UAS authentication result of the first terminal device. Alternatively, if the first network device does not store the UAS authentication status identifier of the first terminal device, the first network device obtains the UAS authentication status identifier of the first terminal device based on the UAS authentication result, and stores a correspondence between the UAS authentication status identifier of the first terminal device and the SUPI or the GPSI of the first terminal device, so that the UAS authentication status identifier of the first terminal device can be found subsequently based on the SUPI or the GPSI of the first terminal device.

It should be noted that, in an EAP framework, the UAS identifier is carried in the EAP message for transmission, and the first network device (for example, the AMF) does not parse the EAP message in a common implementation. In this case, the first network device does not obtain or store information about the UAS identifier. Therefore, in a manner of storing the UAS authentication status identifier in the first network device, the terminal ID (the SUPI or the GPSI) instead of the UAS identifier needs to be used as the identifier. However, in an optional implementation, if the first network device may read the EAP message, the second network device may send, to the first network device, the UAS authentication result of the first terminal device and the UAS identifier carried in the EAP message. The first network device reads the UAS identifier in the EAP message, and then stores a correspondence between the UAS authentication status identifier and the UAS identifier of the first terminal device, or searches for the UAS authentication status identifier based on the UAS identifier, and updates the UAS authentication status identifier.

In an embodiment, if the first network device does not store a correspondence between the UAS identifier of the first terminal device and the SUPI or the GPSI, after the first network device receives the UAS authentication result of the first terminal device, if the UAS authentication result is authentication successful, the first network device may further store the correspondence between the UAS identifier of the first terminal device and the SUPI or the GPSI.

In an embodiment, step 307 may not be performed. In an embodiment, there may be another execution sequence of step 301 to step 307. An execution sequence of step 301 to step 307 is not limited in this application.

It can be learned that, by implementing the method described in FIG. 3, the second network device may perform identity authentication on the first terminal device based on the UAS identifier of the first terminal device. Because the UAS identifier of the first terminal device is configured by a device vendor, the UAS identifier of the first terminal device is an identifier of the first terminal device. Therefore, authentication is performed on the first terminal device based on the UAS identifier of the first terminal device, so that a first terminal device manufactured by a device vendor that has not signed with an operator can be prevented from using a mobile communications network, or an unmanned aerial system user/unmanned aerial system service/unmanned aerial system business of a service provider or a vertical industry that has not signed with an operator can be prevented from using an unmanned aerial vehicle (or a UAV controller) to access a mobile communications network. This improves security of the mobile communications network. In addition, by implementing this embodiment of this application, an unmanned aerial system device vendor/unmanned aerial system service provider/vertical industry has control and management rights on whether an unmanned aerial system produced/serviced/owned by the unmanned aerial vehicle can access the mobile communications network.

Figure 4A:
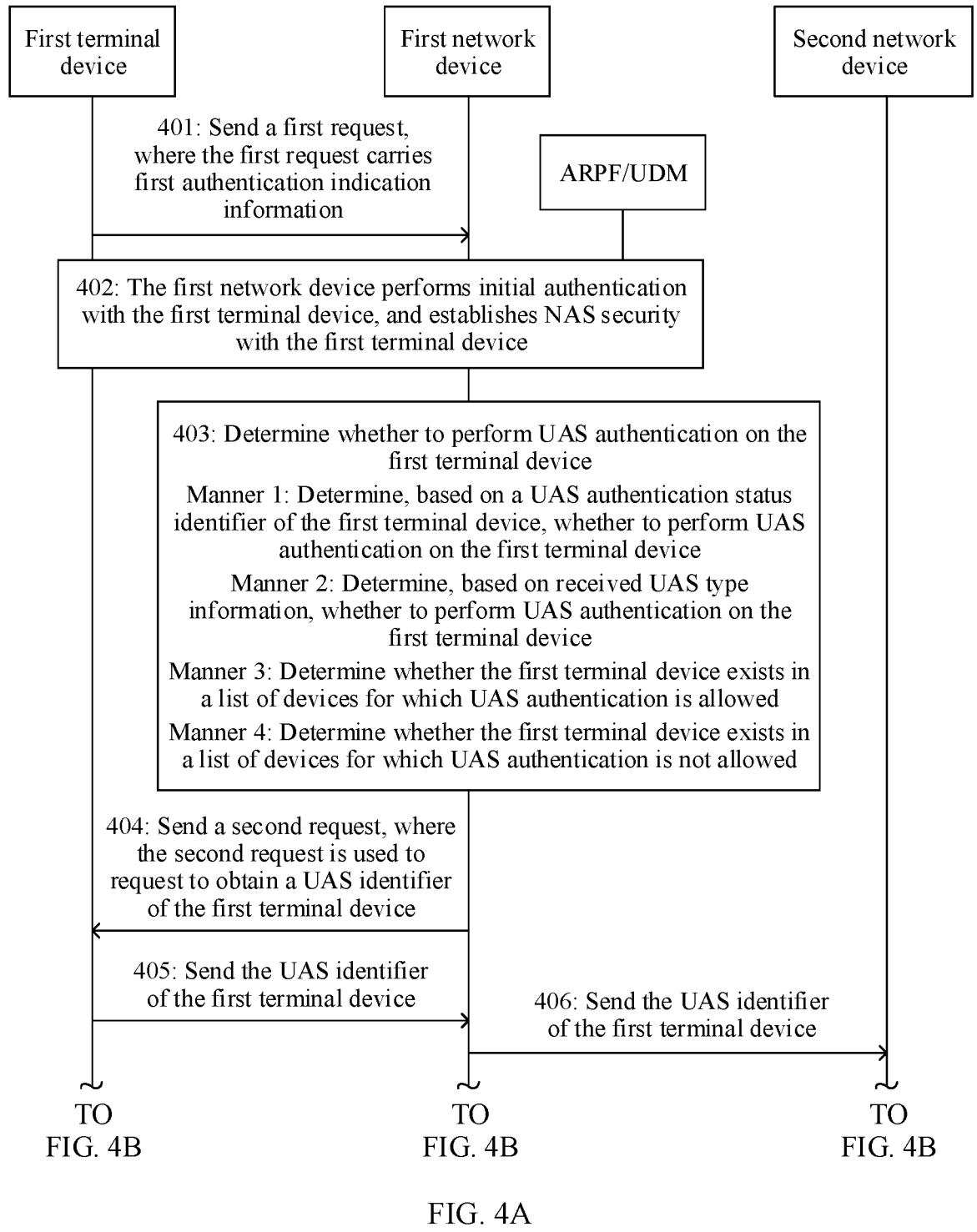

FIG. 4A and FIG. 4B are a schematic flowchart of an identity authentication method according to an embodiment of this application. The identity authentication method shown in FIG. 4A and FIG. 4B is an optimization of the identity authentication method shown in FIG. 3. A difference between the identity authentication method shown in FIG. 4A and FIG. 4B and the identity authentication method shown in FIG. 3 lies in that, in FIG. 4A and FIG. 4B, a first network device needs to determine whether to perform authentication on a first terminal device. If the first network device determines to perform authentication on the first terminal device, the first network device sends a second request to the first terminal device. In addition, a second network device also needs to determine whether to perform authentication on the first terminal device. If the second network device determines to perform authentication on the first terminal device, the second network device performs UAS authentication on the first terminal device based on a UAS identifier of the first terminal device. As shown in FIG. 4A and FIG. 4B, the identity authentication method includes step 401 to step 410.

401: The first terminal device sends a first request to the first network device.

The first request may be a registration request, a service request, or a request of another type. The first request carries first authentication indication information. The first authentication indication information is used to request to perform UAS authentication on the first terminal device. For related descriptions of the first request and the first authentication indication information, refer to the descriptions in 301. Details are not described herein again.

402: The first network device performs initial authentication with the first terminal device, and establishes NAS security with the first terminal device.

In this embodiment of this application, after the first network device performs initial authentication with the first terminal device, and establishes the NAS security with the first terminal device, the first network device determines whether to perform UAS authentication on the first terminal device. Alternatively, step 402 may not be performed. Optionally, step 402 may be performed after step 403.

403: The first network device determines whether to perform UAS authentication on the first terminal device. When determining to perform UAS authentication on the first terminal device, the first network device performs step 404.

In this embodiment of this application, step 403 may not be performed. That is, after the first network device receives the first request, when determining to perform UAS authentication on the first terminal device, the first network device performs step 404.

In an embodiment, when determining not to perform UAS authentication on the first terminal device, the first network device may send a UAS authentication failure message, an indication message indicating that UAS authentication does not need to be performed on the first terminal device, or another indication message to the first terminal device. This is not limited in this embodiment of this application.

The following describes four manners in which the first network device determines whether to perform UAS authentication on the first terminal device. Certainly, the first network device may alternatively determine, in another manner, whether to perform UAS authentication on the first terminal device. This is not limited in this embodiment of this application.

Manner 1: The first network device determines, based on a UAS authentication status identifier of the first terminal device, whether to perform UAS authentication on the first terminal device.

In an embodiment, when a UAS authentication status indicated by the UAS authentication status identifier of the first terminal device is authentication to be performed, the first network device determines to perform UAS authentication on the first terminal device. When the UAS authentication status indicated by the UAS authentication status identifier of the first terminal device is authentication successful or authentication failed, the first network device determines not to perform UAS authentication on the first terminal device.

The first network device may store the UAS authentication status identifier of the first terminal device. The UAS authentication status identifier is used to indicate a UAS authentication status. The UAS authentication status may include: authentication successful, authentication failed, authentication to be completed, and authentication to be performed. For example, when the UAS authentication status identifier is 01, it indicates that the authentication succeeds. When the UAS authentication status identifier is 00, it indicates that the authentication fails. When the UAS authentication status identifier is 10, it indicates that the authentication is to be completed. When the UAS authentication status identifier is 11, it indicates that the authentication is to be performed. If the UAS authentication status indicated by the UAS authentication status identifier of the first terminal device is authentication successful or authentication failed, it indicates that the previous UAS authentication is still valid. Therefore, if the UAS authentication status of the first terminal device is authentication successful or authentication failed, a subsequent UAS authentication procedure may not be performed. If the UAS authentication status indicated by the UAS authentication status identifier of the first terminal device is authentication to be performed, it indicates that UAS authentication has not been performed or the previous UAS authentication fails. Therefore, step 404 may be performed, to perform a subsequent UAS authentication procedure on the first terminal device.

In the manner 1, the first network device may store a correspondence between an SUPI or a GPSI of the first terminal device and the UAS authentication status identifier of the first terminal device. The first request sent by the first terminal device may further carry the SUCI (or the GUTI) of the first terminal device. The first network device obtains an SUPI or a GPSI of the first terminal device based on the SUCI (or the GUTI) of the first terminal device, and then obtains, from the stored UAS authentication status, the UAS authentication status identifier corresponding to the SUPI or the GPSI of the first terminal device.

In an embodiment, if the UAS authentication status of the first terminal device is authentication successful or authentication failed and is valid, the first network device may directly send the UAS authentication status of the first terminal device to the first terminal device.

Manner 2: The first network device determines, based on received UAS type information, whether to perform UAS authentication on the first terminal device.

Figure 5:
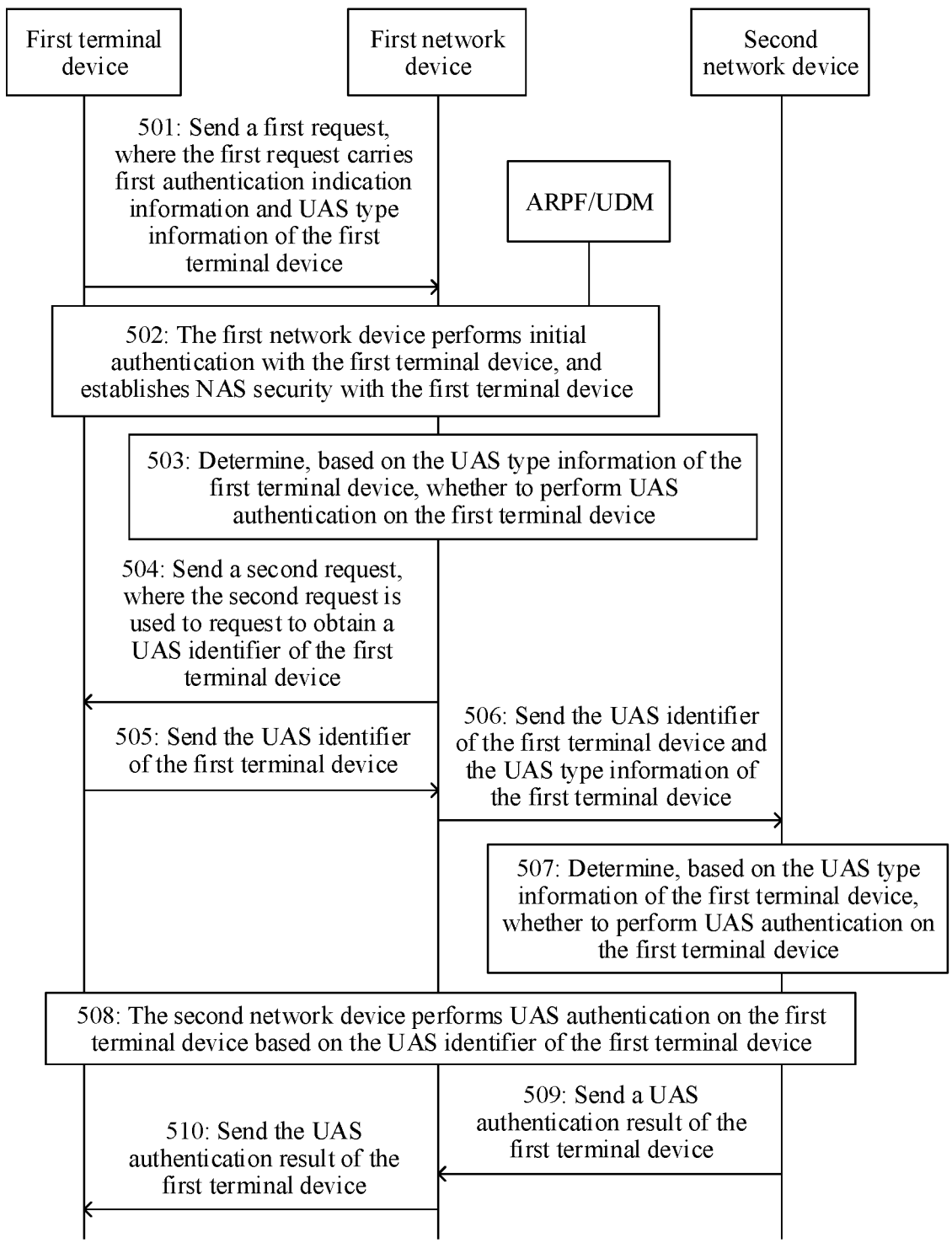
FIG. 5 is a schematic flowchart of a further identity authentication method according to an embodiment of this application.

In the manner 2, as shown in FIG. 5, the first request carries the UAS type information of the first terminal device. If the first authentication indication information is information other than the UAS type information, for example, may be registration type information, the first request may carry the first authentication indication information and the UAS type information. If the first authentication indication information is the UAS type information, the first request carries the first authentication indication information. In FIG. 5, an example in which the first request carries the first authentication indication information and the UAS type information is used.

In an embodiment, when the UAS type information received by the first network device is consistent with UAS type information corresponding to an SUPI or a GPSI of the first terminal device, the first network device determines to perform UAS authentication on the first terminal device. When the UAS type information received by the first network device is inconsistent with the UAS type information corresponding to the SUPI or the GPSI of the first terminal device, the first network device determines not to perform UAS authentication on the first terminal device.

In this possible implementation, the first network device may store the UAS type information corresponding to the SUPI or the GPSI of the first terminal device. Optionally, the UAS type information corresponding to the SUPI or the GPSI of the first terminal device may be understood as UAS type information supported by a smart card (for example, a SIM card) corresponding to the SUPI or the GPSI of the first terminal device. The first request may further carry an SUCI, and the first network device obtains the SUPI or the GPSI of the first terminal device based on the SUCI. The first network device obtains the UAS type information corresponding to the SUPI or the GPSI of the first terminal device.

For example, the first network device stores a correspondence between an SUPI and UAS type information shown in Table 1. As shown in Table 1, UAS type information corresponding to an SUPI 1 is an unmanned aerial vehicle type, UAS type information corresponding to an SUPI 2 is the unmanned aerial vehicle type, and UAS type information corresponding to an SUPI 3 is a UAV controller type. The SUPI 1 and the SUPI 2 belong to an SUPI corresponding to a first-type SIM card, and the SUPI 3 belongs to an SUPI corresponding to a second-type SIM card. The first-type SIM card can be configured only on the unmanned aerial vehicle, and the second-type SIM card can be configured only on the UAV controller. In this case, the SUPI 1 and the SUPI 2 correspond to the unmanned aerial vehicle type, and the SUPI 3 corresponds to the UAV controller type.

TABLE 1

| SUPI of a terminal device | UAS type information |
|---|---|
| SUPI 1 of a terminal device 1 | Unmanned aerial vehicle type |
| SUPI 2 of a terminal device 2 | Unmanned aerial vehicle type |
| SUPI 3 of a terminal device 3 | UAV controller type |

If the UAS type information of the first terminal device that is received by the first network device is the unmanned aerial vehicle type, the received SUCI is an SUCI 1. The first network device obtains the SUPI 1 based on the SUCI 1. The first network device determines, based on Table 1, that the SUPI 1 corresponds to the unmanned aerial vehicle type. Therefore, the first network device determines that the UAS type information received by the first network device is the UAS type information corresponding to the SUPI or the GPSI of the first terminal device.

If the UAS type information received by the first network device is the UAV controller type, the received SUCI is an SUCI 1. The first network device obtains the SUPI 1 based on the SUCI 1. The first network device determines, based on Table 1, that the SUPI 1 corresponds to the unmanned aerial vehicle type. Therefore, the first network device determines that the UAS type information received by the first network device is not the UAS type information corresponding to the SUPI or the GPSI of the first terminal device. It indicates that the first-type SIM card that needs to be configured on the unmanned aerial vehicle is incorrectly used or stolen on the UAV controller. Therefore, if the first network device determines that the UAS type information received by the first network device is inconsistent with the UAS type information corresponding to the SUPI or the GPSI of the first terminal device, the first network device may not continue to perform a subsequent UAS authentication procedure. In this way, the first terminal device can be prevented from using a mobile communications network when the first terminal device incorrectly uses a smart card or uses a stolen smart card.

In another possible implementation, when the UAS type information received by the first network device is not UAS type information corresponding to an SUPI or a GPSI of the first terminal device, the first network device determines to perform UAS authentication on the first terminal device. When the UAS type information received by the first network device is the UAS type information corresponding to the SUPI or the GPSI of the first terminal device, the first network device determines not to perform UAS authentication on the first terminal device. In this possible implementation, the UAS type information corresponding to the SUPI or the GPSI may be understood as UAS type information that is not supported by a smart card corresponding to the SUPI or the GPSI.

In an embodiment, if the first network device does not store the UAS type information corresponding to the SUPI or the GPSI of the first terminal device, the first network device may obtain, from a UDM or the second network device, the UAS type information corresponding to the SUPI or the GPSI of the first terminal device.

In an embodiment, if it is determined that the UAS type information of the first terminal device that is carried in the first request is inconsistent with the UAS type information corresponding to the SUPI or the GPSI of the first terminal device, the first network device may further send a message indicating that the UAS authentication fails. Alternatively, the first terminal device may be notified that the UAS type information of the first terminal device that is carried in the first request is inconsistent with the UAS type information corresponding to the SUPI or the GPSI of the first terminal device. In this way, after receiving the notification, the first terminal device may prompt a user that the smart card (for example, the SIM card) is configured incorrectly.

Manner 3: The first network device determines whether the first terminal device exists in a list of devices for which UAS authentication is allowed. If yes, the first network device determines to perform UAS authentication on the first terminal device. If no, the first network device determines not to perform UAS authentication on the first terminal device. This manner may also be understood as that the first network device stores the list of devices for which UAS authentication is allowed.

In an embodiment, the list that is of devices for which UAS authentication is allowed and that is stored in the first network device is specifically a list of SUPIs of devices for which UAS authentication is allowed. The first request further carries an SUCI of the first terminal device. After receiving the SUCI of the first terminal device, the first network device may obtain an SUPI of the first terminal device based on the SUCI of the first terminal device. The first network device determines whether the SUPI of the first terminal device exists in the stored list of SUPIs of devices for which UAS authentication is allowed. If yes, the first network device determines to perform UAS authentication on the first terminal device. If no, the first network device determines not to perform UAS authentication on the first terminal device. In an embodiment, that UAS authentication does not need to be performed is equivalent to that the authentication succeeds. In another possible implementation, that UAS authentication does not need to be performed is equivalent to that the authentication fails.

For example, the list that is of SUPIs of first terminal devices for which UAS authentication is allowed and that is stored in the first network device is shown in Table 2. As shown in Table 2, a first terminal device 1 to a first terminal device 3 are first terminal devices on which UAS authentication is performed. SUPIs of the first terminal device 1 to the first terminal device 3 are an SUPI 1 to an SUPI 3. The first network device converts the SUCI carried in the first request into an SUPI 4. If the SUPI 4 is the same as any one of the SUPI 1 to the SUPI 3, the first network device determines to perform UAS authentication on the first terminal device. For example, if the SUPI 4 is the same as the SUPI 1, it indicates that the first terminal device that sends the first request is the first terminal device 1. In this case, the first network device determines to perform UAS authentication on the first terminal device that sends the first request. Certainly, if the SUPI 4 is different from any one of the SUPI 1 to the SUPI 3, the first network device determines not to perform UAS authentication on the first terminal device.

TABLE 2

| Sequence number | SUPI of a terminal device on which UAS authentication is performed |
|---|---|
| 1 | SUPI 1 of a terminal device 1 |
| 2 | SUPI 2 of a terminal device 2 |
| 3 | SUPI 3 of a terminal device 3 |

Manner 4: The first network device determines whether the first terminal device exists in a list of devices for which UAS authentication is not allowed. If yes, the first network device determines not to perform UAS authentication on the first terminal device. If no, the first network device determines to perform UAS authentication on the first terminal device. This manner may also be understood as that the first network device stores the black list of devices for which UAS authentication is not allowed.

In an embodiment, the list that is of devices for which UAS authentication is not allowed and that is stored in the first network device is specifically a list of SUPIs of devices for which UAS authentication is not allowed. The first request further carries an SUCI of the first terminal device. After receiving the SUCI of the first terminal device, the first network device may obtain an SUPI of the first terminal device based on the SUCI of the first terminal device. If the SUPI of the first terminal device exists in the list that is of SUPIs of devices for which UAS authentication is not allowed and that is stored in the first network device, the first network device determines not to perform UAS authentication on the first terminal device. If the SUPI of the first terminal device does not exist in the list that is of SUPIs of devices for which UAS authentication is not allowed and that is stored in the first network device, the first network device determines to perform UAS authentication on the first terminal device. In an embodiment, in the manner 4, that the first network device determines not to perform UAS authentication on the first terminal device is equivalent to that the UAS authentication fails.

In an embodiment, the first network device may alternatively send the received SUCI to a UDM. After receiving the SUCI, the UDM may convert the SUCI into an SUPI. The UDM determines whether to perform UAS authentication on the first terminal device. A specific implementation in which the UDM determines whether to perform UAS authentication on the first terminal device is the same as a specific implementation in which the first network device determines whether to perform UAS authentication on the first terminal device in the manner 3 and the manner 4. The UDM may send a determining result to the first network device, and the first network device determines, based on the determining result sent by the UDM, whether to perform UAS authentication on the first terminal device.

In the manner 3 and the manner 4, if the first network device determines not to perform UAS authentication on the first terminal device, the first network device may send, to the first terminal device, a message indicating a UAS authentication result.

In an embodiment, the first network device may further determine, by combining a plurality of the manner 1 to the manner 4, whether to perform UAS authentication on the first terminal device. Alternatively, the first network device may determine, in another manner, whether to perform UAS authentication on the first terminal device. This is not limited in this embodiment of this application.

404: The first network device sends a second request to the first terminal device.

405: The first terminal device sends the UAS identifier of the first terminal device to the first network device in response to the second request.

406: The first network device sends the UAS identifier of the first terminal device to the second network device.

For specific implementations of step 404 to step 406, refer to the specific implementations of step 302 to step 304. Details are not described herein again.

407: The second network device determines whether to perform UAS authentication on the first terminal device.

In this embodiment of this application, after receiving the UAS identifier of the first terminal device, the second network device determines whether to perform UAS authentication on the first terminal device.

In this embodiment of this application, step 407 may not be performed. That is, after the second network device receives the UAS identifier of the first terminal device, when determining to perform UAS authentication on the first terminal device, the second network device performs step 408.

In an embodiment, when determining not to perform UAS authentication on the first terminal device, the second network device may send a UAS authentication failure message to the first network device. The first network device sends the UAS authentication failure message to the first terminal device. Alternatively, when determining not to perform UAS authentication on the first terminal device, the second network device may send, to the first network device, indication information indicating not to perform UAS authentication on the first terminal device (or the authentication succeeds). The first network device sends, to the first terminal device, the indication information indicating not to perform UAS authentication on the first terminal device (or the authentication succeeds). Alternatively, when determining not to perform UAS authentication on the first terminal device, the second network device may send other indication information to the first network device. The first network device sends the other indication information to the first terminal device.

The following describes five manners in which the second network device determines whether to perform UAS authentication on the first terminal device. Certainly, the second network device may alternatively determine, in another manner, whether to perform UAS authentication on the first terminal device. This is not limited in this embodiment of this application.

Manner 1: The second network device determines, based on a UAS authentication status identifier of the first terminal device, whether to perform UAS authentication on the first terminal device.

For a specific implementation principle of the manner 1 of the second network device, refer to the specific implementation principle of the manner 1 of the first network device. Details are not described herein again.

It should be noted that, in the manner 1, the second network device may also store a correspondence between the UAS identifier of the first terminal device and the UAS authentication status identifier of the first terminal device. The second network device obtains, from the stored UAS authentication status, the UAS authentication status identifier corresponding to the UAS identifier of the first terminal device. Then, the second network device determines, based on the obtained UAS authentication status identifier, whether to perform UAS authentication on the first terminal device.

Manner 2: The second network device determines, based on received UAS type information, whether to perform UAS authentication on the first terminal device.

As shown in FIG. 5, the first request further carries the UAS type information of the first terminal device. If the first authentication indication information is information other than the UAS type information, for example, may be registration type information, the first request may carry the first authentication indication information and the UAS type information. If the first authentication indication information is the UAS type information, the first request carries the first authentication indication information. In FIG. 5, an example in which the first request carries the first authentication indication information and the UAS type information is used. The first network device may further send the UAS type information of the first terminal device to the second network device.

Figure 6:
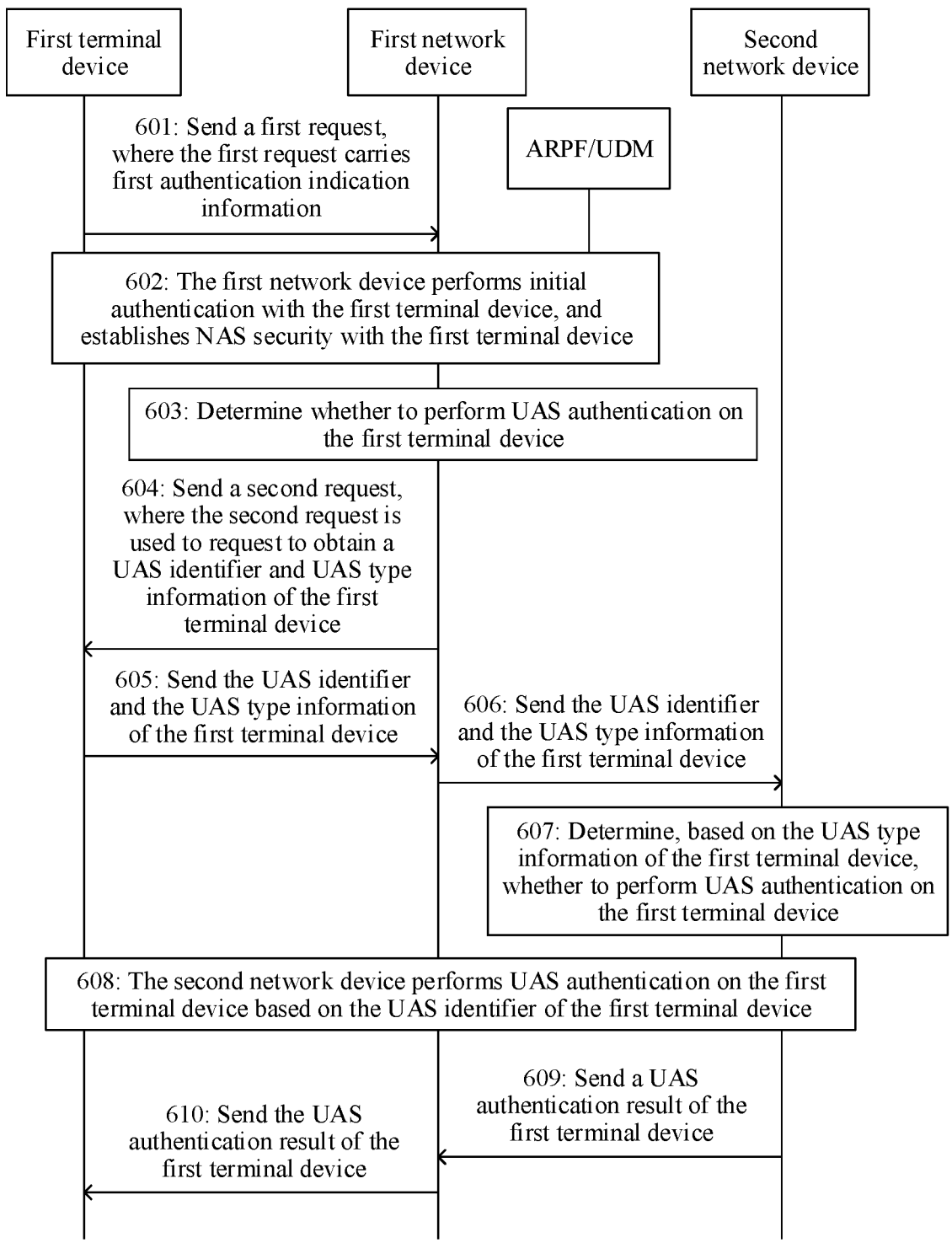
FIG. 6 is a schematic flowchart of still another identity authentication method according to an embodiment of this application.

Alternatively, as shown in FIG. 6, the second request is further used to request to obtain the UAS type information of the first terminal device. After receiving the second request, the first terminal device further sends the UAS type information to the first network device. The first terminal device may send the UAS type information and the UAS identifier of the first terminal device together to the first network device, or may separately send the two pieces of information to the first network device. After receiving the UAS type information and the UAS identifier that are sent by the first terminal device, the first network device sends the UAS type information and the UAS identifier of the first terminal device to the second network device. The UAS type information and the UAS identifier may be sent to the second network device together, or may be sent to the second network device separately.

A specific implementation in which the second network device determines, based on the received UAS type information, whether to perform UAS authentication on the first terminal device is the same as a specific implementation in which the first network device determines, based on the received UAS type information, whether to perform UAS authentication on the first terminal device.

Manner 3: The second network device determines, based on the UAS identifier of the first terminal device and an SUPI or a GPSI of the first terminal device, whether to perform UAS authentication on the first terminal device. In the manner 3, the first request further carries an SUCI (or a GUTI) of the first terminal device. The first network device further sends the SUPI or the GPSI of the first terminal device to the second network device. The SUPI or the GPSI of the first terminal device and the UAS identifier of the first terminal device may be sent together, or may be sent separately, for example, separately sent in two different messages or in different locations, different manners (one is placed in a container and the other is placed outside the container), different information elements, or different containers in a same message.

In an embodiment, a specific implementation in which the second network device determines, based on the UAS identifier of the first terminal device and the SUPI or the GPSI of the first terminal device, whether to perform UAS authentication on the first terminal device is: The second network device determines whether there is a correspondence (or a binding relationship) between the UAS identifier of the first terminal device and the SUPI or the GPSI of the first terminal device. If yes, the second network device determines to perform UAS authentication on the first terminal device. If no, the second network device determines not to perform UAS authentication on the first terminal device. If there is a correspondence between a UAS identifier and an SUPI or a GPSI, it indicates that a smart card (for example, a SIM card) corresponding to the SUPI or the GPSI needs to be bound to a terminal device corresponding to the UAS identifier for use.

If there is a correspondence between the UAS identifier of the first terminal device and the SUPI or the GPSI of the first terminal device, it indicates that a smart card (for example, a SIM card) installed in the first terminal device is a smart card bound to the UAS identifier of the first terminal device for use. Otherwise, it indicates that the smart card (for example, the SIM card) installed in the first terminal device is not the smart card bound to the UAS identifier of the first terminal device. Therefore, in this possible implementation, the second network device performs UAS authentication on the first terminal device only when the smart card (for example, the SIM card) installed in the first terminal device is the smart card bound to the first terminal device. When the smart card (for example, the SIM card) installed in the first terminal device is not the smart card bound to the first terminal device, the second network device does not perform UAS authentication on the first terminal device (which is equivalent to that the authentication fails). Therefore, when the smart card installed in the first terminal device is not the smart card bound to the first terminal device, the first terminal device cannot use the mobile communications network. In this way, the smart card of the first terminal device can be prevented from being randomly replaced or stolen.

For example, a correspondence between a UAS identifier and an SUPI stored in the second network device is shown in Table 3. If the first terminal device is a first terminal device 1, and the first network device sends a UAS identifier 1 and an SUPI 2 to the second network device, the second network device determines that there is no correspondence between the UAS identifier 1 and the SUPI 2 of the first terminal device 1, and the second network device determines that the UAS authentication on the first terminal device fails. If the first network device sends the UAS identifier 1 and an SUPI 1 to the second network device, the second network device determines that there is a correspondence between the UAS identifier and the SUPI of the first terminal device 1, and the second network device continues to perform UAS authentication on the first terminal device. A principle for determining, by the second network device, whether there is a correspondence between the UAS identifier and a GPSI of the first terminal device is the same. Details are not described herein again.

TABLE 3

| UAS identifier | SUPI |
| --- | --- |
| UAS identifier 1 of a terminal device 1 | SUPI 1 |
| UAS identifier 2 of a terminal device 2 | SUPI 2 |
| UAS identifier 3 of a terminal device 3 | SUPI 3 |

Optionally, if the second network device determines that there is no correspondence between the UAS identifier and the SUPI or the GPSI of the first terminal device, the second network device may send, to the first network device, a message indicating that the UAS authentication fails. Alternatively, the first network device may notify the first terminal device that there is no correspondence between the UAS identifier and the SUPI or the GPSI of the terminal device.

Manner 4: The second network device determines whether the first terminal device exists in a list of devices for which UAS authentication is allowed. If yes, the second network device determines to perform UAS authentication on the first terminal device. If no, the second network device determines not to perform UAS authentication on the first terminal device.

Manner 5: The second network device determines whether the first terminal device exists in a list of devices for which UAS authentication is not allowed. If yes, the second network device determines not to perform UAS authentication on the first terminal device. If no, the second network device determines to perform UAS authentication on the first terminal device.

For an implementation principle in which the second network device determines whether to perform UAS authentication on the first terminal device in the manner 4 and the manner 5, refer to the descriptions in which the first network device determines whether to perform UAS authentication on the first terminal device in the manner 3 and the manner 4. Details are not described herein again. It should be noted that the second network device may also perform UAS authentication on the first terminal device based on the UAS identifier or the GPSI of the first terminal device in the manner 4 and the manner 5. An implementation principle thereof is the same as an implementation principle in which the first network device determines, based on the SUPI of the first terminal device in the manner 3 and the manner 4, whether to perform UAS authentication on the first terminal device. Details are not described herein again.

In an embodiment, the second network device may further determine, by combining a plurality of the manner 1 to the manner 5, whether to perform UAS authentication on the first terminal device. Alternatively, the second network device may determine, in another manner, whether to perform UAS authentication on the first terminal device. This is not limited in this embodiment of this application.

408: The second network device performs UAS authentication on the first terminal device based on the UAS identifier.

409: The second network device sends a UAS authentication result of the first terminal device to the first network device.

410: The first network device sends the UAS authentication result of the first terminal device to the first terminal device.

For specific implementations of step 408 to step 410, refer to the specific implementations of step 305 to step 307. Details are not described herein again.

In an embodiment, both step 403 and step 407 may be performed, or only step 403 may be performed, or only step 407 may be performed. Alternatively, step 404 and step 405 may not be performed. Descriptions of step 404 and step 405 are similar to those of step 302 and step 303, and details are not described herein again. Alternatively, step 410 may not be performed.

In an embodiment, there may be another execution sequence of step 401 to step 410. An execution sequence of step 401 to step 410 is not limited in this application.

By implementing the method described in FIG. 4A and FIG. 4B, a terminal device that does not meet a UAS authentication requirement may be first screened out, and UAS authentication is performed only on a terminal device that meets the authentication requirement. This helps reduce an authentication workload of the second network device.

Figure 7:
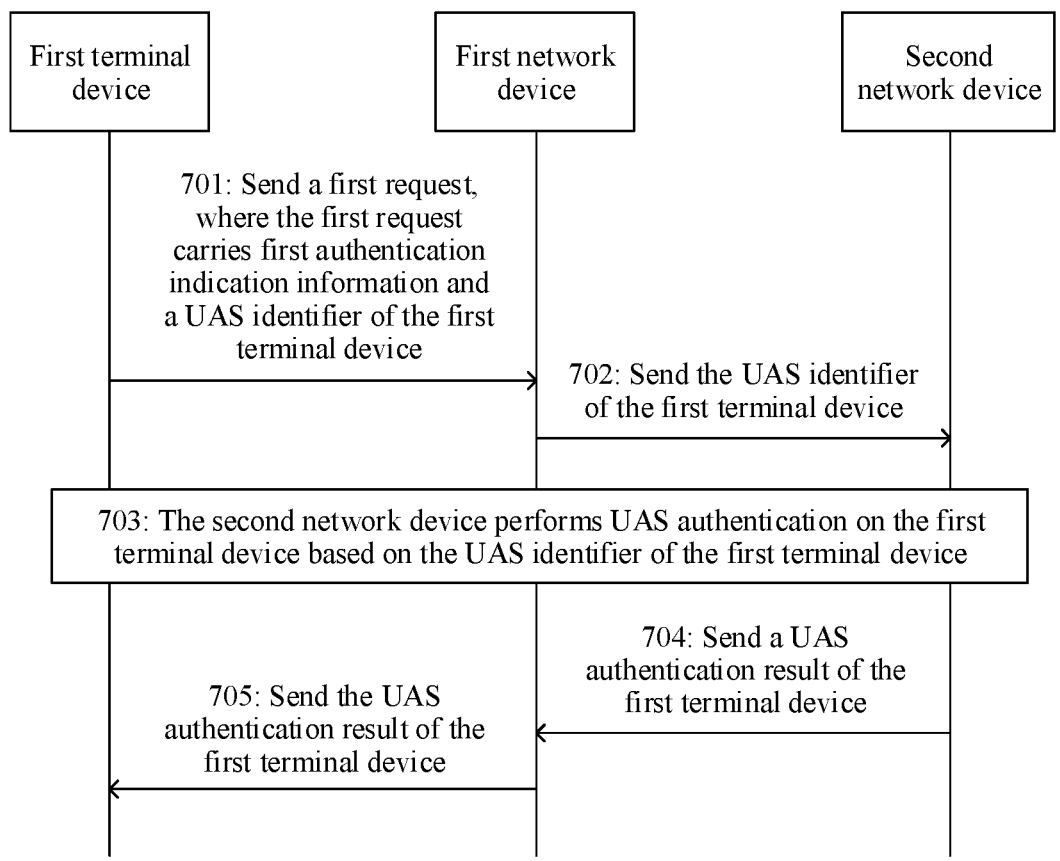
FIG. 7 is a schematic flowchart of a still further identity authentication method according to an embodiment of this application.

FIG. 7 is a schematic flowchart of a still further identity authentication method according to an embodiment of this application. The identity authentication method shown in FIG. 7 and the identity authentication method shown in FIG. 3 are parallel solutions. A difference between the identity authentication method shown in FIG. 7 and the identity authentication method shown in FIG. 3 lies in that, in FIG. 3, the UAS identifier of the first terminal device is obtained by the first network device by using the second request, and in FIG. 7, a first request further carries a UAS identifier of a first terminal device. As shown in FIG. 7, the identity authentication method includes step 701 to step 705.

701: The first terminal device sends a first request to the first network device.

The first request carries first authentication indication information and the UAS identifier of the first terminal device. For related descriptions of the first authentication indication information, refer to the descriptions in step 301. Details are not described herein again.

In an embodiment, the first request carries UAS type information of the first terminal device.

In an embodiment, the first request further carries a subscription concealed identifier (subscription concealed identifier, SUCI) of the first terminal device.

In an embodiment, before performing step 701, the first terminal device performs initial authentication with the first network device, and establishes NAS security with the first network device. After the first terminal device succeeds in the initial authentication and establishes the NAS security with the first network device, a message exchanged between the first terminal device and the first network device has security protection, for example, encryption protection and integrity protection. Therefore, the first terminal device may add the UAS identifier of the first terminal device to the first request, and the UAS identifier of the first terminal device is not disclosed.

It should be noted that, if the first request in this embodiment includes the UAS identifier, the first network device may obtain the UAS identifier without performing an extra step (step 302 and step 303 in FIG. 3) of sending a second request. This improves efficiency and saves network resources.

702: The first network device sends the UAS identifier of the first terminal device to a second network device.

In this embodiment of this application, after receiving the UAS identifier of the first terminal device, the first network device sends the UAS identifier of the first terminal device to the second network device.

In an embodiment, the first network device may add the UAS identifier to an EAP message and send the EAP message to the second network device. Optionally, the first network device may further send a UAS type and/or the identifier SUPI (or a GPSI) of the terminal device to the second network device. Similar to the descriptions in step 303, the UAS type and the SUPI (or the GPSI) need to be sent in a message different from that for sending the UAS identifier, or need to be sent in a location (or a manner) different from that for sending the UAS identifier in a same message.

703: The second network device performs UAS authentication on the first terminal device based on the UAS identifier.

704: The second network device sends a UAS authentication result of the first terminal device to the first network device.

705: The first network device sends the UAS authentication result of the first terminal device to the first terminal device.

For specific implementations of step 703 to step 705, refer to the specific implementations of step 305 to step 307. Details are not described herein again.

In an embodiment, in step 704, when sending the UAS authentication result of the first terminal device to the first network device, the second network device needs to carry the UAS identifier, the UAS type, and/or the SUPI (or the GPSI). The first network device may store and update a UAS authentication status and a UAS authentication status identifier (the UAS identifier, the UAS type, and the SUPI (or the SUPI)) related to the first terminal device.

In an embodiment, step 705 may not be performed. There may be another execution sequence of step 701 to step 705. An execution sequence of step 701 to step 705 is not limited in this application.

Figure 8A:
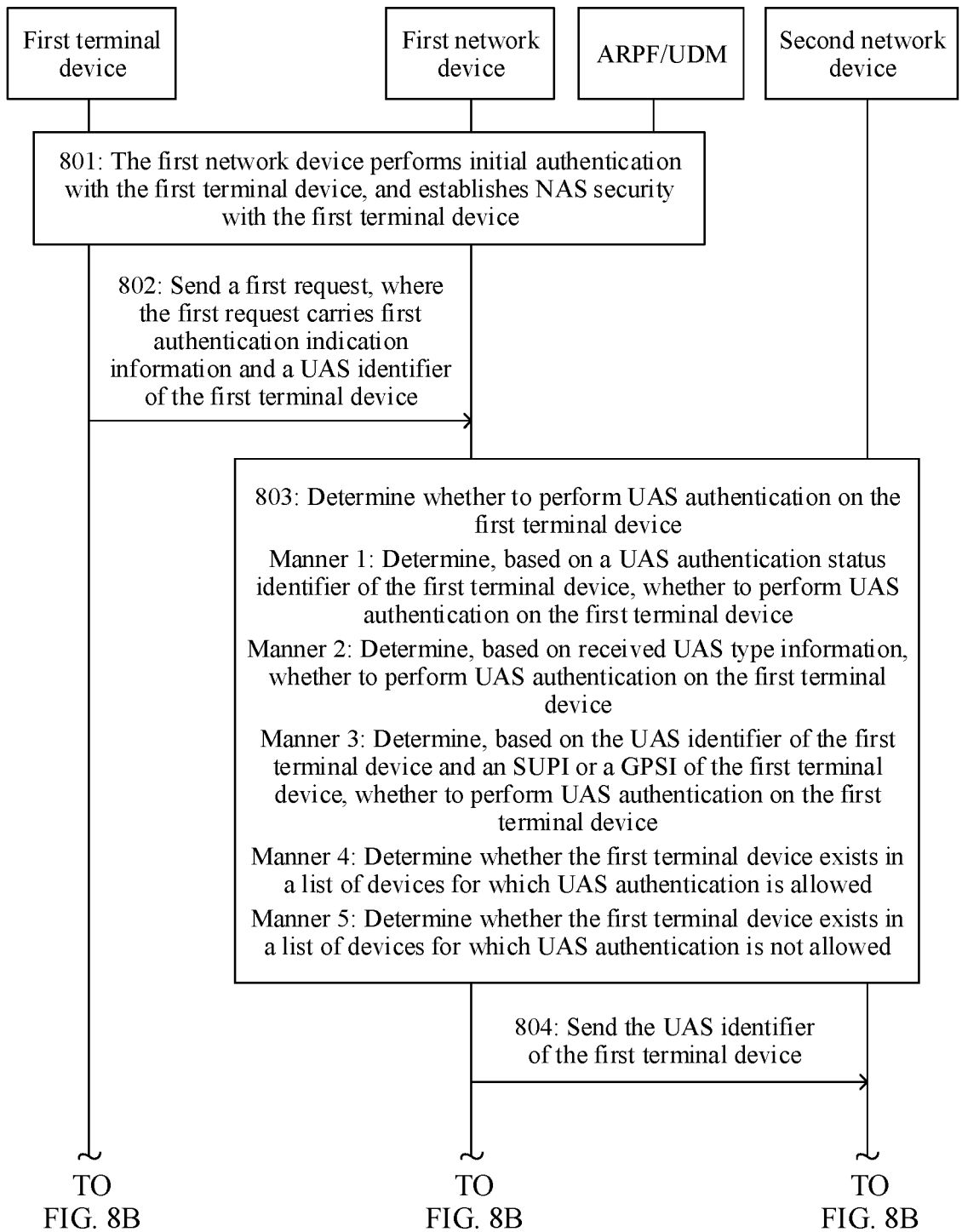
FIG. 8A and FIG. 8B are a schematic flowchart of yet another identity authentication method according to an embodiment of this application.
Figure 8B:
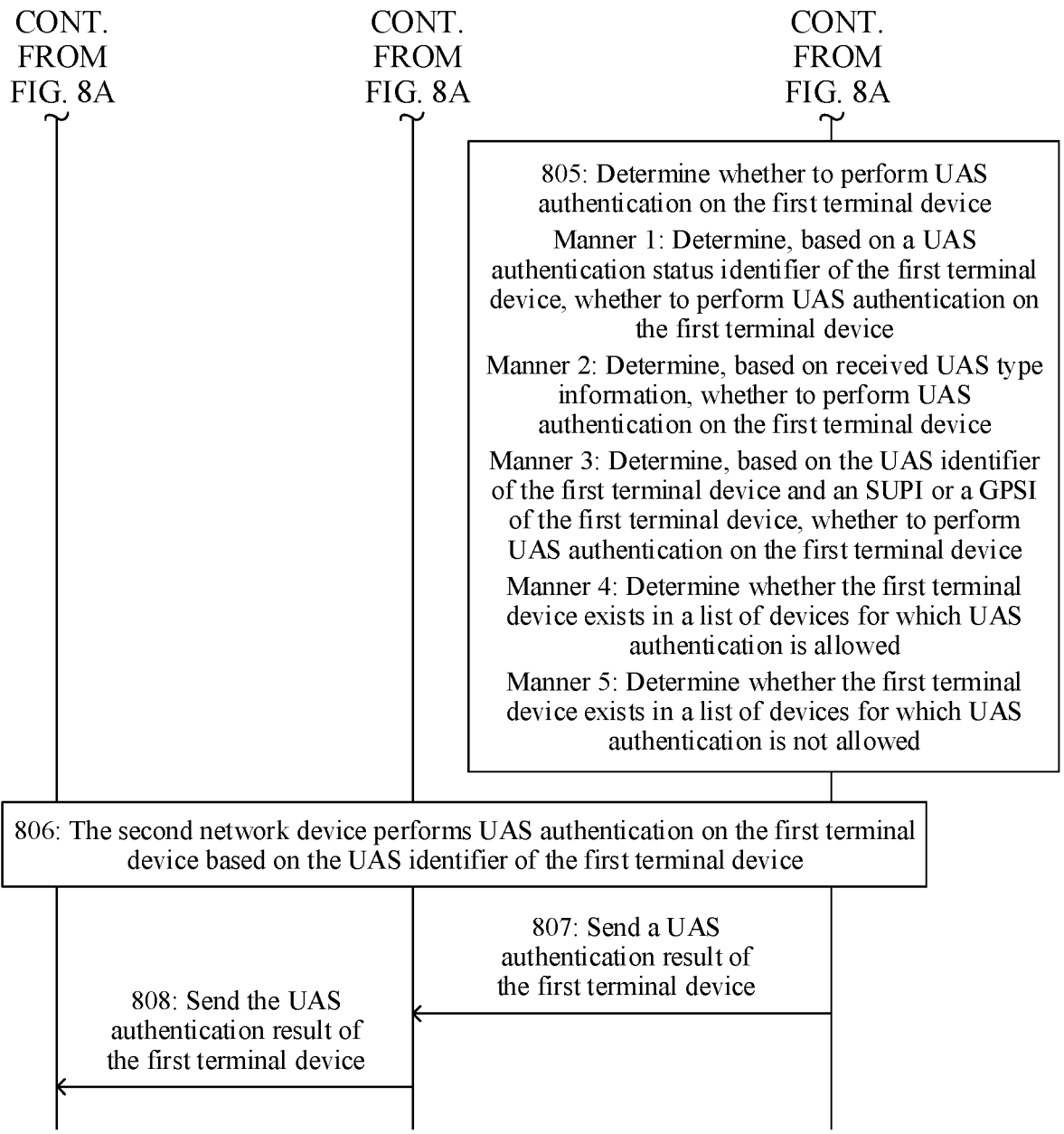

FIG. 8A and FIG. 8B are a schematic flowchart of yet another identity authentication method according to an embodiment of this application. The identity authentication method shown in FIG. 8A and FIG. 8B is an optimization of the identity authentication method shown in FIG. 7. A difference between the identity authentication method shown in FIG. 8A and FIG. 8B and the identity authentication method shown in FIG. 7 lies in that, in FIG. 8A and FIG. 8B, a first network device needs to determine whether to perform authentication on a first terminal device. If the first network device determines to perform authentication on the first terminal device, the first network device sends a UAS identifier of the first terminal device to a second network device. In addition, the second network device also needs to determine whether to perform authentication on the first terminal device. If the second network device determines to perform authentication on the first terminal device, the second network device performs UAS authentication on the first terminal device based on the UAS identifier of the first terminal device. As shown in FIG. 8A and FIG. 8B, the identity authentication method includes step 801 to step 808.

801: The first network device performs initial authentication with the first terminal device, and establishes NAS security with the first terminal device.

802: The first terminal device sends a first request to the first network device.

The first request carries first authentication indication information and the UAS identifier of the first terminal device. For related descriptions of the first authentication indication information, refer to the descriptions in step 301. Details are not described herein again. Optionally, if initial authentication succeeds, a network assigns a globally unique temporary UE identity (GUTI) to a terminal. Therefore, the first request may further carry a GUTI of the first terminal device. An SUPI or a GPSI of the first terminal device that is subsequently used by the first network device may be obtained based on the GUTI of the first terminal device.

803: The first network device determines whether to perform UAS authentication on the first terminal device. When the first network device determines to perform UAS authentication on the first terminal device, step 804 is performed.

For a specific implementation of step 803, refer to the specific implementation of step 403. Details are not described herein again.

804: The first network device sends the UAS identifier of the first terminal device to the second network device.

In an embodiment, the first network device may further send a UAS type and/or an identifier SUPI (or a GPSI) of the first terminal device to the second network device. Similar to the descriptions in step 303, the UAS type and the SUPI (or the GPSI) need to be sent in a message different from that for sending the UAS identifier, or need to be sent in a location (or a manner) different from that for sending the UAS identifier in a same message.

805: The second network device determines whether to perform UAS authentication on the first terminal device. When the second network device determines to perform UAS authentication on the first terminal device, step 806 is performed.

For specific implementations of step 804 and step 805, refer to the specific implementations of step 406 and step 407.

806: The second network device performs UAS authentication on the first terminal device based on the UAS identifier.

807: The second network device sends a UAS authentication result of the first terminal device to the first network device.

808: The first network device sends the UAS authentication result of the first terminal device to the first terminal device.

For specific implementations of step 806 to step 808, refer to the specific implementations of step 305 to step 307. Details are not described herein again.

In an embodiment, in step 807, when sending the UAS authentication result of the first network device to the first network device, the second network device may carry the UAS identifier, the UAS type, and/or the SUPI (or the GPSI). The first network device may store and update a UAS authentication status and a UAS authentication status identifier (the UAS identifier, the UAS type, and the SUPI (or the GPSI)) related to the first terminal device.

In an embodiment, both step 803 and step 805 may be performed, or one of step 803 and step 805 may be performed.

In an embodiment, step 808 may not be performed. There may be another execution sequence of step 801 to step 808. An execution sequence of step 801 to step 808 is not limited in this application.

By implementing the method described in FIG. 8A and FIG. 8B, a terminal device that does not meet an authentication requirement may be first screened out, and UAS authentication is performed only on a terminal device that meets the authentication requirement. This helps reduce authentication workloads of the first network device and the second network device.

Figure 9A:
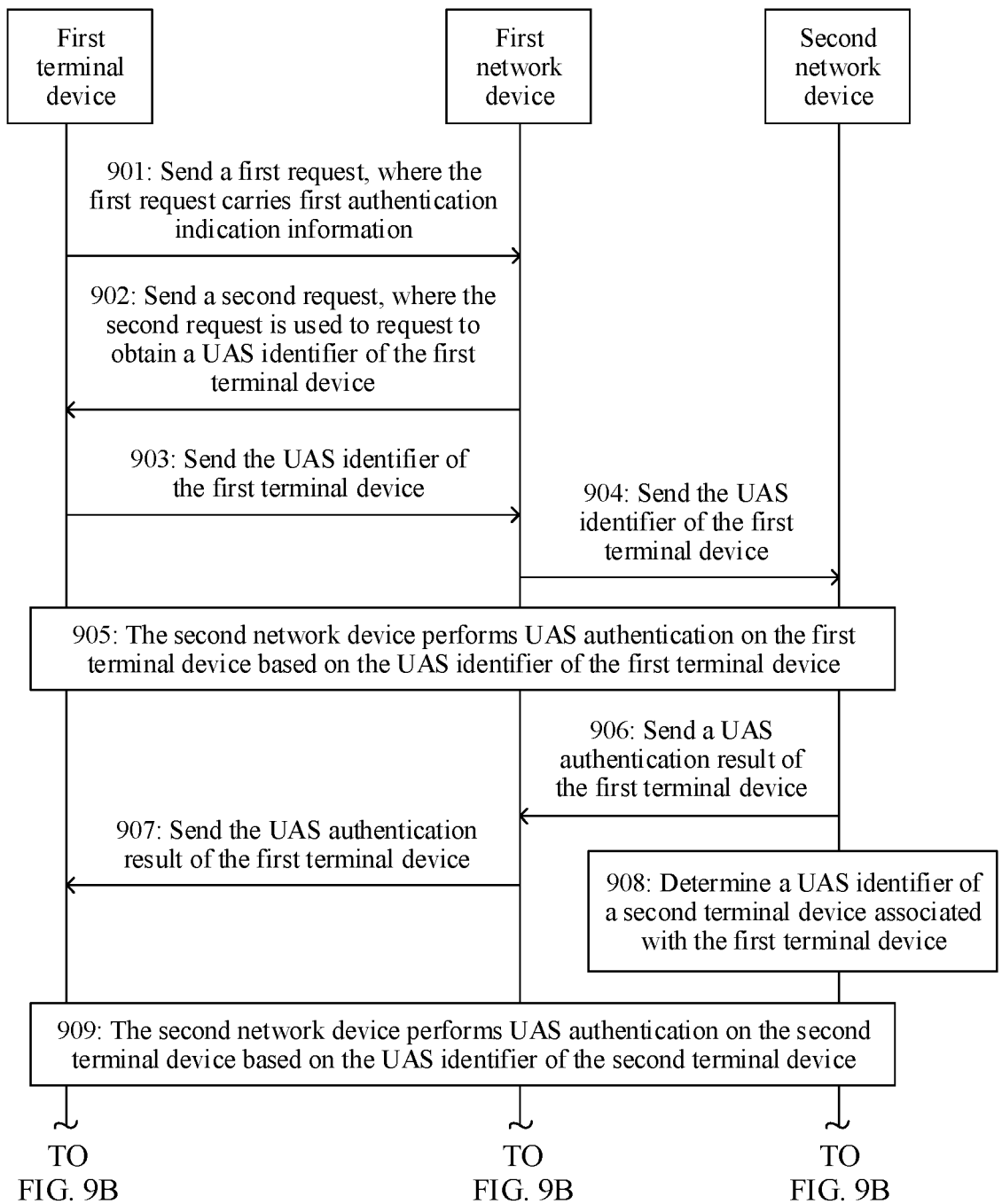
FIG. 9A and FIG. 9B are a schematic flowchart of a yet further identity authentication method according to an embodiment of this application.
Figure 9B:
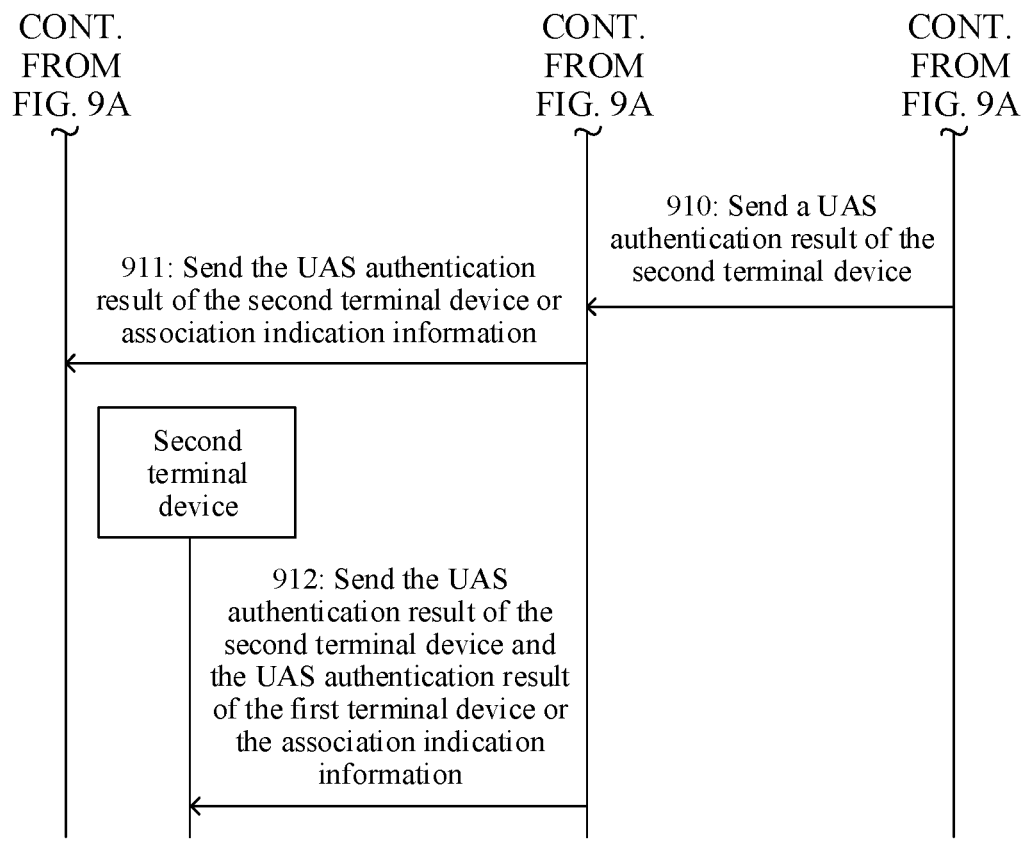

FIG. 9A and FIG. 9B are a schematic flowchart of a yet further another identity authentication method according to an embodiment of this application. The identity authentication method shown in FIG. 9A and FIG. 9B is an optimization of the identity authentication method shown in FIG. 3. A difference between the identity authentication method shown in FIG. 9A and FIG. 9B and the identity authentication method shown in FIG. 3 lies in that, in FIG. 9A and FIG. 9B, a second network device stores an association relationship (or a pairing relationship, a correspondence, or a binding relationship) between a first terminal device and a second terminal device. In the solution shown in FIG. 9A and FIG. 9B, in addition to performing authentication on the first terminal device and the second terminal device, authorization or authentication further needs to be performed on the association relationship between the first terminal device and the second terminal device, that is, it is determined whether the association relationship between the first terminal device and the second terminal device is available or valid. If the authorization or authentication on the association relationship between the first terminal device and the second terminal device succeeds, the first terminal device and the second terminal device may be paired for use. Otherwise, the first terminal device and the second terminal device cannot be paired for use. The first terminal device may be an unmanned aerial vehicle, and the second terminal device may be a UAV controller. Alternatively, the first terminal device may be a UAV controller, and the second terminal device may be an unmanned aerial vehicle. UAS type information of the first terminal device is different from that of the second terminal device. As shown in FIG. 9A and FIG. 9B, the identity authentication method includes step 901 to step 912.

901: The first terminal device sends a first request to a first network device.

The first request carries first authentication indication information. The first authentication indication information is used to request to perform UAS authentication on the first terminal device.

902: The first network device sends a second request to the first terminal device.

In this embodiment of this application, after receiving the first request, the first network device sends the second request to the first terminal device. The second request is used to request to obtain a UAS identifier of the first terminal device.

903: The first terminal device sends the UAS identifier of the first terminal device to the first network device in response to the second request.

904: The first network device sends the UAS identifier of the first terminal device to a second network device.

905: The second network device performs UAS authentication on the first terminal device based on the UAS identifier of the first terminal device.

906: The second network device sends a UAS authentication result of the first terminal device to the first network device.

907: The first network device sends the UAS authentication result of the first terminal device to the first terminal device.

For specific implementations of step 901 to step 907, refer to the specific implementations of step 301 to step 307. Details are not described herein again.

908: The second network device determines a UAS identifier of the second terminal device associated with the first terminal device.

In this embodiment of this application, after receiving the UAS identifier of the first terminal device, the second network device determines the UAS identifier of the second terminal device associated with the first terminal device. Step 908 to step 910 may be performed after step 904 and before step 905 or step 906. Alternatively, step 908 to step 910 may be performed after step 906. Alternatively, step 908 to step 910 and step 905 or step 906 may be performed at the same time. This is not limited in this embodiment of this application. In FIG. 9A and FIG. 9B, an example in which step 908 is performed after step 906 is used.

In this embodiment of this application, the second network device prestores an association relationship between the first terminal device and the second terminal device. The association relationship may also be referred to as a correspondence, a pairing relationship, or a binding relationship. For ease of description, the following uses the association relationship as an example for description. Optionally, the association relationship between the first terminal device and the second terminal device stored in the second network device may be configured in the second network device when the first terminal device and the second terminal device are delivered from factory. Alternatively, the association relationship between the first terminal device and the second terminal device may be stored in the second network device after the first terminal device and the second terminal device are previously associated successfully. Alternatively, the association relationship between the first terminal device and the second terminal device may be stored in the second network device after a UAS service provider performs association when signing with a network operator. A method for configuring the association relationship in the second network is not limited in the present disclosure. No enumeration is provided herein.

A form in which the second network device stores the association relationship between the first terminal device and the second terminal device may be: storing an association relationship between the UAS identifier of the first terminal device and the UAS identifier of the second terminal device. Therefore, the second network device may determine the UAS identifier of the second terminal device based on the UAS identifier of the first terminal device. Further, the second network device may determine an SUPI or a GPSI of the second terminal device based on a binding relationship (for example, described in Table 3) between the UAS identifier and the terminal identifier SUPI or GPSI.

For example, an association relationship between an unmanned aerial vehicle and a UAV controller stored in the second network device may be shown in Table 4. One UAV controller may be associated with one or more unmanned aerial vehicles, and one unmanned aerial vehicle may also be associated with one or more UAV controllers. As shown in Table 4, there is an association relationship between a UAV controller 1 and each of an unmanned aerial vehicle 1 and an unmanned aerial vehicle 2, and there is an association relationship between a UAV controller 2 and an unmanned aerial vehicle 3. The second network device stores an association relationship between a UAS identifier 4 of the UAV controller 1 and each of a UAS identifier 1 of the unmanned aerial vehicle 1 and a UAS identifier 2 of the unmanned aerial vehicle 2, and stores an association relationship between a UAS identifier 5 of the UAV controller 2 and a UAS identifier 3 of the unmanned aerial vehicle 3. Therefore, if the first terminal device is the unmanned aerial vehicle 1, it may be determined, based on the association relationship in Table 4, that the UAS identifier of the second terminal device is the UAS identifier 4. If the first terminal device is the UAV controller 1, there are two second terminal devices: the unmanned aerial vehicle 1 and the unmanned aerial vehicle 2. According to the association relationship in Table 4, the UAS identifier 1 of the unmanned aerial vehicle 1 and the UAS identifier 2 of the unmanned aerial vehicle 2 may be obtained based on the UAS identifier 4. If there is an association relationship shown in Table 3 between a UAS identifier and an SUPI, according to the association relationship in Table 4, an SUPI identifier 1 of the unmanned aerial vehicle 1 and an SUPI identifier 2 of the unmanned aerial vehicle 2 may be obtained based on the UAS identifier 4.

TABLE 4

| UAS identifier of an unmanned aerial vehicle | UAS identifier of a UAV controller |
| --- | --- |
| UAS identifier 1 of an unmanned aerial vehicle 1 | UAS identifier 4 of a UAV controller 1 |
| UAS identifier 2 of an unmanned aerial vehicle 2 | |
| UAS identifier 3 of an unmanned aerial vehicle 3 | UAS identifier 5 of a UAV controller 2 |

Optionally, the first request further carries device indication information, and the device indication information is used to determine a second terminal device. For example, there are a plurality of second terminal devices associated with the first terminal device, and the device indication information may indicate a quantity of second terminal devices that need to be associated, and sequence numbers, names, or the like of the second terminal devices, to determine, from the plurality of second terminal devices, a second terminal device that needs to be associated with the first terminal device.

909: The second network device performs UAS authentication on the second terminal device based on the UAS identifier of the second terminal device.

In this embodiment of this application, after determining the UAS identifier (and the second terminal identifier SUPI) of the second terminal device associated with the first terminal device, the second network device performs UAS authentication on the second terminal device based on the UAS identifier (and the second terminal identifier SUPI) of the second terminal device. A principle in which the second network device performs UAS authentication on the second terminal device based on the UAS identifier of the second terminal device is the same as the principle in which the first network device performs UAS authentication on the first terminal device based on the UAS identifier of the first terminal device. Details are not described herein again.

910: The second network device sends a UAS authentication result of the second terminal device to the first network device.

In this embodiment of this application, after the second network device performs UAS authentication on the second terminal device based on the UAS identifier of the second terminal device, the second network device sends the UAS authentication result of the second terminal device to the first network device.

In an embodiment, when sending the UAS authentication result of the first terminal device to the first network device, the second network device may further send the UAS identifier, the SUPI, or the GPSI of the first terminal device to the first network device, to indicate that the UAS authentication result received by the first network device is the UAS authentication result of the first terminal device. Likewise, when sending the UAS authentication result of the second terminal device to the first network device, the second network device may further send the UAS identifier, the SUPI, or the GPSI of the second terminal device to the first network device, to indicate that the UAS authentication result received by the first network device is the UAS authentication result of the second terminal device.

In an embodiment, when sending the UAS authentication result of the first terminal device to the first network device, the second network device may further send the UAS identifier, the SUPI, or the GPSI of the second terminal device to the first network device, to indicate that the first terminal device is associated with the second terminal device; and/or, when sending the UAS authentication result of the second terminal device to the first network device, the second network device may further send the UAS identifier, the SUPI, or the GPSI of the first terminal device to the first network device, to indicate that the first terminal device is associated with the second terminal device. Therefore, the first network device also sends the UAS authentication result of the first terminal device to the second terminal device, and also sends the UAS authentication result of the second terminal device to the first terminal device. In addition, the first network device may store the association relationship between the first terminal device and the second terminal device.

911: The first network device sends the UAS authentication result of the second terminal device or association indication information to the first terminal device.

In this embodiment of this application, after receiving the UAS authentication result of the second terminal device that is sent by the second network device, the first network device sends the UAS authentication result of the second terminal device or the association indication information to the first terminal device (determines the first terminal device based on the SUPI or the UAS identifier of the first terminal).

The association indication information indicates whether the first terminal device is successfully associated with the second terminal device. The association indication information is obtained based on the UAS authentication result of the first terminal device and the UAS authentication result of the second terminal device. For example, if both the UAS authentication result of the first terminal device and the UAS authentication result of the second terminal device indicate that the authentication succeeds, the association indication information indicates that the first terminal device is successfully associated with the second terminal device. Otherwise, the association indication information indicates that the first terminal device fails to be associated with the second terminal device. The first network device may alternatively directly send the UAS authentication result of the second terminal device to the first terminal device. The first terminal device determines, based on the UAS authentication result of the first terminal device and the UAS authentication result of the second terminal device, whether the first terminal device is successfully associated with the second terminal device.

912: The first network device sends the UAS authentication result of the second terminal device and the UAS authentication result of the first terminal device or the association indication information to the second terminal device.

In this embodiment of this application, after receiving the UAS authentication result of the second terminal device that is sent by the second network device, the first network device sends the UAS authentication result of the second terminal device and the UAS authentication result of the first terminal device to the second terminal device, or sends the UAS authentication result of the second terminal device and the association indication information to the second terminal device.

In an embodiment, step 906 and step 910 may be performed at the same time. To be specific, after obtaining the UAS authentication result of the first terminal device and the UAS authentication result of the second terminal device, the second network device may add the UAS authentication result of the first terminal device and the UAS authentication result of the second terminal device to a same message, and send the message to the first network device. Then, the first network device sends the message to the first terminal device and the second terminal device. The message may further include the UAS identifier, the SUPI, or the GPSI of the first terminal device, and the UAS identifier, the SUPI, or the GPSI of the second terminal device. The UAS identifier, the SUPI, or the GPSI of the first terminal device is used to determine the first terminal device and identify the UAS authentication result of the first terminal device, and the UAS identifier, the SUPI, or the GPSI of the second terminal device is used to determine the second terminal device and identify the UAS authentication result of the second terminal device. The second network device may determine the SUPI or the GPSI of the second terminal device based on the SUPI or the GPSI of the first terminal device. Alternatively, the second network device may determine the SUPI or the GPSI of the second terminal device based on the UAS identifier of the second terminal device.

In an embodiment, when step 906 is performed before step 910, after receiving the UAS authentication result of the first terminal device, the first network device may first send the UAS authentication result of the first terminal device to the first terminal device. After receiving the UAS authentication result of the second terminal device, the first network device sends the UAS authentication result of the second terminal device or the association indication information to the first terminal device. Alternatively, after receiving the UAS authentication result of the first terminal device, the first network device does not send the UAS authentication result of the first terminal device. When receiving the UAS authentication result of the second terminal device, the first network device sends the UAS authentication result of the first terminal device and the UAS authentication result of the second terminal device or the association indication information to the first terminal device in a same message. When receiving the UAS authentication result of the second terminal device, the first network device may send the UAS authentication result of the second terminal device and the UAS authentication result of the first terminal device or the association indication information to the second terminal device in a same message.

In an embodiment, when step 906 is performed after step 910, after receiving the UAS authentication result of the second terminal device, the first network device may first send the UAS authentication result of the second terminal device to the second terminal device. After receiving the UAS authentication result of the first terminal device, the first network device sends the UAS authentication result of the first terminal device or the association indication information to the first terminal device. Alternatively, after receiving the UAS authentication result of the second terminal device, the first network device does not send the UAS authentication result of the second terminal device. When receiving the UAS authentication result of the first terminal device, the first network device sends the UAS authentication result of the second terminal device and the UAS authentication result of the first terminal device or the association indication information to the second terminal device in a same message. When receiving the UAS authentication result of the first terminal device, the first network device may send the UAS authentication result of the first terminal device and the UAS authentication result of the second terminal device or the association indication information to the first terminal device in a same message.

In an embodiment, step 906 is performed before step 910. In step 907, a UAS authentication status identifier used to indicate that a UAS authentication status of the second terminal device is authentication to be completed is further sent. Likewise, if step 906 is performed after step 910, in step 912, the first network device sends, to the second terminal device, the UAS authentication result of the second terminal device and a UAS authentication status identifier used to indicate that a UAS authentication status of the first terminal device is authentication to be completed.

In an embodiment, before step 905 is performed, it may be determined whether to perform UAS authentication on the second terminal device. If it is determined to perform UAS authentication on the second terminal device, step 905 is performed. Optionally, before performing UAS authentication on the second terminal device based on the UAS identifier of the second terminal device, the second network device may further determine whether to perform UAS authentication on the second terminal device. If the second network device determines to perform UAS authentication on the second terminal device, step 909 is performed. For a specific implementation in which the second network device determines whether to perform UAS authentication on the first terminal device or the second terminal device, refer to the specific implementation in which the second network device determines whether to perform UAS authentication on the first terminal device in the embodiment corresponding to FIG. 4A and FIG. 4B. Optionally, if the second network device determines not to allow UAS authentication for the first terminal device and the second terminal device, the second network device sends indication information to the first network device, where the indication information indicates that the first terminal device fails to be associated with the second terminal device. The first network device sends the indication information to the first terminal device and the second terminal device.

In an embodiment, after receiving the UAS identifier of the first terminal device, the second network device may first perform step 908, that is, determine the UAS identifier of the second terminal device associated with the first terminal device. After performing step 908, the second network device determines, based on locations of the first terminal device and the second terminal device and a distance between the first terminal device and the second terminal device, whether to perform UAS authentication on the first terminal device and the second terminal device. For example, if the distance between the first terminal device and the second terminal device is less than or equal to a preset distance, it is determined to perform UAS authentication on the first terminal device and the second terminal device, and the first network device performs step 905 and step 909. If the distance between the first terminal device and the second terminal device is greater than the preset distance, it is determined not to perform UAS authentication on the first terminal device and the second terminal device. Optionally, when determining not to perform UAS authentication on the first terminal device and the second terminal device, the second network device may send indication information to the first terminal device, where the indication information may indicate that the first terminal device fails to be associated with or is invalidly associated with the second terminal device. The first network device sends the indication information to the first terminal device and the second terminal device.

In an embodiment, after receiving the UAS authentication result of the first terminal device and the UAS authentication result of the second terminal device, the first network device may not send the UAS authentication result of the first terminal device and the UAS authentication result of the second terminal device to the first terminal device or the second terminal device. The first network device may send the association indication information to the first terminal device and the second terminal device, to indicate whether the first terminal device is successfully associated with the second terminal device.

In an embodiment, the second terminal device may alternatively actively initiate UAS authentication. A procedure in which the second terminal device actively initiates UAS authentication is similar to that in step 901 to step 906, that is, the first terminal device in step 901 to step 906 is replaced with the second terminal device. The first network device may store the association relationship between the first terminal device and the second terminal device. After receiving the UAS authentication result of the first terminal device and the UAS authentication result of the second terminal device, the first network device may send the UAS authentication result of the first terminal device and the UAS authentication result of the second terminal device to the first terminal device and the second terminal device. Alternatively, the association relationship between the first terminal device and the second terminal device may be stored in the second network device. When the second network device sends the UAS authentication result of the first terminal device, the identifier (for example, the UAS identifier, the SUPI, or the GPSI) of the second terminal device is indicated. When the second network device sends the UAS authentication result of the second terminal device, the identifier (for example, the UAS identifier, the SUPI, or the GPSI) of the first terminal device is indicated. After receiving the UAS authentication result of the first terminal device and the UAS authentication result of the second terminal device, the first network device may send the UAS authentication result of the first terminal device and the UAS authentication result of the second terminal device to the first terminal device and the second terminal device.

It should be noted that step 901 to step 903 in the solution shown in FIG. 9A and FIG. 9B may also be replaced with step 701 in FIG. 7, to improve efficiency and save network resources.

In an embodiment, there may be another execution sequence of step 901 to step 912. An execution sequence of step 901 to step 912 is not limited in this application.

By implementing the method described in FIG. 9A and FIG. 9B, UAS authentication can be performed on the first terminal device and the second terminal device, and authentication or authorization can be performed on the stored association relationship between the first terminal device and the second terminal device.

Figure 10A:
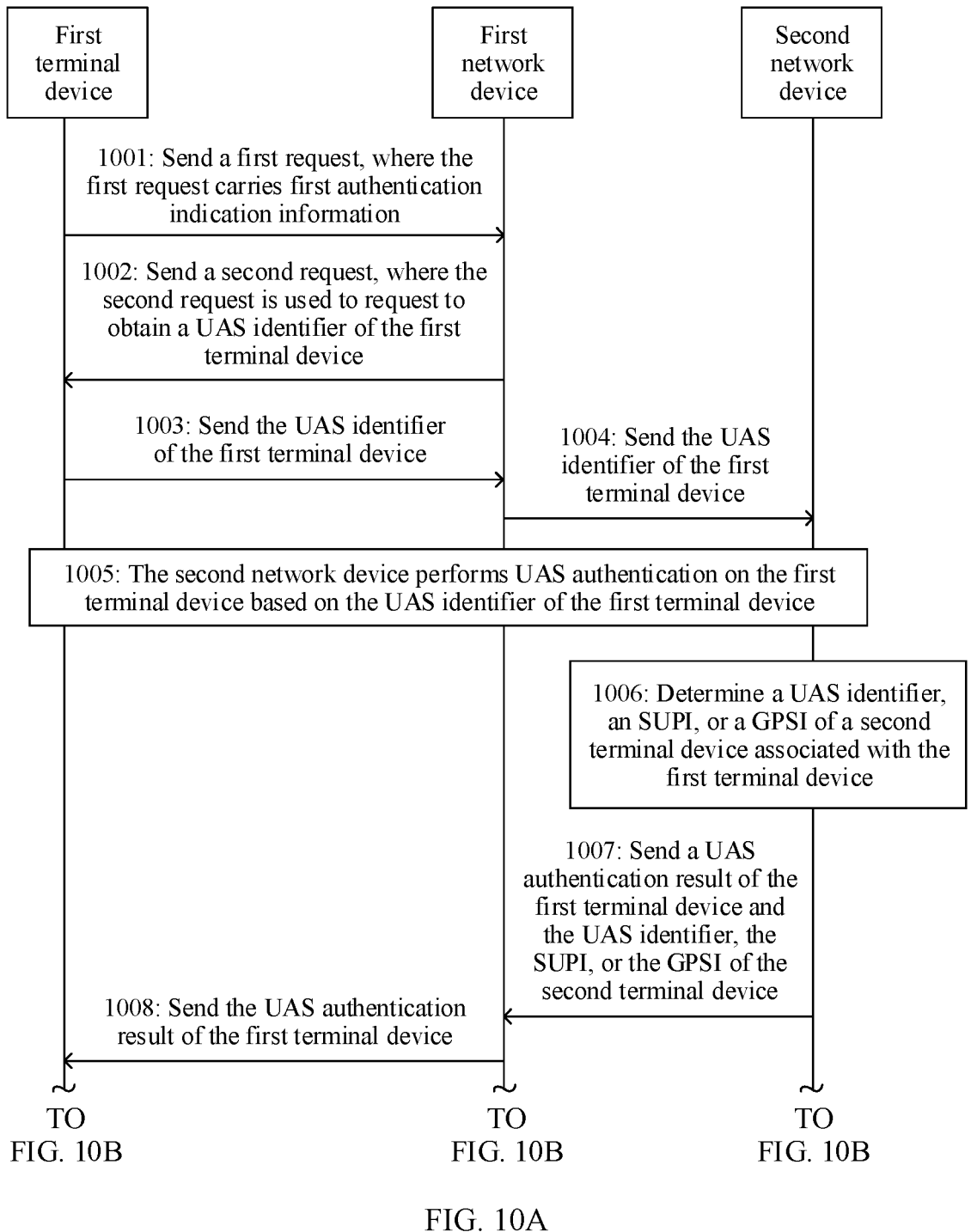
FIG. 10A and FIG. 10B are a schematic flowchart of even another identity authentication method according to an embodiment of this application.
Figure 10B:
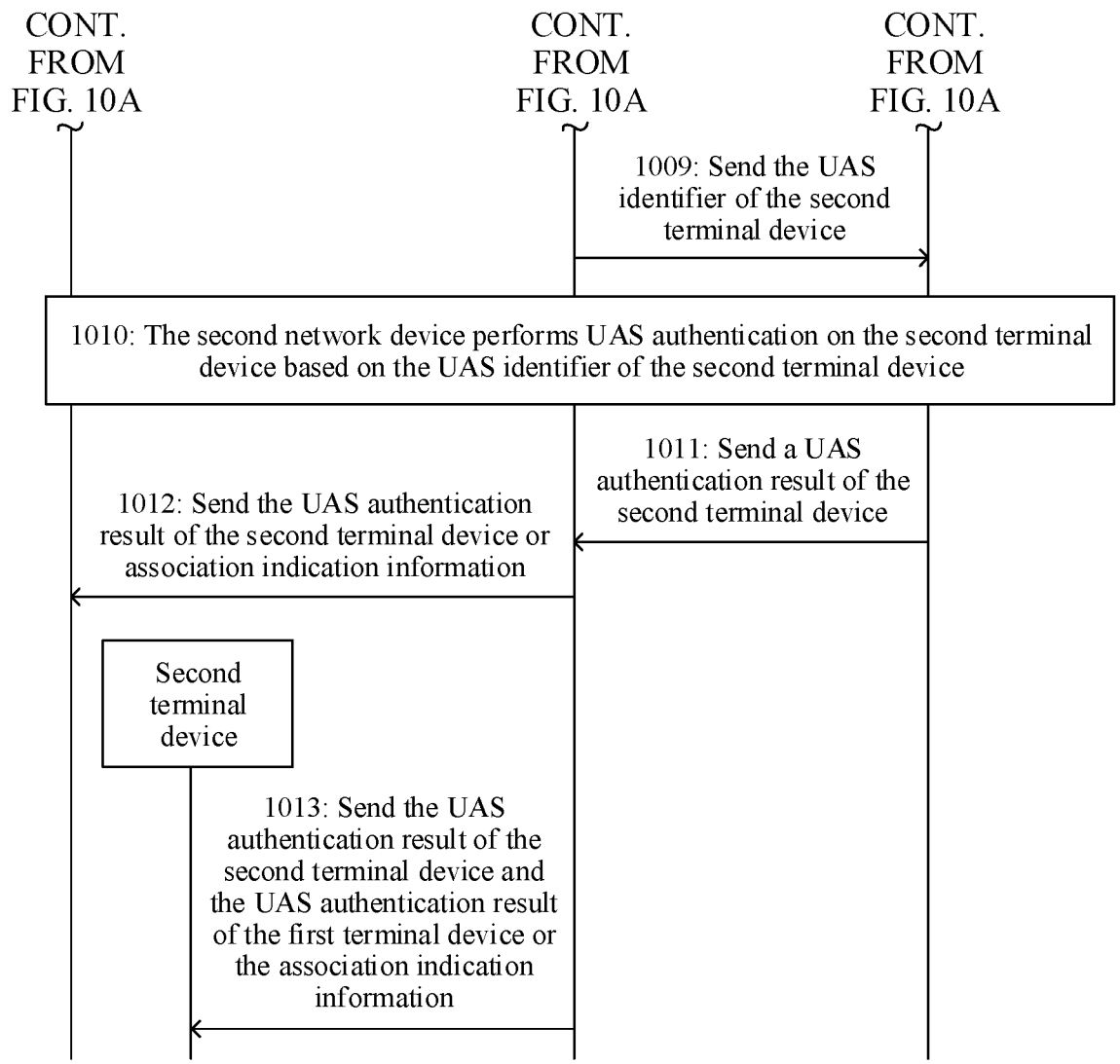

FIG. 10A and FIG. 10B are a schematic flowchart of even another identity authentication method according to an embodiment of this application. The identity authentication method shown in FIG. 10A and FIG. 10B and the identity authentication method shown in FIG. 9A and FIG. 9B are parallel solutions. A difference between the identity authentication method shown in FIG. 10A and FIG. 10B and the identity authentication method shown in FIG. 9A and FIG. 9B lies in that, in the identity authentication method shown in FIG. 9A and FIG. 9B, the second network device initiates authentication on the second terminal device, and in the identity authentication method shown in FIG. 10A and FIG. 10B, a first network device initiates authentication on a second terminal device. As shown in FIG. 10A and FIG. 10B, the identity authentication method includes step 1001 to step 1013.

1001: A first terminal device sends a first request to the first network device.

The first request carries first authentication indication information. The first authentication indication information is used to request to perform UAS authentication on the first terminal device.

1002: The first network device sends a second request to the first terminal device.

In this embodiment of this application, after receiving the first request, the first network device sends the second request to the first terminal device. The second request is used to request to obtain a UAS identifier of the first terminal device.

1003: The first terminal device sends the UAS identifier of the first terminal device to the first network device in response to the second request.

1004: The first network device sends the UAS identifier of the first terminal device to a second network device.

1005: The second network device performs UAS authentication on the first terminal device based on the UAS identifier of the first terminal device.

For specific implementations of step 1001 to step 1005, refer to the specific implementations of step 301 to step 305. Details are not described herein again.

1006: The second network device determines an SUPI, a GPSI, or a UAS identifier of the second terminal device associated with the first terminal device.

In this embodiment of this application, after the second network device receives the UAS identifier of the first terminal device, the second network device determines the SUPI, the GPSI, or the UAS identifier of the second terminal device associated with the first terminal device. Optionally, step 1006 may be performed before or after step 1005.

The second network device prestores an association relationship between the first terminal device and the second terminal device. The association relationship may also be referred to as a correspondence or a pairing relationship. Optionally, the association relationship between the first terminal device and the second terminal device stored in the second network device may be configured in the second network device when the first terminal device and the second terminal device are delivered from factory. Alternatively, the association relationship between the first terminal device and the second terminal device may be stored in the second network device after the first terminal device and the second terminal device are previously associated successfully. Alternatively, the association relationship between the first terminal device and the second terminal device may be stored in the second network device after a UAS service provider performs association when signing with a network operator. A method for configuring the association relationship in the second network is not limited in the present disclosure. No enumeration is provided herein.

A form in which the second network device stores the association relationship between the first terminal device and the second terminal device may be: storing an association relationship between the UAS identifier, an SUPI, or a GPSI of the first terminal device and the UAS identifier, the SUPI, and the GPSI of the second terminal device. Therefore, the second network device may determine the UAS identifier, the SUPI, and the GPSI of the second terminal device based on the UAS identifier, the SUPI, and the GPSI of the first terminal device.

In an embodiment, the first request further carries device indication information, and the device indication information is used to determine a second terminal device. For example, there are a plurality of second terminal devices associated with the first terminal device, and the device indication information may indicate a quantity of second terminal devices that need to be associated, and sequence numbers, names, or the like of the second terminal devices.

1007: The second network device sends a UAS authentication result of the first terminal device and the SUPI, the GPSI, or the UAS identifier of the second terminal device to the first network device.

In this embodiment of this application, the UAS authentication result of the first terminal device and the SUPI, the GPSI, or the UAS identifier of the second terminal device may be carried in a same message or different messages.

1008: The first network device sends the UAS authentication result of the first terminal device to the first terminal device.

In this embodiment of this application, after receiving the UAS authentication result of the first terminal device from the second network device, the first network device sends the UAS authentication result of the first terminal device to the first terminal device.

In an embodiment, after receiving the SUPI, the GPSI, or the UAS identifier of the second terminal device, the first network device may further obtain a UAS authentication status identifier of the second terminal device, and send the UAS authentication status identifier of the second terminal device to the first terminal device. Optionally, step 1009 is performed only if the obtained UAS authentication status identifier indicates authentication to be performed. If the obtained UAS authentication status identifier indicates authentication successful or authentication failed, step 1009 to step 1011 may not be performed, and the first network device may directly perform step 1012 and step 1013: separately send the UAS authentication status identifier of the second terminal device and the UAS authentication result of the first terminal device to the first terminal device and the second terminal device.

1009: The first network device sends the UAS identifier of the second terminal device to the second network device.

In this embodiment of this application, after receiving the SUPI, the GPSI, or the UAS identifier of the second terminal device, the first network device may send the UAS identifier of the second terminal device to the second network device, that is, the first network device initiates UAS authentication on the second network device.

If the second network device sends the SUPI or the GPSI of the second terminal device in step 1007, the first network device further needs to request the second terminal device to obtain the UAS identifier of the second terminal device. After obtaining the UAS identifier of the second terminal device, the first network device sends the UAS identifier of the second terminal device to the second network device. Alternatively, if the first network device stores a correspondence between the SUPI or the GPSI of the second terminal device and the UAS identifier of the second terminal device, the first network device may obtain the UAS identifier of the second terminal device based on the SUPI or the GPSI of the second terminal device.

Optionally, before step 1005 is performed, it may be determined whether to perform UAS authentication on the first terminal device. If it is determined to perform UAS authentication on the first terminal device, step 1005 is performed. For a specific implementation in which the second network device determines whether to perform UAS authentication on the first terminal device, refer to the specific implementation in which the second network device determines whether to perform UAS authentication on the first terminal device in the embodiment corresponding to FIG. 4A and FIG. 4B. Alternatively, the second network device may determine, based on locations of the first terminal device and the second terminal device and a distance between the first terminal device and the second terminal device, whether to perform UAS authentication on the first terminal device. For a specific implementation, refer to corresponding descriptions in the embodiment corresponding to FIG. 9A and FIG. 9B. Details are not described herein again.

Optionally, before sending the UAS identifier of the second terminal device to the second network device, the first network device may further determine whether to perform UAS authentication on the second terminal device. If the first network device determines to perform UAS authentication on the second terminal device, the first network device sends the UAS identifier of the second terminal device to the second network device. Otherwise, optionally, the first network device may send indication information to the first terminal device and the second terminal device, and the indication information indicates that the first terminal device fails to be associated with the second terminal device.

Optionally, the first network device may determine, based on one or more of whether the second terminal device is powered on, a distance between the first terminal device and the second terminal device, a UAS authentication status of the second terminal device, UAS type information of the second terminal device, and the like, whether to perform UAS authentication on the second terminal device. For example, if the second terminal device is not powered on, the first network device determines not to perform UAS authentication on the second terminal device. If the second terminal device is powered on, the first network device determines to perform UAS authentication on the second terminal device, and performs step 1009. For a specific implementation of determining, based on the distance between the first terminal device and the second terminal device, the UAS authentication status of the second terminal device, and the UAS type information of the second terminal device, whether to perform UAS authentication on the terminal device, refer to the foregoing descriptions. Details are not described herein again.

1010: The second network device performs UAS authentication on the second terminal device based on the UAS identifier of the second terminal device.

In this embodiment of this application, after receiving the UAS identifier of the second terminal device, the second network device performs UAS authentication on the second terminal device based on the UAS identifier of the second terminal device. A principle in which the second network device performs UAS authentication on the second terminal device based on the UAS identifier of the second terminal device is the same as the principle in which the first network device performs UAS authentication on the first terminal device based on the UAS identifier of the first terminal device. Details are not described herein again.

1011: The second network device sends a UAS authentication result of the second terminal device to the first network device.

In this embodiment of this application, after the second network device performs UAS authentication on the second terminal device based on the UAS identifier of the second terminal device, the second network device sends the UAS authentication result of the second terminal device to the first network device.

1012: The first network device sends the UAS authentication result of the second terminal device or association indication information to the first terminal device.

In this embodiment of this application, after receiving the UAS authentication result of the second terminal device, the first network device sends the UAS authentication result of the second terminal device or the association indication information to the first terminal device. The association indication information indicates whether the first terminal device is successfully associated with the second terminal device. The association indication information is obtained based on the UAS authentication result of the first terminal device and the UAS authentication result of the second terminal device. For example, if both the UAS authentication result of the first terminal device and the UAS authentication result of the second terminal device indicate that the authentication succeeds, the association indication information indicates that the first terminal device is successfully associated with the second terminal device. Otherwise, the association indication information indicates that the first terminal device fails to be associated with the second terminal device. The first network device may alternatively directly send the UAS authentication result of the second terminal device to the first terminal device. The first terminal device determines, based on the UAS authentication result of the first terminal device and the UAS authentication result of the second terminal device, whether the first terminal device is successfully associated with the second terminal device.

1013: The first network device sends the UAS authentication result of the second terminal device and the UAS authentication result of the first terminal device or the association indication information to the second terminal device.

In this embodiment of this application, after receiving the UAS authentication result of the second terminal device that is sent by the second network device, the first network device sends the UAS authentication result of the first terminal device and the UAS authentication result of the second terminal device to the second terminal device, or sends the UAS authentication result of the first terminal device and the association indication information to the second terminal device.

The first network device may send the UAS authentication result of the first terminal device and the UAS authentication result of the second terminal device to the second terminal device together or separately. Likewise, the first network device may send the UAS authentication result of the first terminal device and the UAS authentication result of the second terminal device to the first terminal device together or separately.

In an embodiment, when sending the UAS authentication result of the first terminal device to the first network device, the second network device may further send the UAS identifier, the SUPI, or the GPSI of the first terminal device to the first network device, to indicate that the UAS authentication result received by the first network device is the UAS authentication result of the first terminal device. Likewise, when sending the UAS authentication result of the second terminal device to the first network device, the second network device may further send the UAS identifier, the SUPI, or the GPSI of the second terminal device to the first network device, to indicate that the UAS authentication result received by the first network device is the UAS authentication result of the second terminal device.

In an embodiment, when sending the UAS authentication result of the second terminal device to the first network device, the second network device may further send the UAS identifier, the SUPI, or the GPSI of the second terminal device to the first network device, to indicate that the first terminal device is associated with the second terminal device. Therefore, the first network device also sends the UAS authentication result of the first terminal device to the second terminal device, and also sends the UAS authentication result of the second terminal device to the first terminal device.

In an embodiment, step 1006 may not be performed. In step 1007, the UAS identifier, the SUPI, or the GPSI of the second terminal device is not carried. The first network device stores the association relationship between the first terminal device and the second terminal device. For example, the first network device stores the association relationship between the UAS identifier of the first terminal device and the UAS identifier of the second terminal device. After the first network device receives the UAS authentication result of the first terminal device, the first network device determines the UAS identifier of the second terminal device associated with the first terminal device. After determining the UAS identifier of the second terminal device associated with the first terminal device, the first network device performs step 1010 to step 1013.

It should be noted that step 1001 to step 1003 in the solution shown in FIG. 10A and FIG. 10B may also be replaced with step 701 in FIG. 7.

In an embodiment, there may be another execution sequence of step 1001 to step 1013. An execution sequence of step 1001 to step 1013 is not limited in this application.

By implementing the method described in FIG. TOA and FIG. 10B, authentication can be performed on the first terminal device and the second terminal device, and authentication or authorization can be performed on the association relationship between the first terminal device and the second terminal device.

Figure 11A:
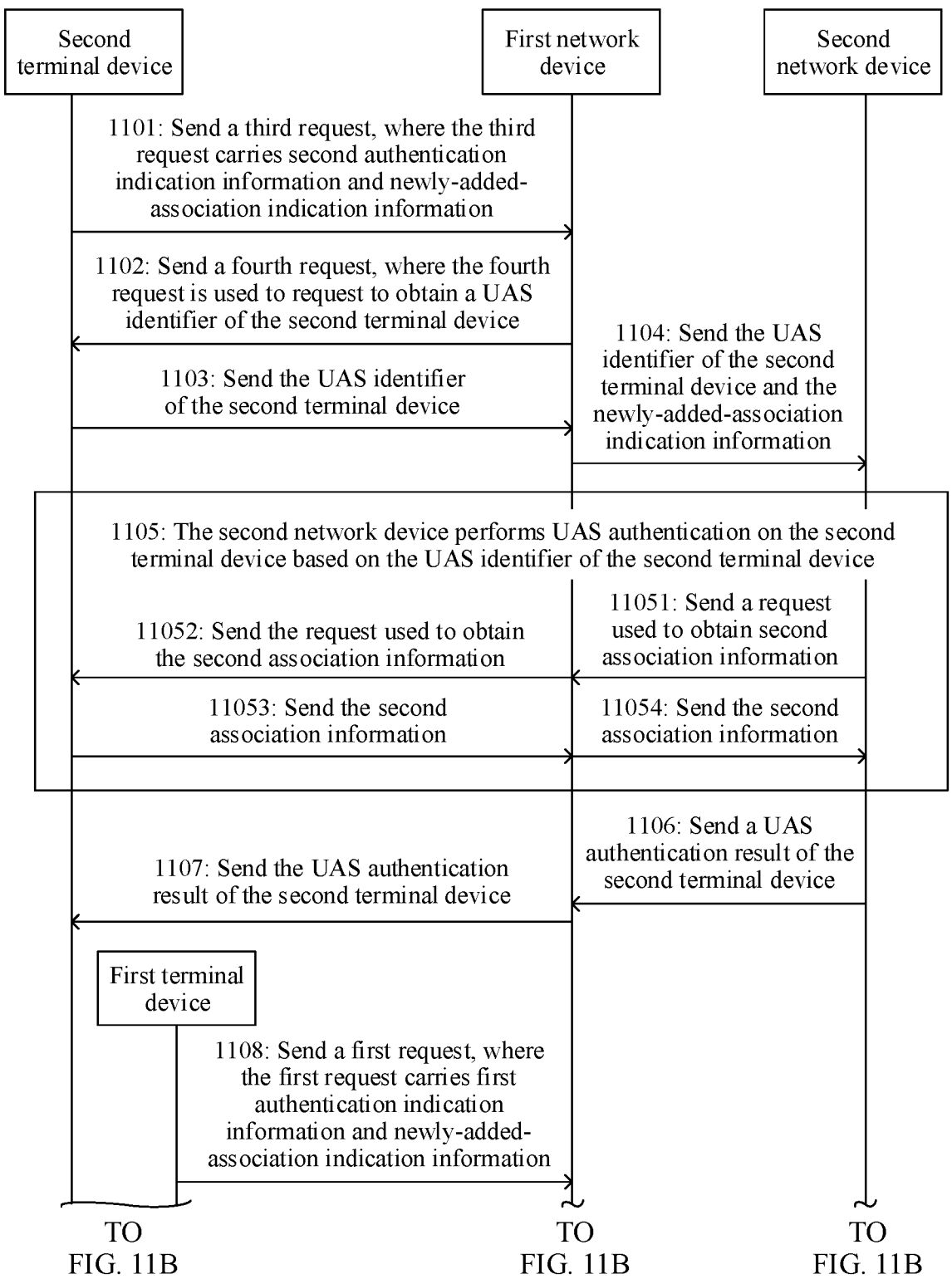
FIG. 11A and FIG. 11B are a schematic flowchart of an even further identity authentication method according to an embodiment of this application.
Figure 11B:
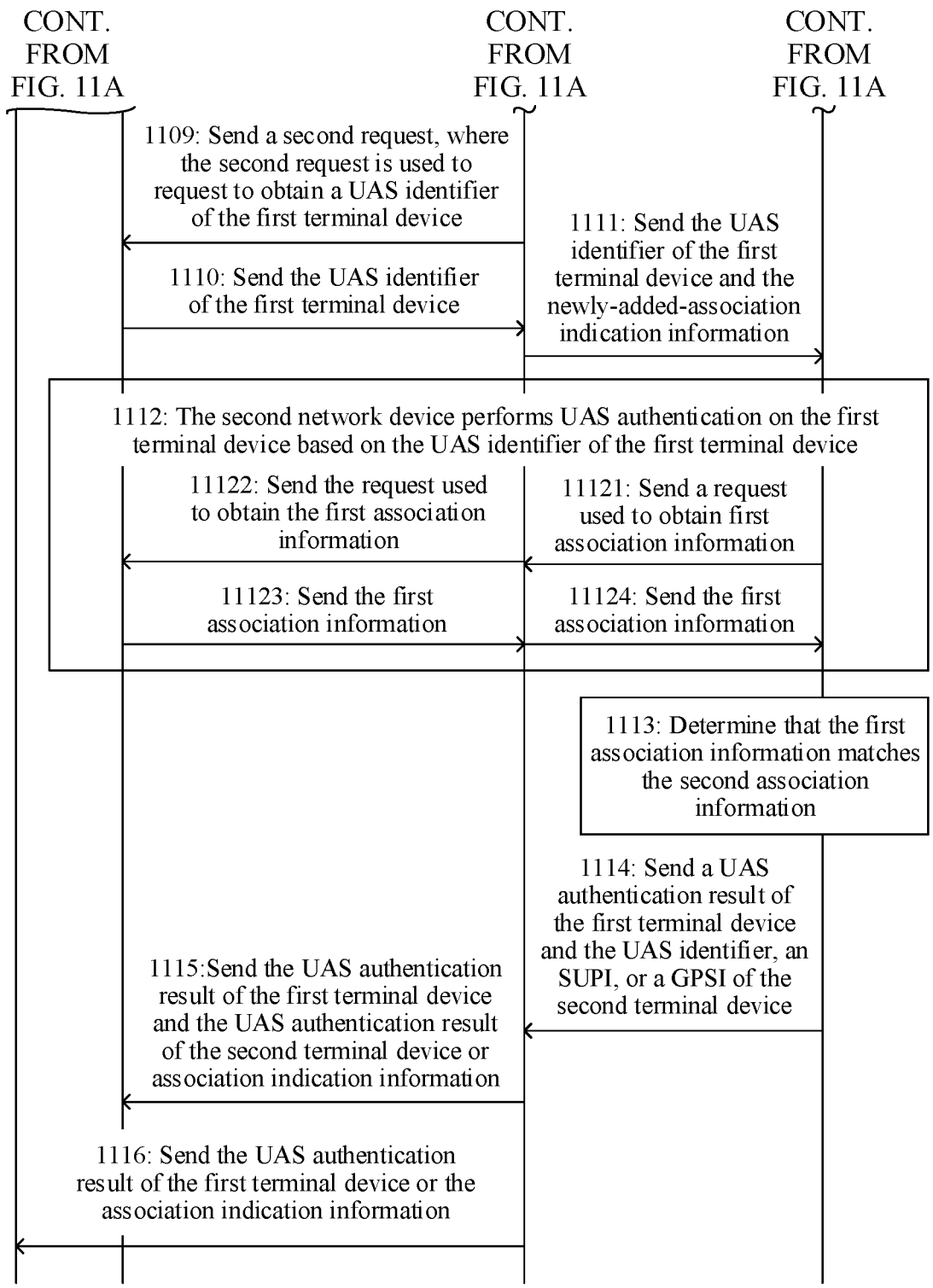

FIG. 11A and FIG. 11B are a schematic flowchart of an even further identity authentication method according to an embodiment of this application. A difference between the identity authentication method shown in FIG. 11A and FIG. 11B and the identity authentication methods shown in FIG. 9A and FIG. 9B and FIG. TOA and FIG. 10B lies in that, in the solutions shown in FIG. 9A and FIG. 9B and FIG. TOA and FIG. 10B, authorization or authentication is performed on the stored association relationship between the first terminal device and the second terminal device. In the solution shown in FIG. 11A and FIG. 11B, a second network device does not store an association relationship between a first terminal device and a second terminal device. In the solution shown in FIG. 11A and FIG. 11B, authorization or authentication is performed on a newly added association relationship between the first terminal device and the second terminal device. As shown in FIG. 11A and FIG. 11B, the identity authentication method includes step 1101 to step 1116.

1101: The second terminal device sends a third request to a first network device.

The third request carries second authentication indication information and newly-added-association indication information. The second authentication indication information is used to request to perform UAS authentication on the second terminal device. The newly-added-association indication information is used to request to newly add an association relationship.

1102: The first network device sends a fourth request to the second terminal device.

In this embodiment of this application, after receiving the third request, the first network device sends the fourth request to the second terminal device. The fourth request is used to request to obtain a UAS identifier of the second terminal device.

1103: The second terminal device sends the UAS identifier of the second terminal device to the first network device in response to the fourth request.

1104: The first network device sends the UAS identifier of the second terminal device and the newly-added-association indication information to the second network device.

1105: The second network device performs UAS authentication on the second terminal device based on the UAS identifier of the second terminal device.

For specific implementations of step 1101 to step 1105, refer to the specific implementations of step 301 to step 305. Details are not described herein again. In an embodiment, if the third request in step 1101 includes the UAS identifier, similar to the implementation in FIG. 7, step 1102 and step 1103 may not be performed, to improve efficiency and save network resources.

11051: The second network device sends, to the first network device, a request used to obtain second association information of the second terminal device.

11052: The first network device sends, to the second terminal device, the request used to obtain the second association information of the second terminal device.

11053: The second terminal device sends the second association information of the second terminal device to the first network device.

11054: The first network device sends the second association information of the second terminal device to the second network device.

Step 11051 to step 11054 may be performed in a process in which the second network device performs UAS authentication on the second terminal device based on the UAS identifier of the second terminal device. Alternatively, step 11051 to step 11054 may be performed after step 1104 and before step 1105. Alternatively, step 11051 to step 11054 may be performed after step 1105. In FIG. 11A and FIG.

11B, an example in which step 11051 to step 11054 are performed in a process in which the second network device performs UAS authentication on the second terminal device based on the UAS identifier of the second terminal device is used.

In this embodiment of this application, the second association information may be information used to establish an association relationship, such as a password (password), a passphrase (passphrase), or a credential.

1106: The second network device sends a UAS authentication result of the second terminal device to the first network device.

1107: The first network device sends the UAS authentication result of the second terminal device to the second terminal device.

For specific implementations of step 1101 to step 1107, refer to the specific implementations of step 301 to step 307. Details are not described herein again.

1108: The second terminal device sends a first request to the first network device.

The first request carries first authentication indication information and newly-added-association indication information. The first authentication indication information is used to request to perform UAS authentication on the first terminal device. The newly-added-association indication information is used to request to newly add an association relationship.

1109: The first network device sends a second request to the first terminal device.

In this embodiment of this application, after receiving the first request, the first network device sends the second request to the first terminal device. The second request is used to request to obtain a UAS identifier of the first terminal device.

In an embodiment, if the first request in step 1108 includes the UAS identifier, similar to the implementation in FIG. 7, step 1109 and step 1110 may not be performed, to improve efficiency and save network resources.

1110: The first terminal device sends the UAS identifier of the first terminal device to the first network device in response to the second request.

1111: The first network device sends the UAS identifier of the first terminal device and the newly-added-association indication information to the second network device.

1112: The second network device performs UAS authentication on the first terminal device based on the UAS identifier of the first terminal device.

11121: The second network device sends, to the first network device, a request used to obtain first association information of the first terminal device.

11122: The first network device sends, to the first terminal device, the request used to obtain the first association information of the first terminal device.

11123: The first terminal device sends the first association information of the first terminal device to the first network device.

11124: The first network device sends the first association information of the first terminal device to the second network device.

Step 11121 to step 11124 may be performed in a process in which the second network device performs UAS authentication on the first terminal device based on the UAS identifier of the first terminal device. Alternatively, step 11121 to step 11124 may be performed after step 1111 and before step 1112. Alternatively, step 11121 to step 11124 may be performed after step 1112. In FIG. 11A and FIG. 11B, an example in which step 11121 to step 11124 are performed in a process in which the second network device performs UAS authentication on the first terminal device based on the UAS identifier of the first terminal device is used.

In this embodiment of this application, the first association information may be information used to establish an association relationship, such as a password (password), a passphrase (passphrase), or a credential.

1113: The second network device determines that the first association information matches the second association information.

After receiving the first association information, the second network device searches for association information that matches the first association information. In this embodiment of this application, the second network device finds that the first association information matches the second association information. That the first association information matches the second association information may mean that the first association information is the same as the second association information. For example, if the first association information is a password "12345", and the second association information is also a password "12345", the first association information matches the second association information. If the first association information sent by the first terminal device matches the second association information sent by the second terminal device, the second network device determines the first terminal device and the second terminal device are terminal devices that want to establish an association relationship. Therefore, the second network device sends a UAS authentication result of the first terminal device and the UAS identifier, an SUPI, or a GPSI of the second terminal device to the first network device. The UAS identifier, the SUPI, or the GPSI of the second terminal device is used to indicate that the second terminal device wants to establish an association relationship with the first terminal device. In this way, the first network device may send the UAS authentication result of the first terminal device and the UAS authentication result of the second terminal device or association indication information to the first terminal device, and sends the UAS authentication result of the first terminal device or the association indication information to the second terminal device, to indicate a result of association between the first terminal device and the second terminal device.

As described in the foregoing embodiment, the SUPI or the GPSI of the second terminal device in the second network device may be an SUPI or a GPSI of the second terminal device that is associated with the UAS identifier of the second terminal device and that is sent by the first network device to the second network device or that is stored in the second network device.

1114: The second network device sends the UAS authentication result of the first terminal device and the UAS identifier, the SUPI, or the GPSI of the second terminal device to the first network device.

1115: The first network device sends the UAS authentication result of the first terminal device and the UAS authentication result of the second terminal device or the association indication information to the first terminal device.

The association indication information indicates whether the first terminal device is successfully associated with the second terminal device. The association indication information is obtained based on the UAS authentication result of the first terminal device and the UAS authentication result of the second terminal device. For example, if both the UAS authentication result of the first terminal device and the UAS authentication result of the second terminal device indicate that the authentication succeeds, the association indication information indicates that the first terminal device is successfully associated with the second terminal device. Otherwise, the association indication information indicates that the first terminal device fails to be associated with the second terminal device. The first network device may alternatively directly send the UAS authentication result of the second terminal device to the first terminal device. The first terminal device determines, based on the UAS authentication result of the first terminal device and the UAS authentication result of the second terminal device, whether the first terminal device is successfully associated with the second terminal device.

1116: The first network device sends the UAS authentication result of the first terminal device or the association indication information to the second terminal device.

The first network device may send the UAS authentication result of the first terminal device and the UAS authentication result of the second terminal device or the association indication information to the first terminal device together or separately. Likewise, the first network device may send the UAS authentication result of the second terminal device and the UAS authentication result of the first terminal device or the association indication information to the second terminal device together or separately.

Figure 12A:
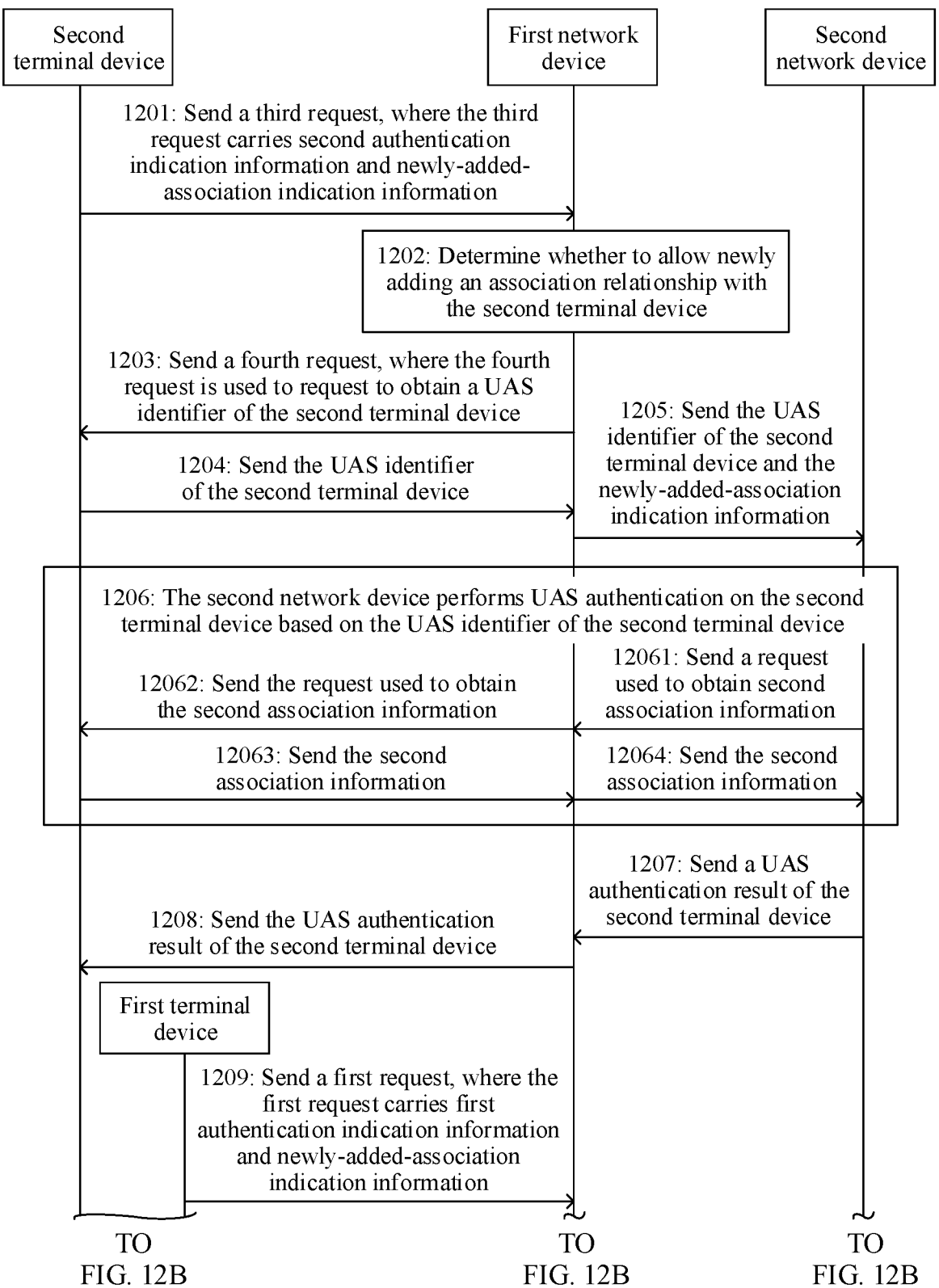
FIG. 12A and FIG. 12B are a schematic flowchart of still yet another identity authentication method according to an embodiment of this application.
Figure 12B:
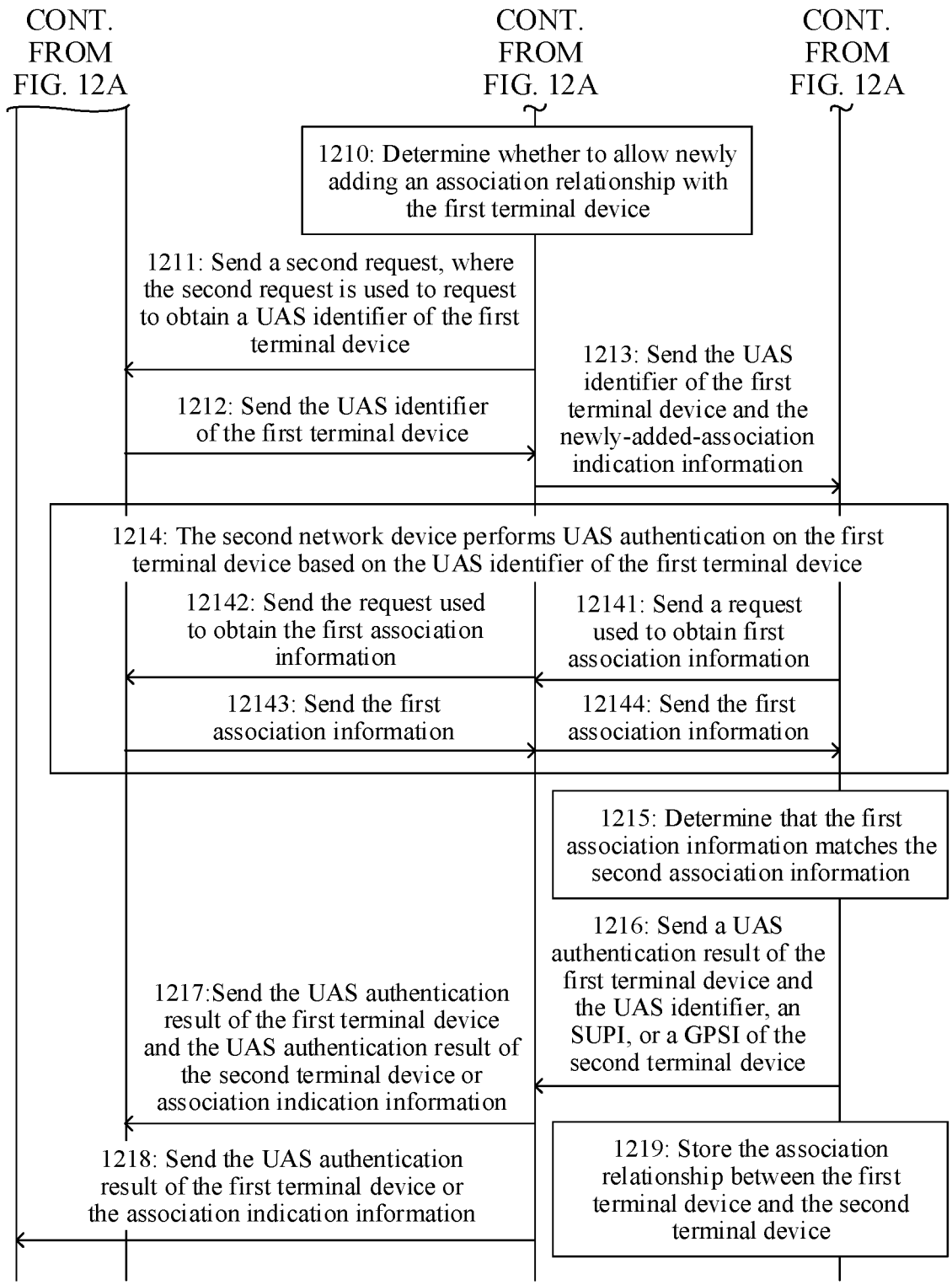

In an embodiment, as shown in FIG. 12A and FIG. 12B, after receiving the third request, the first network device may determine whether to allow newly adding the association relationship with the second terminal device. If the first network device allows newly adding the association relationship with the second terminal device, the first network device performs step 1203, that is, sends the fourth request to the second terminal device. Optionally, if the first network device does not allow newly adding the association relationship with the second terminal device, the first network device sends, to the second terminal device, indication information indicating that the newly added association fails.

For example, the first network device may store an identifier list (for example, an SUPI list or a GPSI list) of a terminal device that is allowed to newly add an association relationship. If the second terminal device is in the identifier list, the first network device determines to allow newly adding the association relationship with the second terminal device. If the second terminal device is not in the identifier list, the first network device determines not to allow newly adding the association relationship with the second terminal device.

For another example, the first network device may store an identifier list (for example, an SUPI list or a GPSI list) of a terminal device that is not allowed to newly add an association relationship. If the second terminal device is in the identifier list, the first network device determines not to allow newly adding the association relationship with the second terminal device. If the second terminal device is not in the identifier list, the first network device determines to allow newly adding the association relationship with the second terminal device.

In an embodiment, after receiving the UAS identifier of the second terminal device and the newly-added-association indication information, the second network device may determine whether to allow newly adding the association relationship with the second terminal device. If the second network device allows newly adding the association relationship with the second terminal device, the second network device performs UAS authentication on the second terminal device based on the UAS identifier of the second terminal device. Optionally, if the second network device does not allow newly adding the association relationship with the second terminal device, the second network device sends, to the first network device, indication information indicating that the newly added association fails, and the first network device sends, to the second terminal device, the indication information indicating that the newly added association fails. For a specific implementation principle, refer to the foregoing descriptions. Details are not described herein again.

In an embodiment, as shown in FIG. 12A and FIG. 12B, after receiving the first request, the first network device may determine whether to allow newly adding the association relationship with the first terminal device. If the first network device allows newly adding the association relationship with the first terminal device, the first network device performs step 1211, that is, sends the second request to the first terminal device. Optionally, if the first network device does not allow newly adding the association relationship with the first terminal device, the first network device sends, to the first terminal device, indication information indicating that the newly added association fails. For a specific implementation principle, refer to the foregoing descriptions. Details are not described herein again.

In an embodiment, after receiving the UAS identifier of the first terminal device and the newly-added-association indication information, the second network device may determine whether to allow newly adding the association relationship with the first terminal device. If the second network device allows newly adding the association relationship with the first terminal device, the second network device performs UAS authentication on the first terminal device based on the UAS identifier of the first terminal device. Optionally, if the second network device does not allow newly adding the association relationship with the first terminal device, the second network device sends, to the first network device, indication information indicating that the newly added association fails, and the first network device sends, to the first terminal device, the indication information indicating that the newly added association fails. For a specific implementation principle, refer to the foregoing descriptions. Details are not described herein again.

In an embodiment, as shown in FIG. 12A and FIG. 12B, after determining that the first association information matches the second association information, the second network device may further store the association relationship between the first terminal device and the second terminal device. Step 1219 may be performed before or after step 1216. Optionally, the second network device may further store the association relationship between the first terminal device and the second terminal device only when determining that both the UAS authentication result of the first terminal device and the UAS authentication result of the second terminal device indicate that the authentication succeeds. The association relationship between the first terminal device and the second terminal device is stored, so that when the first terminal device and the second terminal device need to be paired for use next time, the association relationship does not need to be re-established. This helps reduce an association time or a pairing time.

In an embodiment, there may be another execution sequence of step 1101 to step 1116. An execution sequence of step 1101 to step 1116 is not limited in this application.

Figure 13A:
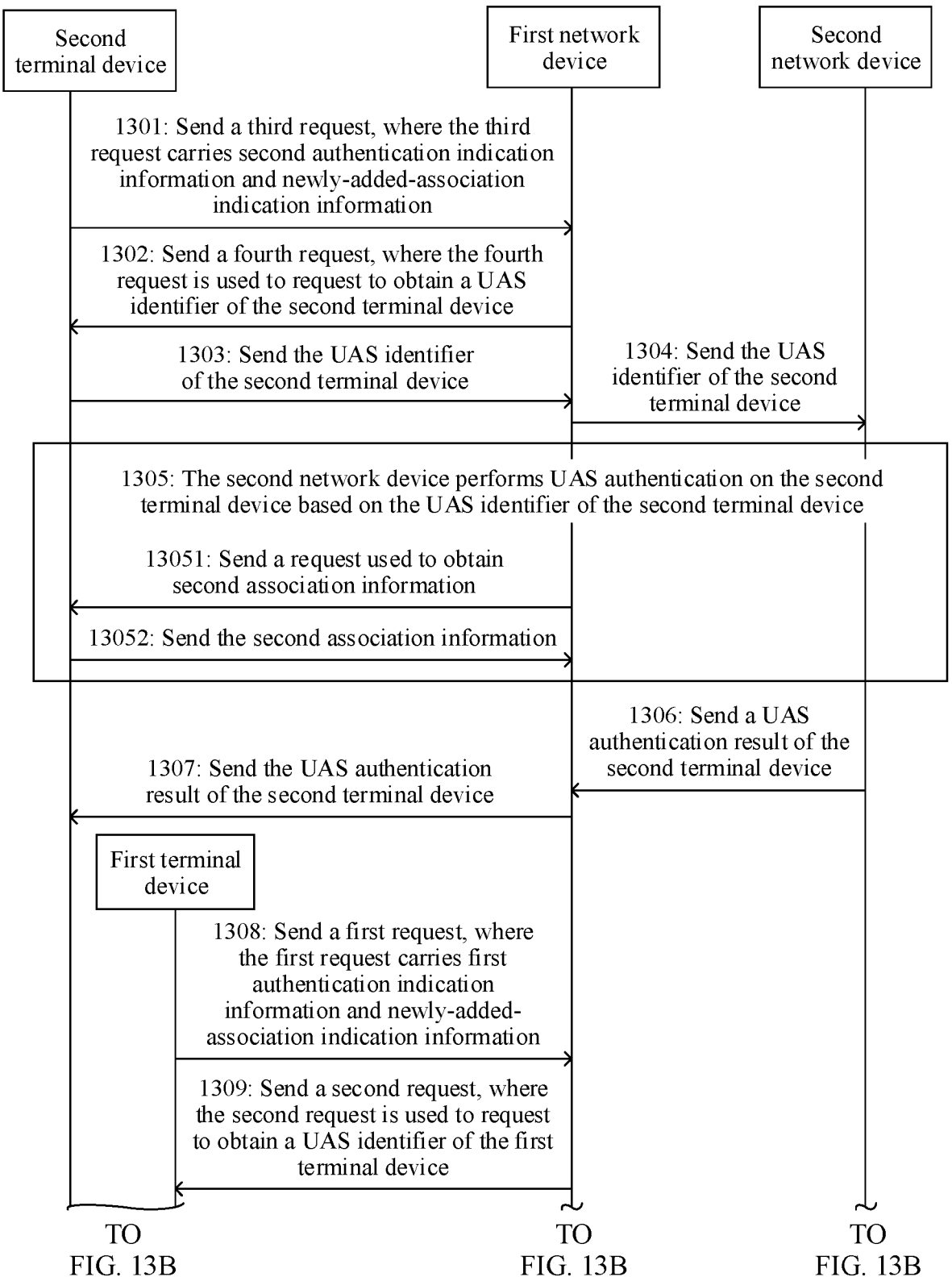
FIG. 13A and FIG. 13B are a schematic flowchart of a still yet further identity authentication method according to an embodiment of this application.
Figure 13B:
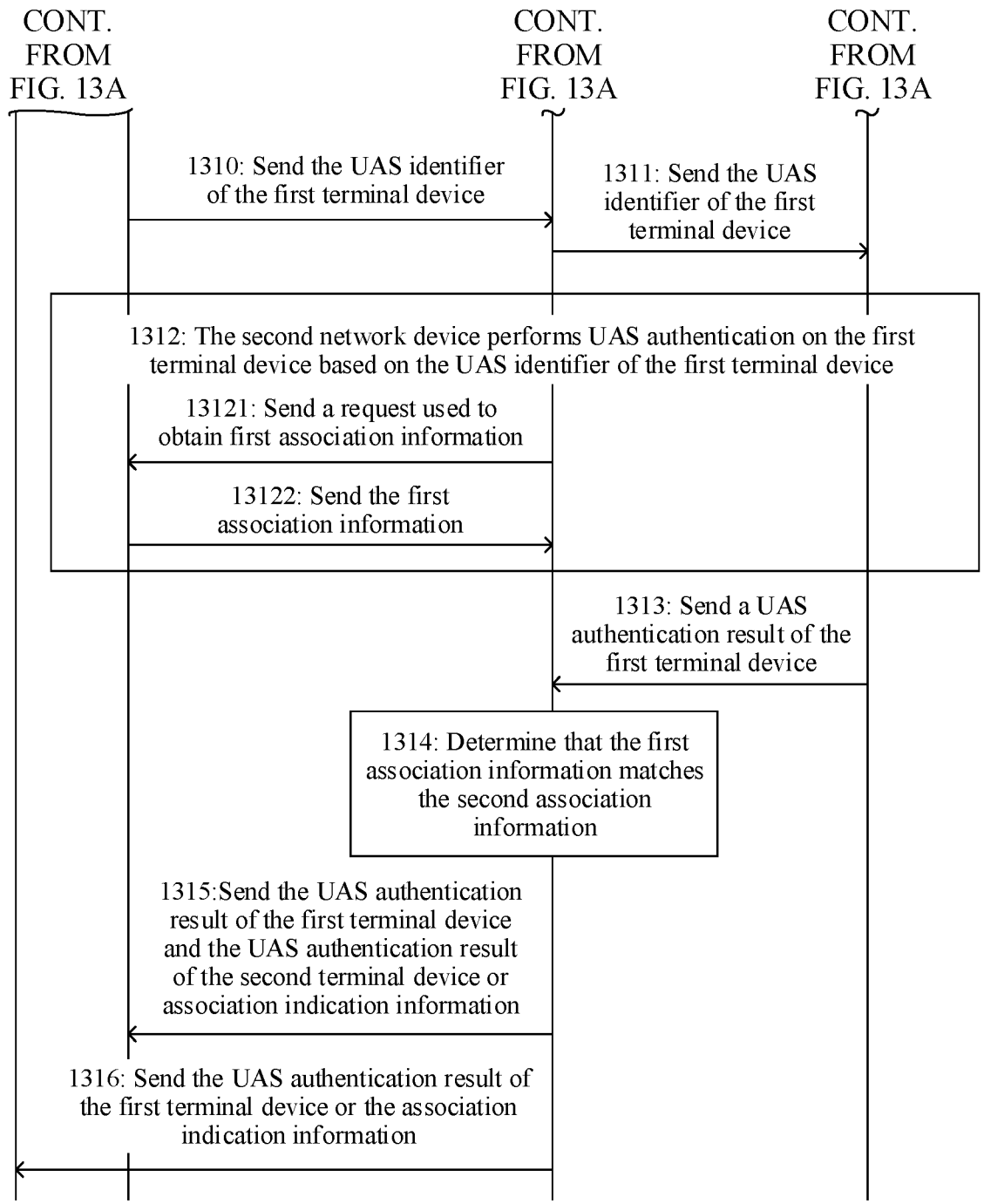

FIG. 13A and FIG. 13B are a schematic flowchart of a still yet further identity authentication method according to an embodiment of this application. A difference between the identity authentication method shown in FIG. 13A and FIG. 13B and the identity authentication method shown in FIG. 11A and FIG. 11B lies in that, in FIG. 11A and FIG. 11B, the second network device determines that the first association information matches the second association information, and in FIG. 13A and FIG. 13B, a first network device determines that first association information matches second association information. As shown in FIG. 13A and FIG. 13B, the identity authentication method includes step 1131 to step 1116.

1301: A second terminal device sends a third request to the first network device.

The third request carries second authentication indication information and newly-added-association indication information. The second authentication indication information is used to request to perform UAS authentication on the second terminal device.

1302: The first network device sends a fourth request to the second terminal device.

In this embodiment of this application, after receiving the third request, the first network device sends the fourth request to the second terminal device. The fourth request is used to request to obtain a UAS identifier of the second terminal device.

1303: The second terminal device sends the UAS identifier of the second terminal device to the first network device in response to the fourth request.

1304: The first network device sends the UAS identifier of the second terminal device to a second network device.

1305: The second network device performs UAS authentication on the second terminal device based on the UAS identifier of the second terminal device.

13051: The first network device sends, to the second terminal device, a request used to obtain second association information of the second terminal device.

13052: The second terminal device sends the second association information of the second terminal device to the first network device.

Step 13051 and step 13052 may be performed in a process in which the second network device performs UAS authentication on the second terminal device based on the UAS identifier of the second terminal device. Alternatively, step 13051 and step 13052 may be performed after step 1304 and before step 1305. Alternatively, step 13051 and step 13052 may be performed after step 1305, step 1306, or step 1307. In FIG. 13A and FIG. 13B, an example in which step 13051 and step 13052 are performed in a process in which the second network device performs UAS authentication on the second terminal device based on the UAS identifier of the second terminal device is used.

In this embodiment of this application, the second association information may be information used to establish an association relationship, such as a password (password), a passphrase (passphrase), or a credential.

1306: The second network device sends a UAS authentication result of the second terminal device to the first network device.

1307: The first network device sends the UAS authentication result of the second terminal device to the second terminal device.

For specific implementations of step 1301 to step 1307, refer to the specific implementations of step 301 to step 307. Details are not described herein again. In an embodiment, if the third request in step 1301 includes the UAS identifier, similar to the implementation in FIG. 7, step 1302 and step 1303 may not be performed, to improve efficiency and save network resources.

1308: The second terminal device sends a first request to the first network device.

The first request carries first authentication indication information and newly-added-association indication information. The first authentication indication information is used to request to perform UAS authentication on the first terminal device. The newly-added-association indication information is used to request to newly add an association relationship.

1309: The first network device sends a second request to the first terminal device.

In this embodiment of this application, after receiving the first request, the first network device sends the second request to the first terminal device. The second request is used to request to obtain a UAS identifier of the first terminal device.

1310: The first terminal device sends the UAS identifier of the first terminal device to the first network device in response to the second request.

In an embodiment, if the first request in step 1308 includes the UAS identifier, similar to the implementation in FIG. 7, step 1309 and step 1310 may not be performed, to improve efficiency and save network resources.

1311: The first network device sends the UAS identifier of the first terminal device to the second network device.

1312: The second network device performs UAS authentication on the first terminal device based on the UAS identifier of the first terminal device.

13121: The first network device sends, to the first terminal device, a request used to obtain first association information of the first terminal device.

13122: The first terminal device sends the first association information of the first terminal device to the first network device.

Step 13121 and step 13122 may be performed in a process in which the second network device performs UAS authentication on the first terminal device based on the UAS identifier of the first terminal device. Alternatively, step 13121 and step 13122 may be performed after step 1311 and before step 1312. Alternatively, step 13121 and step 13122 may be performed after step 1312. In FIG. 11A and FIG. 11B, an example in which step 13121 and step 13122 are performed in a process in which the second network device performs UAS authentication on the first terminal device based on the UAS identifier of the first terminal device is used.

In this embodiment of this application, the first association information may be information used to establish an association relationship, such as a password (password), a passphrase (passphrase), or a credential.

1313: The second network device sends a UAS authentication result of the first terminal device to the first network device.

1314: The first network device determines that the first association information matches the second association information.

After receiving the first association information, the first network device searches for association information that matches the first association information. In this embodiment of this application, the first network device finds that the first association information matches the second association information. In this case, the first network device determines that an association relationship needs to be established between the first terminal device and the second terminal device. Therefore, the first network device may send the UAS authentication result of the first terminal device and the UAS authentication result of the second terminal device or association indication information to the first terminal device, and send the UAS authentication result of the first terminal device or the association indication information to the second terminal device. For descriptions of the association indication information, refer to the foregoing descriptions. Details are not described herein again.

Step 1314 may be performed before or after the first network device receives the UAS authentication result of the first terminal device.

1315: The first network device sends the UAS authentication result of the first terminal device and the UAS authentication result of the second terminal device or the association indication information to the first terminal device.

1316: The first network device sends the UAS authentication result of the first terminal device or the association indication information to the second terminal device.

The first network device may send the UAS authentication result of the first terminal device and the UAS authentication result of the second terminal device or the association indication information to the first terminal device together or separately. Likewise, the first network device may send the UAS authentication result of the second terminal device and the UAS authentication result of the first terminal device or the association indication information to the second terminal device together or separately.

Figure 14A:
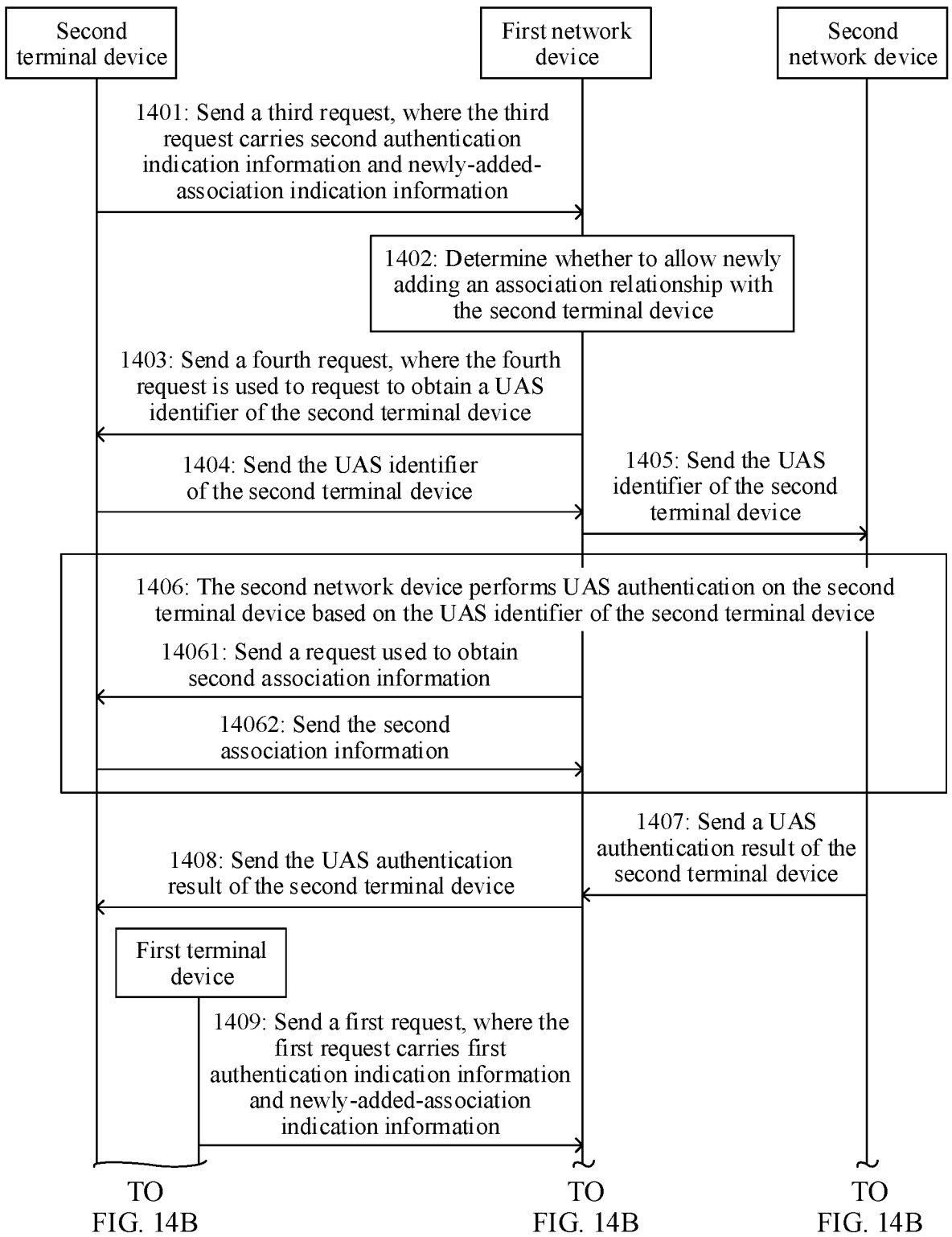
FIG. 14A and FIG. 14B are a schematic flowchart of even yet another identity authentication method according to an embodiment of this application.
Figure 14B:
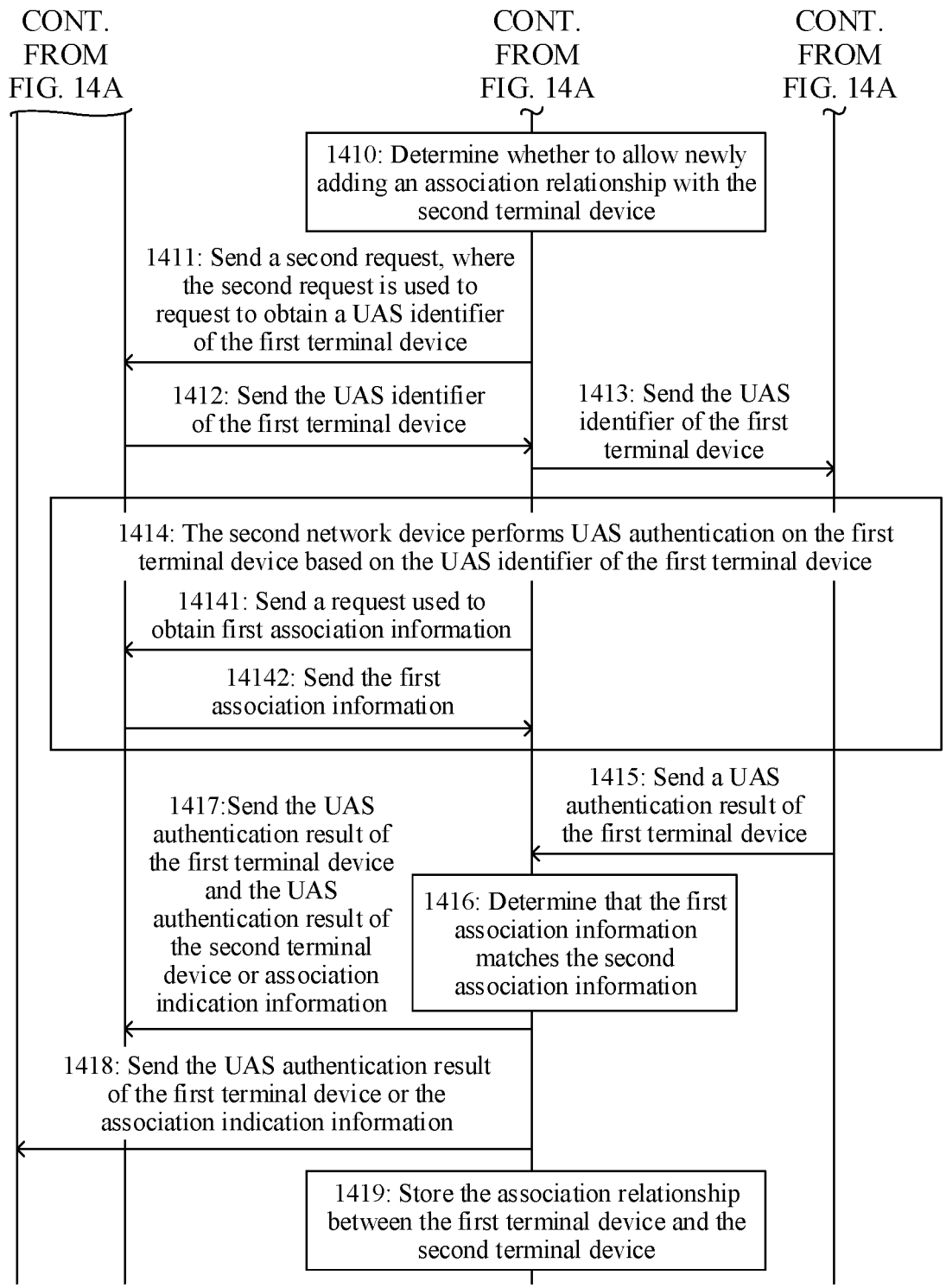

In an embodiment, as shown in FIG. 14A and FIG. 14B, after receiving the third request, the first network device may determine whether to allow newly adding the association relationship with the second terminal device. If the first network device allows newly adding the association relationship with the second terminal device, the first network device sends the fourth request to the second terminal device. Optionally, if the first network device does not allow newly adding the association relationship with the second terminal device, the first network device sends, to the second terminal device, indication information indicating that the newly added association fails. For a specific implementation principle, refer to the foregoing descriptions. Details are not described herein again.

In an embodiment, as shown in FIG. 14A and FIG. 14B, after receiving the first request, the first network device may determine whether to allow newly adding the association relationship with the first terminal device. If the first network device allows newly adding the association relationship with the first terminal device, the first network device sends the second request to the first terminal device. Optionally, if the first network device does not allow newly adding the association relationship with the first terminal device, the first network device sends, to the first terminal device, indication information indicating that the newly added association fails. For a specific implementation principle, refer to the foregoing descriptions. Details are not described herein again.

In an embodiment, as shown in FIG. 14A and FIG. 14B, after determining that the first association information matches the second association information, the first network device may further store the association relationship between the first terminal device and the second terminal device. Step 1419 may be performed before or after step 1417. Optionally, the first network device may further store the association relationship between the first terminal device and the second terminal device only when determining that both the UAS authentication result of the first terminal device and the UAS authentication result of the second terminal device indicate that the authentication succeeds. Optionally, the first network device may further send the association relationship to the second network device for storage. The association relationship between the first terminal device and the second terminal device is stored, so that when the first terminal device and the second terminal device need to be paired for use next time, the association relationship does not need to be re-established. This helps reduce a pairing time.

In an embodiment, there may be another execution sequence of step 1301 to step 1316. An execution sequence of step 1301 to step 1316 is not limited in this application.

By implementing the method described in FIG. 13A and FIG. 13B, authentication can be performed on the first terminal device and the second terminal device, and authentication or authorization can be performed on the association relationship between the first terminal device and the second terminal device.

Figure 15A:
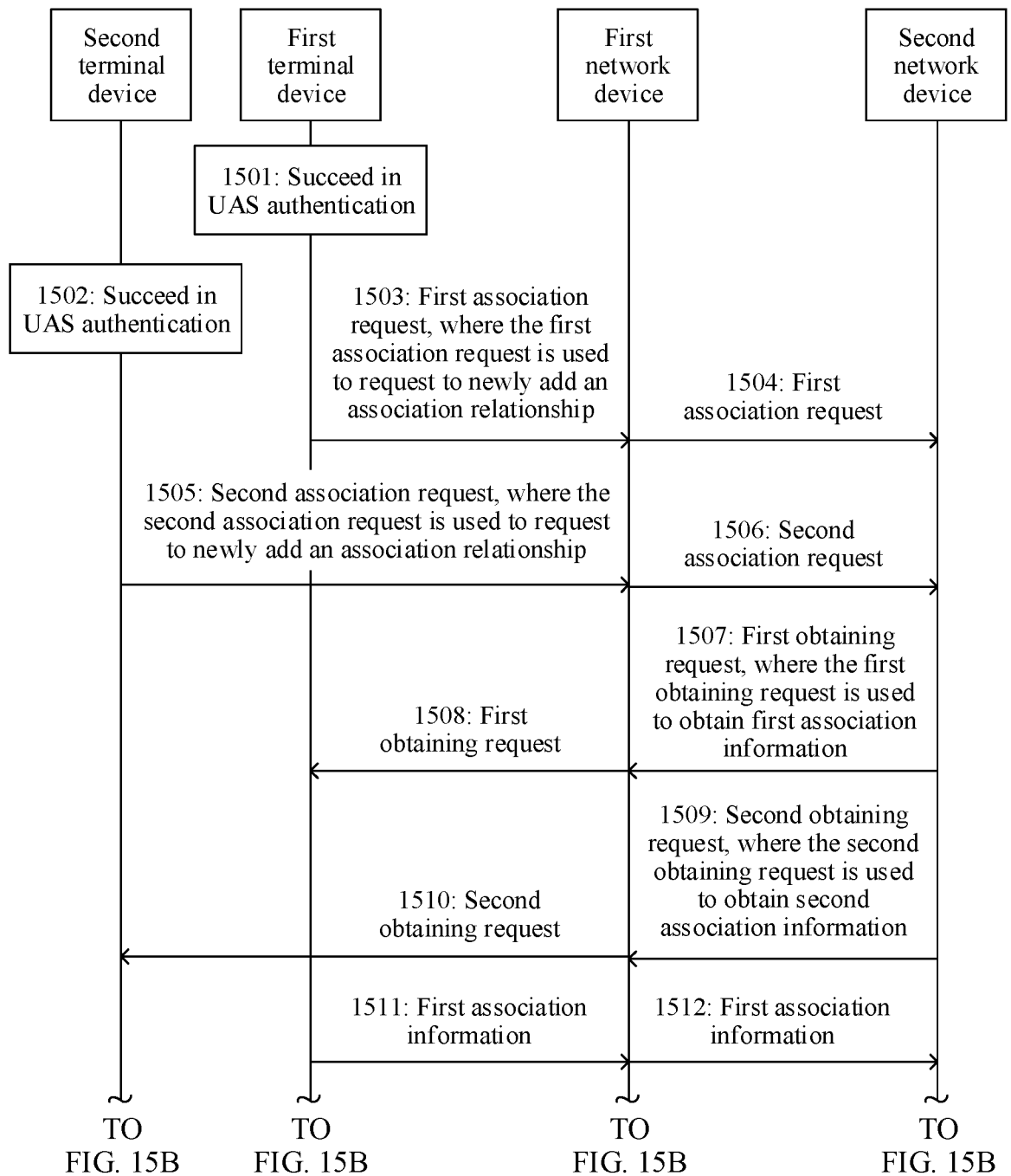
FIG. 15A and FIG. 15B are a schematic flowchart of an even yet further identity authentication method according to an embodiment of this application.
Figure 15B:
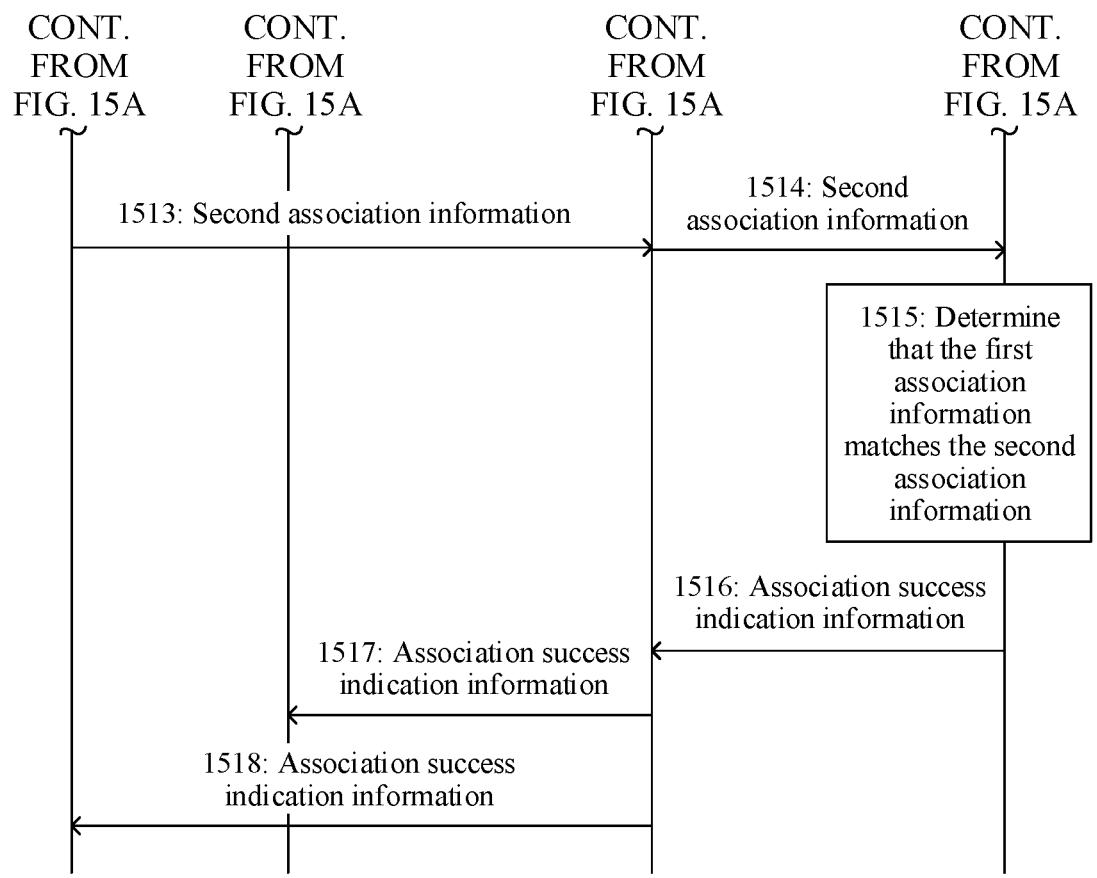

FIG. 15A and FIG. 15B are a schematic flowchart of an even yet further identity authentication method according to an embodiment of this application. A difference between the identity authentication method shown in FIG. 15A and FIG. 15B and the identity authentication methods shown in FIG. 11A and FIG. 11B to FIG. 14A and FIG. 14B lies in that, in FIG. 11A and FIG. 11B to FIG. 14A and FIG. 14B, authorization or authentication is performed on the newly added association relationship in a process in which UAS authentication is performed on the terminal device performs, and in FIG. 15A and FIG. 15B, authorization or authentication is performed on a newly added association relationship after a first terminal device and a second terminal device succeed in UAS authentication. As shown in FIG. 15A and FIG. 15B, the identity authentication method includes step 1501 to step 1518.

1501: The first terminal device succeeds in UAS authentication.

1502: The second terminal device succeeds in UAS authentication.

Step 1503 and step 1505 are respectively performed after step 1501 and step 1502.

1503: The first terminal device sends a first association request to a first network device, where the first association request is used to request to newly add an association relationship.

In an embodiment, the first association request may carry a UAS identifier and a terminal identifier (for example, an SUCI or a GUTI) of the first terminal device, and UAS type information of the first terminal device. The UAS type information is used to indicate a device type of the first terminal device in a UAS.

1504: The first network device sends the first association request to a second network device.

In this embodiment of this application, after receiving the first association request, the first network device sends the first association request to the second network device.

1505: The first terminal device sends a second association request to the first network device, where the second association request is used to request to newly add an association relationship.

In an embodiment, the second association request may carry a UAS identifier and a terminal identifier (for example, an SUCI or a GUTI) of the second terminal device, and UAS type information of the second terminal device. The UAS type information is used to indicate a device type of the second terminal device in the UAS.

1506: The first network device sends the second association request to the second network device.

In this embodiment of this application, after receiving the second association request, the first network device sends the second association request to the second network device.

1507: The second network device sends a first obtaining request to the first network device, where the first obtaining request is used to obtain first association information.

In this embodiment of this application, after receiving the first association request, the second network device sends the first obtaining request to the first network device.

1508: The first network device sends the first obtaining request to the first terminal device.

In this embodiment of this application, after receiving the first obtaining request, the first network device sends the first obtaining request to the first terminal device.

1509: The second network device sends a second obtaining request to the first network device, where the second obtaining request is used to obtain second association information.

In this embodiment of this application, after receiving the second association request, the second network device sends the second obtaining request to the first network device.

1510: The first network device sends the second obtaining request to the second terminal device.

In this embodiment of this application, after receiving the second obtaining request, the first network device sends the second obtaining request to the second terminal device.

1511: The first terminal device sends the first association information to the first network device.

In this embodiment of this application, after receiving the first obtaining request, the first terminal device sends the first association information to the first network device.

In this embodiment of this application, the first association information and the second association information each may be information used to establish an association relationship, such as a password, a passphrase, or a credential.

1512: The first network device sends the first association information to the second network device.

In this embodiment of this application, after receiving the first association information, the first network device sends the first association information to the second network device.

1513: The second terminal device sends the second association information to the first network device.

In this embodiment of this application, after receiving the second obtaining request, the second terminal device sends the second association information to the first network device.

1514: The first network device sends the second association information to the second network device.

In this embodiment of this application, after receiving the second association information, the first network device sends the second association information to the second network device.

1515: The second network device determines that the first association information matches the second association information.

1516: The second network device sends association success indication information to the first network device. The association success indication information indicates that the first terminal device is successfully associated with the second terminal device.

In this embodiment of this application, after receiving the first association information and the second association information, the second network device may determine whether the first association information matches the second association information. If yes, the second network device performs step 1516, that is, sends the association success indication information to the first network device. If the first association information matches the second association information, it indicates that an association relationship needs to be established between the first terminal device and the second terminal device. Because both the first terminal device and the second terminal device have succeeded in UAS authentication, the second network device may send the association success indication information to the first network device.

Optionally, if the first association information does not match the second association information, the second network device may send association failure indication information to the first network device, and the first network device sends the association failure indication information to the first terminal device and the second terminal device.

In an embodiment, if the first association information matches the second association information, the second network device may further determine, based on the UAS type information of the first terminal device and the UAS type information of the second terminal device, whether to perform step 1516. For example, if the UAS type information of the first terminal device is different from the UAS type information of the second terminal device, the second network device performs step 1516. If the UAS type information of the first terminal device is the same as the UAS type information of the second terminal device, the second network device sends the association failure indication information to the first network device, to indicate that the first terminal device fails to be associated with the second terminal device. The first network device sends the association failure indication information to the first terminal device and the second terminal device.

1517: The first network device sends the association success indication information to the first terminal device.

1518: The first network device sends the association success indication information to the second terminal device.

It should be noted that step 1501, step 1503, step 1504, step 1507, step 1508, step 1511, and step 1512 are about the message for the first terminal device, and step 1502, step 1505, step 1506, step 1509, step 1510, step 1513, and step 1514 are about the message for the second terminal. An execution sequence of the message for the first terminal device and the message for the second terminal device is not limited in the present disclosure. In this embodiment, the message for the first terminal device and the message for the second terminal device are alternately performed, or the step for the first terminal device may be performed before the step for the second terminal device, or different combinations may be performed. Likewise, a sequence of step 1517 and step 1518 may also be interchanged. In an embodiment, there may be another execution sequence of step 1501 to step 1518. An execution sequence of step 1501 to step 1518 is not limited in this application.

Figure 16A:
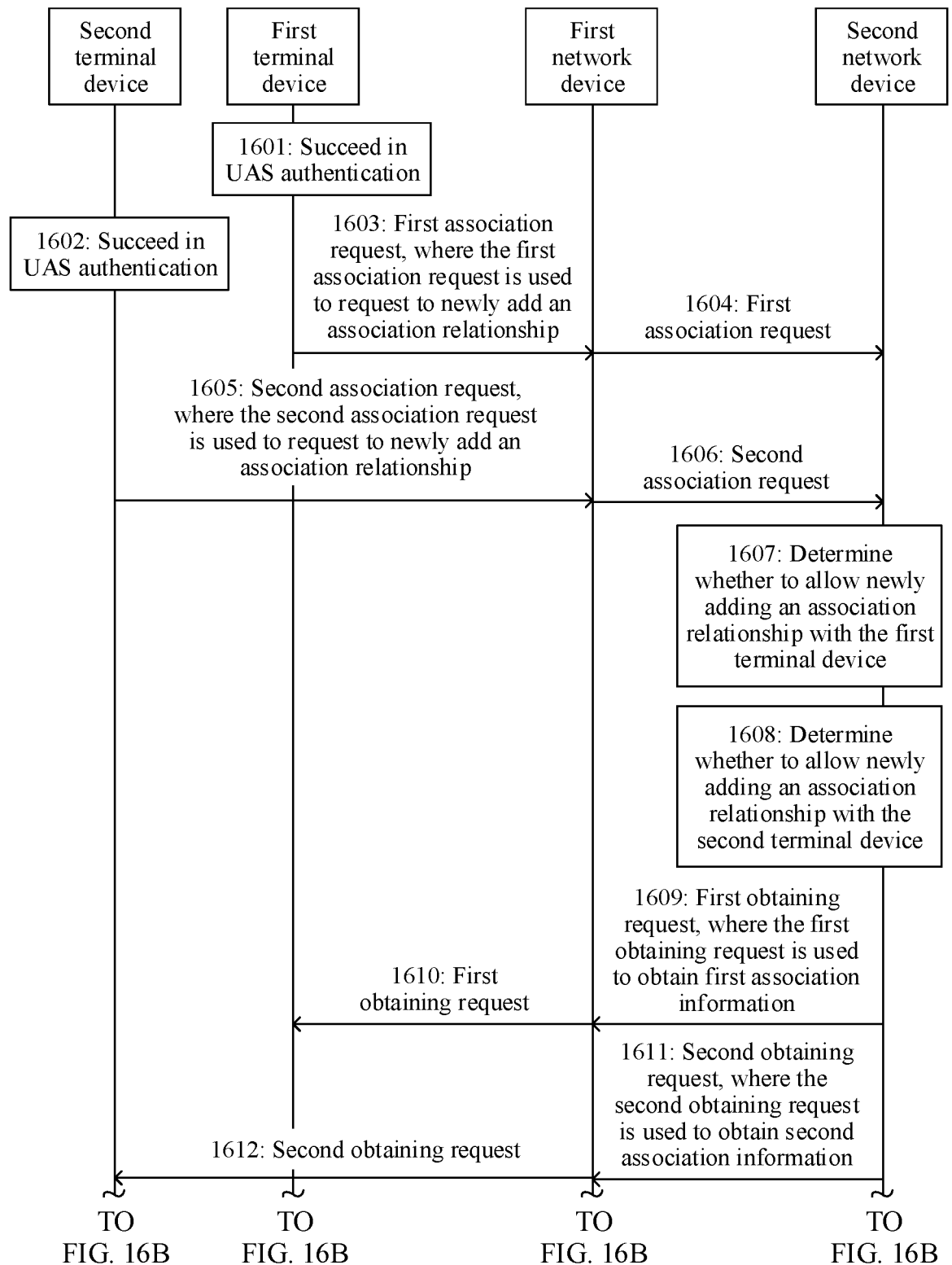
FIG. 16A and FIG. 16B are a schematic flowchart of even still another identity authentication method according to an embodiment of this application.
Figure 16B:
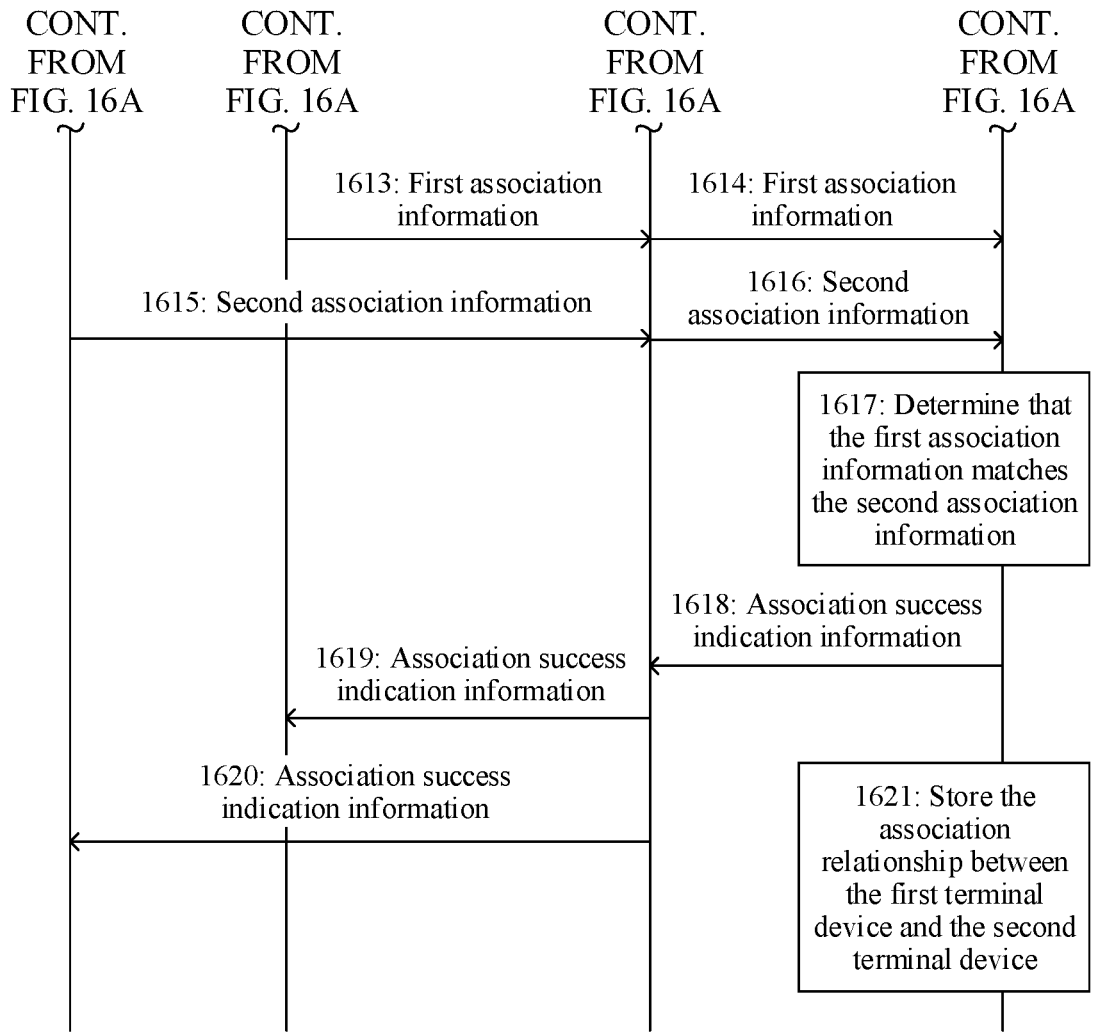

In an embodiment, as shown in FIG. 16A and FIG. 16B, after receiving the first association request, the second network device may further determine whether to allow newly adding the association relationship with the first terminal device. If the second network device determines to allow newly adding the association relationship with the first terminal device, the second network device sends the first obtaining request to the first network device. Otherwise, the second network device sends, to the first network device, indication information indicating that the newly added association fails. The first network device sends the indication information to the first terminal device. For a method for determining whether to allow newly adding the association relationship with the first terminal device, refer to the foregoing descriptions.

Alternatively, the first network device may determine whether to allow newly adding the association relationship with the first terminal device. After receiving the first association request, the first network device may determine whether to allow newly adding the association relationship with the first terminal device. If the first network device determines to allow newly adding the association relationship with the first terminal device, the first network device sends the first association request to the second network device. Otherwise, the first network device sends, to the first terminal device, indication information indicating that the newly added association fails.

It goes the same after the first network device and the second network device receive the second association request, and details are not described herein again.

In an embodiment, as shown in FIG. 16A and FIG. 16B, after determining that the first association information matches the second association information, the second network device may store the association relationship between the first terminal device and the second terminal device. Alternatively, after receiving the association indication information, the first network device may store the association relationship between the first terminal device and the second terminal device. The association relationship between the first terminal device and the second terminal device is stored, so that when the first terminal device and the second terminal device need to be paired for use next time, the association relationship does not need to be re-established. This helps reduce an association time or a pairing time.

By implementing the method described in FIG. 15A and FIG. 15B, authentication can be performed on the association relationship between the first terminal device and the second terminal device.

Figure 17:
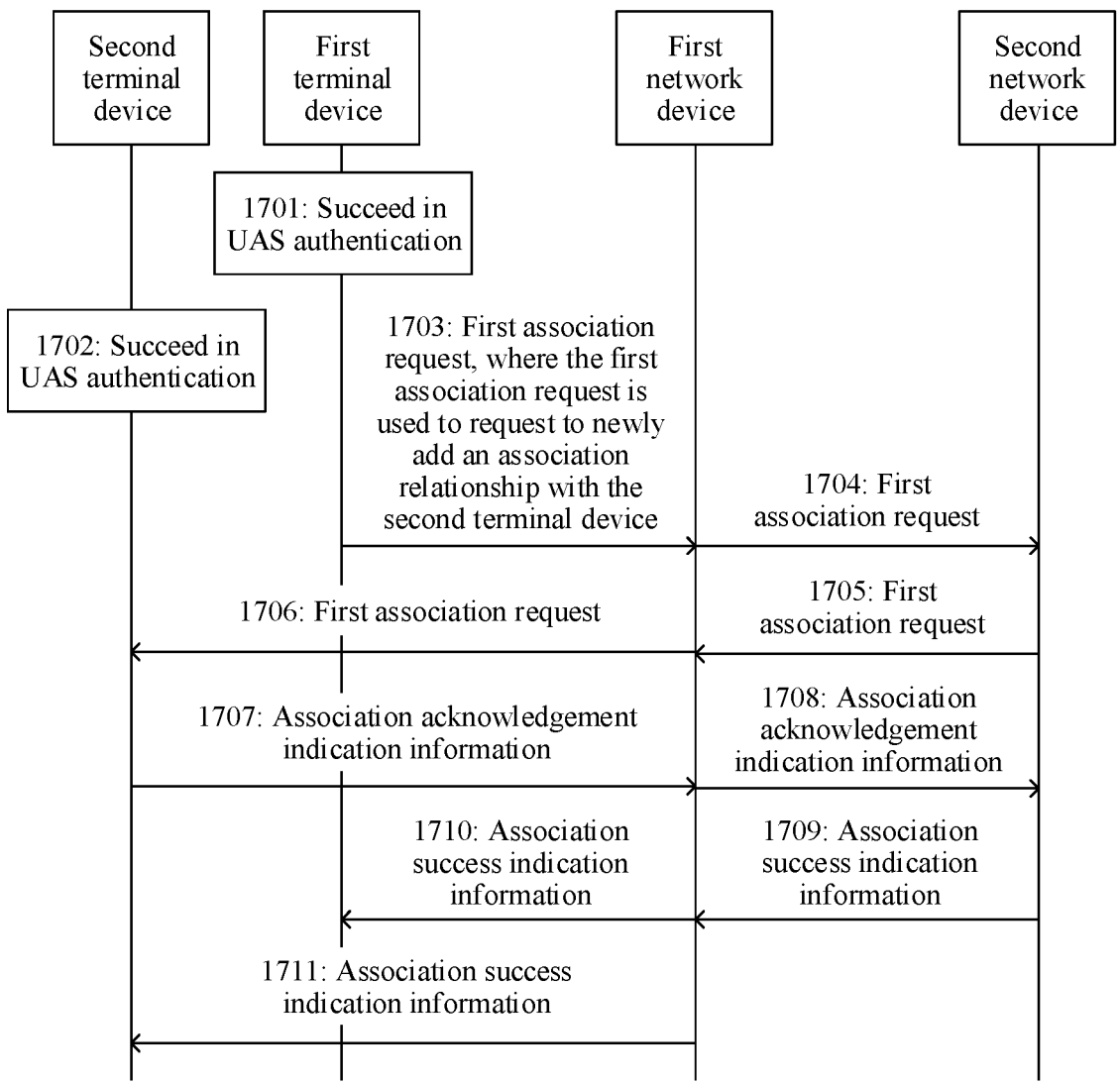
FIG. 17 is a schematic flowchart of an even still further identity authentication method according to an embodiment of this application.

FIG. 17 is a schematic flowchart of an even still further identity authentication method according to an embodiment of this application. A difference between the identity authentication method shown in FIG. 17 and the identity authentication methods shown in FIG. 11A and FIG. 11B to FIG. 14A and FIG. 14B lies in that, in FIG. 11A and FIG. 11B to FIG. 14A and FIG. 14B, authorization or authentication is performed on the newly added association relationship in a process in which UAS authentication is performed on the terminal device performs, and in FIG. 17, authorization or authentication is performed on a newly added association relationship after a first terminal device and a second terminal device succeed in UAS authentication. As shown in FIG. 17, the identity authentication method includes step 1701 to step 1700.

1701: The first terminal device succeeds in UAS authentication.

1702: The second terminal device succeeds in UAS authentication.

Step 1703 and step 1705 are respectively performed after step 1701 and step 1702.

1703: The first terminal device sends a first association request to a first network device, where the first association request is used to request to newly add an association relationship with the second terminal device.

In an embodiment, the first association request may carry a UAS identifier of the first terminal device, a terminal identifier (for example, an SUCI or a GUTI) of the first terminal device, and UAS type information of the first terminal device. The first association request may further carry a UAS identifier of the second terminal device, a terminal identifier (for example, an SUCI or a GUTI) of the second terminal device, and UAS type information of the second terminal device. The UAS type information is used to indicate a device type of the device in a UAS.

1704: The first network device sends the first association request to a second network device.

In this embodiment of this application, after receiving the first association request, the first network device sends the first association request to the second network device.

1705: The second network device sends the first association request to the first network device.

In this embodiment of this application, after receiving the first association request, the second network device sends the first association request to the first network device.

1706: The first network device sends the first association request to the second terminal device.

In this embodiment of this application, after receiving the first association request, the first network device sends the first association request to the second terminal device.

1707: The second terminal device sends association acknowledgement indication information to the first network device.

In this embodiment of this application, after receiving the first association request, the second terminal device sends the association acknowledgement indication information to the first network device. Alternatively, the second terminal device may send association denial indication information to the first network device, to indicate to deny association with the first terminal device. For example, after receiving the first association request, the second terminal device may output prompt information, to indicate whether to accept the association request of the first terminal device. After receiving an association acknowledgement operation, the second terminal device sends the association acknowledgement indication information to the first network device. After receiving an association denial operation, the second terminal device sends the association denial indication information to the first network device.

1708: The first network device sends the association acknowledgement indication information to the second network device.

In this embodiment of this application, after receiving the association acknowledgement indication information, the first network device sends the association acknowledgement indication information to the second network device.

1709: The second network device sends association success indication information to the first network device.

In this embodiment of this application, after receiving the association acknowledgement indication information, the second network device sends the association success indication information to the first network device. The association success indication information indicates that the first terminal device is successfully associated with the second terminal device.

In an embodiment, if the second network device receives the association denial indication information of the second terminal device, the second network device may further send association failure indication information to the first network device, to indicate that the first terminal device fails to be associated with the second terminal device. After receiving the association failure indication information, the first network device sends the association failure indication information to the first terminal device and the second terminal device.

1710: The first network device sends the association success indication information to the first terminal device.

1711: The first network device sends the association success indication information to the second terminal device.

In this embodiment of this application, after receiving the association success indication information, the first network device sends the association success indication information to the first terminal device and the second terminal device.

Figure 18:
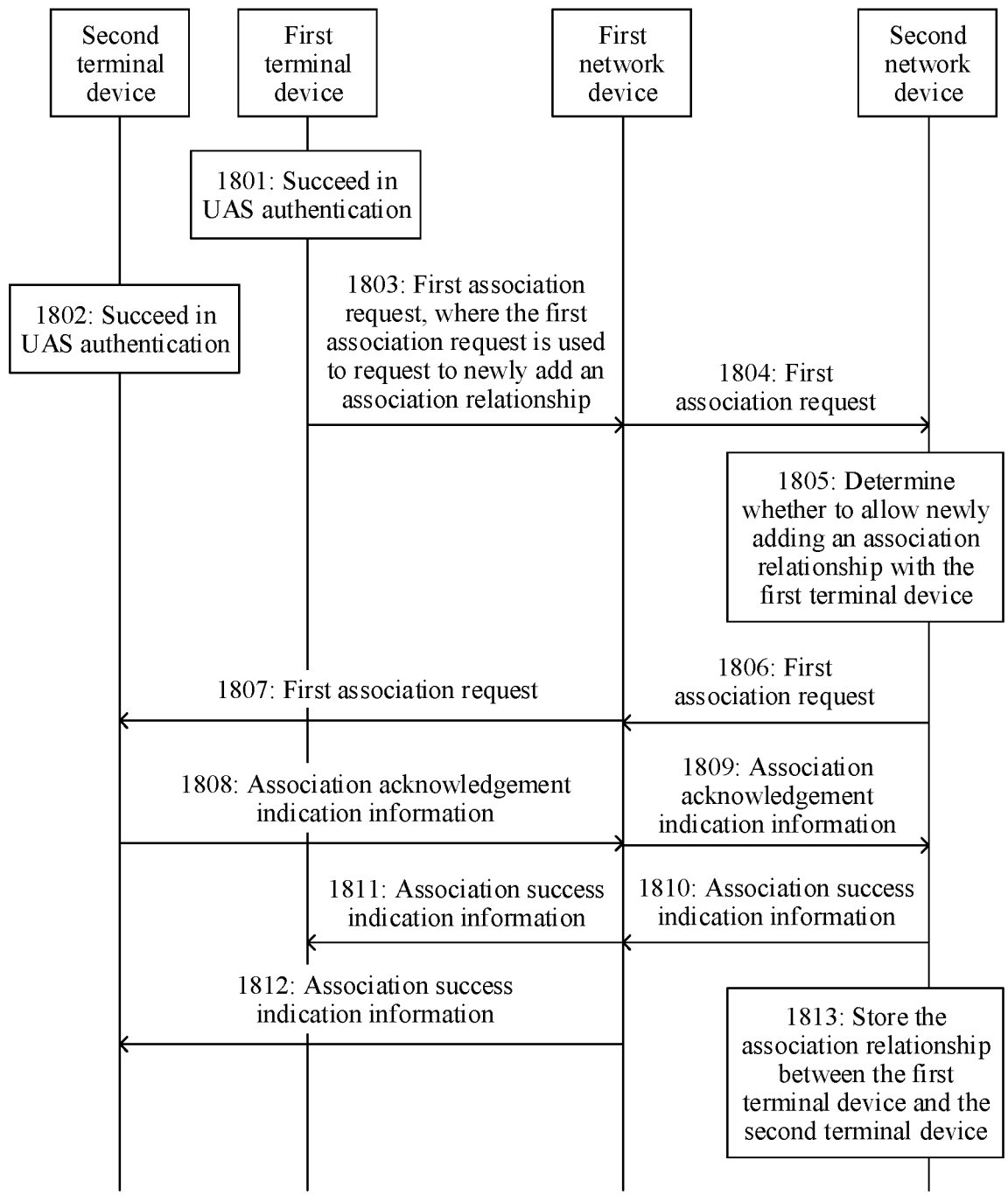
FIG. 18 is a schematic flowchart of yet even still another identity authentication method according to an embodiment of this application.

In an embodiment, as shown in FIG. 18, after receiving the first association request, the second network device may further determine whether to allow newly adding the association relationship with the first terminal device. If the second network device determines to allow newly adding the association relationship with the first terminal device, the second network device sends the first association request to the first network device. Otherwise, the second network device sends, to the first network device, indication information indicating that the newly added association fails. For a method for determining whether to allow newly adding the association relationship with the first terminal device, refer to the foregoing descriptions.

In an embodiment, after receiving the association acknowledgement indication information, the second network device may store the association relationship between the first terminal device and the second terminal device.

In an embodiment, after receiving the association success indication information, the first network device may store the association relationship between the first terminal device and the second terminal device.

In an embodiment, there may be another execution sequence of step 1701 to step 1711. An execution sequence of step 1701 to step 1711 is not limited in this application.

By implementing the method described in FIG. 17, authentication can be performed on the association relationship between the first terminal device and the second terminal device.

Figure 19:
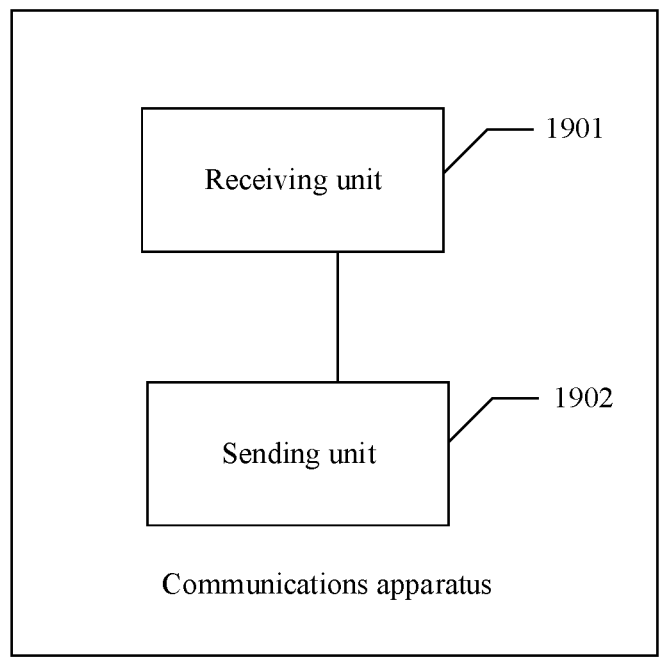
FIG. 19 is a schematic diagram of a structure of a communications apparatus according to an embodiment of this application.

FIG. 19 is a schematic diagram of a structure of a communications apparatus according to an embodiment of this application. The communications apparatus shown in FIG. 19 may be configured to implement some or all functions of the first network device in the method embodiments described in FIG. 3 to FIG. 17. The apparatus may be a network device, an apparatus in the network device, or an apparatus that can be used together with the network device. The communications apparatus may alternatively be a chip system. The communications apparatus shown in FIG. 19 may include a receiving unit 1901 and a sending unit 1902.

The receiving unit 1901 is configured to receive a first request sent by a first terminal device, where the first request carries first authentication indication information, the first authentication indication information is used to request to perform unmanned aerial system UAS authentication on the first terminal device, and the first terminal device is a device in a UAS. The sending unit 1902 is configured to send a second request to the first terminal device, where the second request is used to request to obtain a UAS identifier of the first terminal device. The receiving unit 1901 is further configured to receive the UAS identifier of the first terminal device that is sent by the first terminal device. The sending unit 1902 is further configured to send the UAS identifier of the first terminal device to a second network device. The receiving unit 1901 is further configured to receive a UAS authentication result of the first terminal device that is sent by the second network device. The sending unit 1902 is further configured to send the UAS authentication result of the first terminal device to the first terminal device.

In an embodiment, the first authentication indication information is registration type information or UAS type information of the first terminal device, and the UAS type information indicates a device type of the first terminal device in the UAS.

In an embodiment, the communications apparatus further includes: a processing unit, configured to determine whether to perform UAS authentication on the first terminal device. A manner in which the sending unit 1902 sends the second request to the first terminal device is specifically: when the processing unit determines to perform UAS authentication on the first terminal device, sending the second request to the first terminal device.

In an embodiment, a manner in which the processing unit determines whether to perform UAS authentication on the first terminal device is specifically: determining, based on a UAS authentication status identifier of the first terminal device, whether to perform UAS authentication on the first terminal device.

In an embodiment, the first request carries the UAS type information of the first terminal device, and the UAS type information indicates the device type, a business type, or a service type of the first terminal device in the UAS. A manner in which the processing unit determines whether to perform UAS authentication on the first terminal device is specifically: determining, based on the received UAS type information, whether to perform UAS authentication on the first terminal device.

In an embodiment, the first request carries the UAS type information of the first terminal device, and the UAS type information indicates the device type of the first terminal device in the UAS. The sending unit 1902 is further configured to send the UAS type information of the first terminal device to the second network device.

In an embodiment, the second request is further used to request to obtain the UAS type information of the first terminal device, and the UAS type information indicates the device type of the first terminal device in the UAS. The receiving unit 1901 is further configured to receive the UAS type information of the first terminal device that is sent by the first terminal device. The sending unit 1902 is further configured to send the UAS type information of the first terminal device to the second network device.

In an embodiment, the communications apparatus further includes a processing unit, configured to update a UAS authentication status of the first terminal device based on the UAS authentication result.

In an embodiment, after the receiving unit 1901 receives the UAS identifier of the first terminal device, the receiving unit 1901 may further receive a UAS authentication result that is of a second terminal device associated with the first terminal device and that is sent by the second network device. The sending unit 1902 is further configured to send the UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The sending unit 1902 is further configured to: send the UAS authentication result of the second terminal device and the UAS authentication result of the first terminal device to the second terminal device, or send the UAS authentication result of the second terminal device and the association indication information to the second terminal device.

In an embodiment, after the sending unit 1902 sends the UAS identifier of the first terminal device to the second network device, the receiving unit 1901 may further receive a UAS identifier, an SUPI, or a GPSI of a second terminal device that is sent by the second network device, and the sending unit 1902 sends the UAS identifier of the second terminal device to the second network device. After the receiving unit 1901 receives a UAS authentication result of the second terminal device, the sending unit 1902 is further configured to send the UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The sending unit 1902 is further configured to send the UAS authentication result of the second terminal device and the UAS authentication result of the first terminal device or the association indication information to the second terminal device.

In an embodiment, the first network device further includes a processing unit, configured to: after the receiving unit 1901 receives the UAS identifier, the SUPI, or the GPSI of the second terminal device associated with the first terminal device, determine whether to perform UAS authentication on the second terminal device. If yes, the sending unit 1902 sends the UAS identifier of the second terminal device to the second network device. Optionally, if the processing unit determines not to allow UAS authentication for the second terminal device, the sending unit 1902 sends indication information to the first terminal device, where the indication information indicates that the first terminal device fails to be associated with the second terminal device.

In an embodiment, the first request further carries newly-added-association indication information. A specific implementation in which the sending unit 1902 sends the UAS identifier of the first terminal device to a second network device is: sending the UAS identifier of the first terminal device and the newly-added-association indication information to the second network device. After the sending unit 1902 sends the UAS identifier of the first terminal device and the newly-added-association indication information to the second network device, the sending unit 1902 sends, to the first terminal device, a request used to obtain first association information of the first terminal device. The receiving unit 1901 receives the first association information of the first terminal device that is sent by the first terminal device. The sending unit 1902 sends the first association information of the first terminal device to the second network device. A specific implementation in which the receiving unit 1901 receives a UAS authentication result of the first terminal device that is sent by the second network device is: receiving the UAS authentication result of the first terminal device and a UAS identifier, an SUPI, or a GPSI of a second terminal device that are sent by the second network device. After the receiving unit 1901 receives the UAS authentication result of the first terminal device and the UAS identifier, the SUPI, or the GPSI of the second terminal device, the sending unit 1902 further sends a UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The sending unit 1902 may further send the UAS authentication result of the first terminal device or association indication information to the second terminal device.

In an embodiment, after the receiving unit 1901 receives the first request, the processing unit may determine whether to allow newly adding the association relationship with the first terminal device. If the processing unit allows newly adding the association relationship with the first terminal device, the sending unit 1902 sends the second request to the first terminal device. Optionally, if the processing unit does not allow newly adding the association relationship with the first terminal device, the sending unit 1902 sends, to the first terminal device, indication information indicating that the newly added association fails.

In an embodiment, the first request further carries newly-added-association indication information, where the newly-added-association indication information is used to request to newly add an association relationship. After the receiving unit 1901 receives the first request, the sending unit 1902 sends, to the first terminal device, a request used to obtain first association information of the first terminal device. The receiving unit 1901 receives the first association information sent by the first terminal device. The processing unit determines that the first association information matches second association information sent by a second terminal device. The sending unit 1902 sends a UAS authentication result of the second terminal device or association indication information to the first terminal device, where the association indication information indicates a result of association between the first terminal device and the second terminal device, and the association indication information is obtained based on the UAS authentication result of the first terminal device and the UAS authentication result of the second terminal device. The sending unit 1902 sends the UAS authentication result of the first terminal device or the association indication information to the second terminal device.

In an embodiment, after the receiving unit 1901 receives the first request, the processing unit may determine whether to allow newly adding the association relationship with the first terminal device. If the processing unit allows newly adding the association relationship with the first terminal device, the sending unit 1902 sends the second request to the first terminal device. Optionally, if the processing unit does not allow newly adding the association relationship with the first terminal device, the sending unit 1902 sends, to the first terminal device, indication information indicating that the newly added association fails.

In an embodiment, after determining that the first association information matches the second association information, the processing unit may further store the association relationship between the first terminal device and the second terminal device. Optionally, the processing unit may further store the association relationship between the first terminal device and the second terminal device only when determining that both the UAS authentication result of the first terminal device and the UAS authentication result of the second terminal device indicate that the authentication succeeds.

In an embodiment, the first request may further carry the UAS identifier of the first terminal device. In this way, the sending unit 1902 does not need to send the second request to the first terminal device, and the receiving unit 1901 does not need to receive the UAS identifier sent by the first terminal device in response to the second request.

FIG. 19 is a schematic diagram of a structure of a communications apparatus according to an embodiment of this application. The communications apparatus shown in FIG. 19 may be configured to implement some or all functions of the first terminal device in the method embodiments described in FIG. 3 to FIG. 17. The apparatus may be a terminal device, an apparatus in the terminal device, or an apparatus that can be used together with the terminal device. The communications apparatus may alternatively be a chip system. The communications apparatus shown in FIG. 19 may include a receiving unit 1901 and a sending unit 1902.

The sending unit 1902 is configured to send a first request to a first network device, where the first request carries first authentication indication information, and the first authentication indication information is used to request to perform UAS authentication on the communications apparatus.

The receiving unit 1901 is configured to receive a second request sent by the first network device, where the second request is used to request to obtain a UAS identifier of the communications apparatus.

The sending unit 1902 is further configured to send the UAS identifier of the communications apparatus to the first network device in response to the second request.

The receiving unit 1901 is further configured to receive a UAS authentication result of the communications apparatus that is sent by the first network device.

In an embodiment, the first authentication indication information is registration type information or UAS type information of the communications apparatus, and the UAS type information indicates a device type of the communications apparatus in a UAS.

In an embodiment, the first request carries the UAS type information of the communications apparatus, and the UAS type information indicates the device type, a business type, or a service type of the communications apparatus in the UAS.

In an embodiment, the second request is further used to request to obtain the UAS type information of the communications apparatus.

The sending unit 1902 is further configured to send the UAS type information of the communications apparatus to the first network device.

In an embodiment, the receiving unit 1901 may further receive a UAS authentication result of a second terminal device associated with the first terminal device. A processing unit determines a result of association between the first terminal device and the second terminal device based on the UAS authentication result of the first terminal device and the UAS authentication result of the second terminal device. Alternatively, the receiving unit 1901 may receive association indication information, where the association indication information indicates a result of association between the first terminal device and a second terminal device, and the association indication information is obtained based on the UAS authentication result of the first terminal device and a UAS authentication result of the second terminal device.

In an embodiment, the first request further carries newly-added-association indication information. The receiving unit 1901 may further receive a UAS authentication result of a second terminal device. A processing unit determines a result of association between the first terminal device and the second terminal device based on the UAS authentication result of the first terminal device and the UAS authentication result of the second terminal device. Alternatively, the receiving unit 1901 may receive association indication information, where the association indication information indicates a result of association between the first terminal device and a second terminal device, and the association indication information is obtained based on the UAS authentication result of the first terminal device and a UAS authentication result of the second terminal device.

In an embodiment, the receiving unit 1901 receives a request that is sent by the first network device and that is used to obtain first association information of the first terminal device. The sending unit 1902 sends the first association information of the first terminal device to the first network device. The receiving unit 1901 may further receive a UAS authentication result of a second terminal device. The first terminal device determines a result of association between the first terminal device and the second terminal device based on the UAS authentication result of the first terminal device and the UAS authentication result of the second terminal device. Alternatively, the receiving unit 1901 may receive association indication information, where the association indication information indicates a result of association between the first terminal device and a second terminal device, and the association indication information is obtained based on the UAS authentication result of the first terminal device and a UAS authentication result of the second terminal device.

In an embodiment, after the UAS authentication succeeds, the sending unit 1902 sends a first association request to the first network device, where the first association request is used to request to newly add an association relationship. The receiving unit 1901 receives a first obtaining request sent by the first network device. The sending unit 1902 sends first association information to the first network device. The receiving unit 1901 receives association success indication information, where the association success indication information indicates that the first terminal device is successfully associated with the second terminal device.

In an embodiment, after the UAS authentication succeeds, the sending unit 1902 sends a first association request to the first network device, where the first association request is used to request to newly add an association relationship with the second terminal device. The receiving unit 1901 receives association success indication information.

Figure 20:
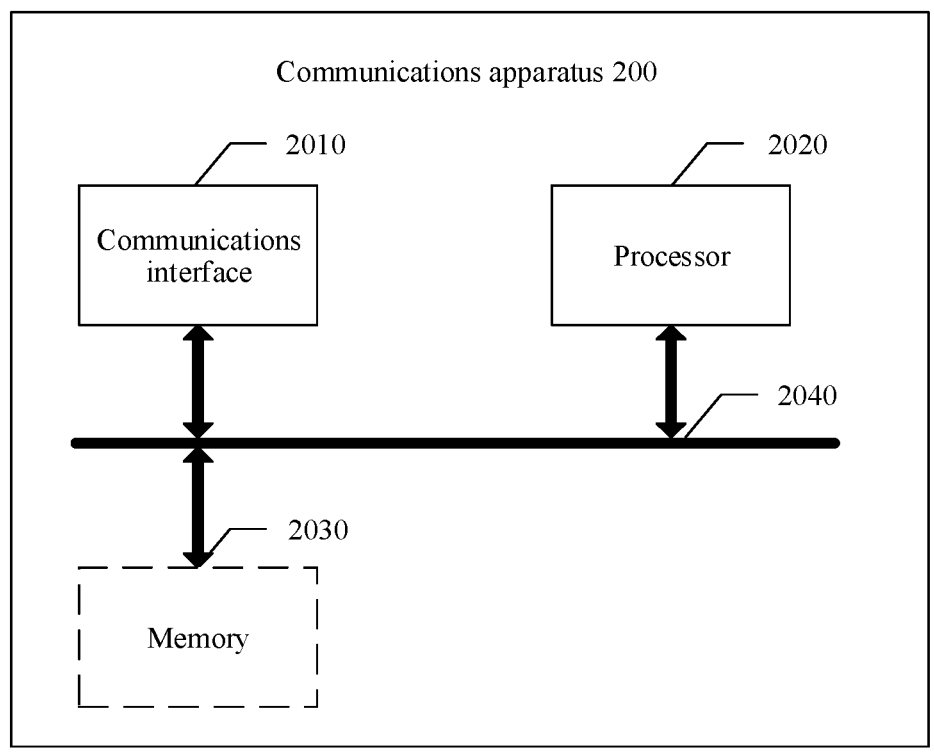
FIG. 20 is a schematic diagram of a structure of another communications apparatus according to an embodiment of this application.

FIG. 20 shows a communications apparatus 200 according to an embodiment of this application, configured to implement functions of the first network device in the foregoing methods. The apparatus may be a network device or an apparatus in the network device. For example, the network device may be an AMF or an SEAF. The apparatus in the network device may be a chip system or a chip in the network device. The chip system may include a chip, or may include a chip and another discrete component. The communications apparatus 200 includes at least one processor 2020, configured to implement a data processing function of the first network device in the methods provided in embodiments of this application. The apparatus 200 may further include a communications interface 2010, configured to implement receiving and sending operations of the first network device in the methods provided in embodiments of this application. In embodiments of this application, the communications interface may be a transceiver, a circuit, a bus, a module, or a communications interface of another type, and is configured to communicate with another device by using a transmission medium. For example, the communications interface 2010 is used by an apparatus in the apparatus 200 to communicate with another device. The processor 2020 receives and sends data through the communications interface 2010, and is configured to implement the methods in the foregoing method embodiments.

The apparatus 200 may further include at least one memory 2030, configured to store program instructions and/or data. The memory 2030 is coupled to the processor 2020. Couplings in embodiments of this application are indirect couplings or communication connections between apparatuses, units, or modules, may be electrical, mechanical, or in another form, and are used for information exchange between the apparatuses, the units, or the modules. The processor 2020 may operate in cooperation with the memory 2030. The processor 2020 may execute the program instructions stored in the memory 2030. At least one of the at least one memory may be included in the processor.

In embodiments of this application, a specific connection medium between the communications interface 2010, the processor 2020, and the memory 2030 is not limited. In embodiments of this application, the memory 2030, the processor 2020, and the communications interface 2010 are connected through a bus 2040 in FIG. 20, and the bus is represented by a thick line in FIG. 20. A connection manner between other components is merely an example for description, and is not limited thereto. The bus may be classified into an address bus, a data bus, a control bus, and the like. For ease of representation, only one thick line is used to represent the bus 2003 in FIG. 20, but this does not mean that there is only one bus or only one type of bus.

When the apparatus 200 is specifically an apparatus in a first network device, for example, when the apparatus 200 is specifically a chip or a chip system, the communications interface 2010 may output or receive a baseband signal. When the apparatus 200 is specifically the first network device, the communications interface 2010 may output or receive a radio frequency signal. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the methods disclosed with reference to embodiments of this application may be directly performed and completed by a hardware processor, or may be performed and completed through a combination of hardware and software modules in the processor.

Figure 21A:
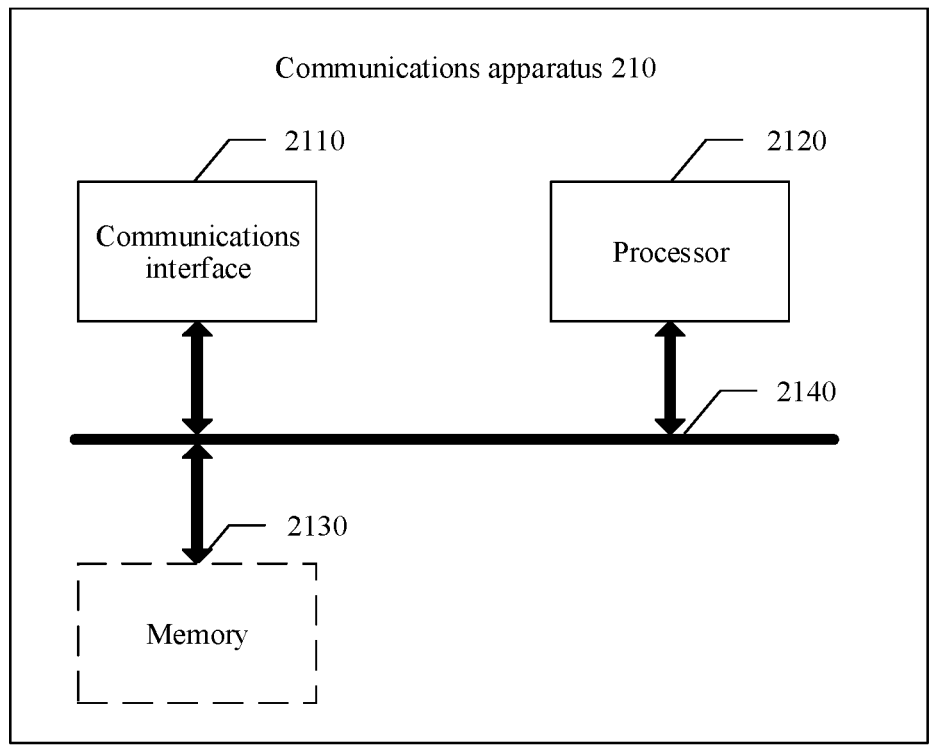
FIG. 21a is a schematic diagram of a structure of a further communications apparatus according to an embodiment of this application.

FIG. 21*a* shows a communications apparatus 210 according to an embodiment of this application, configured to implement functions of the first terminal device in the foregoing methods. The apparatus may be a terminal device or an apparatus in the terminal device. For example, the terminal device may be a mobile phone, a wearable device, or a tablet computer. The apparatus in the terminal device may be a chip system or a chip in the terminal device. The chip system may include a chip, or may include a chip and another discrete component. The apparatus 210 includes at least one processor 2121, configured to implement a data processing function of the first terminal device in the methods provided in embodiments of this application. The apparatus 210 may further include a communications interface 2110, configured to implement receiving and sending operations of the first terminal device in the methods provided in embodiments of this application. In embodiments of this application, the communications interface may be a transceiver, a circuit, a bus, a module, or a communications interface of another type, and is configured to communicate with another device by using a transmission medium. For example, the communications interface 2110 is used by an apparatus in the apparatus 210 to communicate with another device. The processor 2121 receives and sends data through the communications interface 2110, and is configured to implement the methods in the foregoing method embodiments.

The apparatus 210 may further include at least one memory 2130, configured to store program instructions and/or data. The memory 2130 is coupled to the processor 2121. Couplings in embodiments of this application are indirect couplings or communication connections between apparatuses, units, or modules, may be electrical, mechanical, or in another form, and are used for information exchange between the apparatuses, the units, or the modules. The processor 2121 may operate in cooperation with the memory 2130. The processor 2121 may execute the program instructions stored in the memory 2130. At least one of the at least one memory may be included in the processor.

In embodiments of this application, a specific connection medium between the communications interface 2110, the processor 2121, and the memory 2130 is not limited. In embodiments of this application, the memory 2130, the processor 2121, and the communications interface 2110 are connected through a bus 2140 in FIG. 21*a*, and the bus is represented by a thick line in FIG. 21*a*. A connection manner between other components is merely an example for description, and is not limited thereto. The bus may be classified into an address bus, a data bus, a control bus, and the like. For ease of representation, only one thick line is used to represent the bus in FIG. 21*a*, but this does not mean that there is only one bus or only one type of bus.

When the apparatus 210 is specifically an apparatus in a terminal device, for example, when the apparatus 210 is specifically a chip or a chip system, the communications interface 2110 may output or receive a baseband signal. When the apparatus 210 is specifically the terminal device, the communications interface 2110 may output or receive a radio frequency signal. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed through a combination of hardware and software modules in the processor.

Figure 21B:
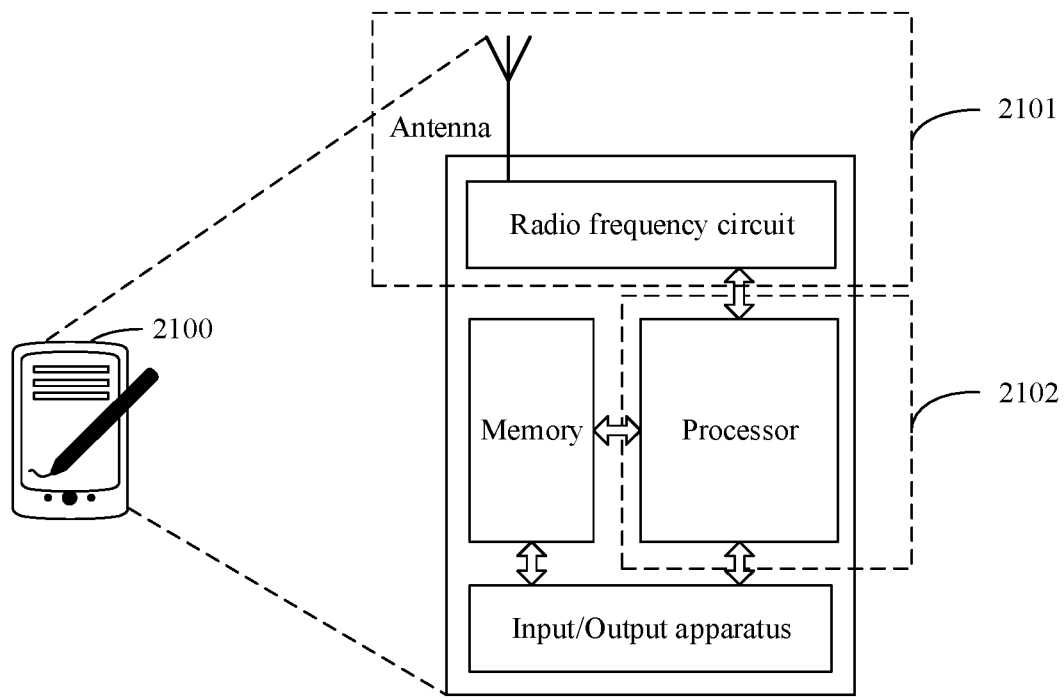
FIG. 21b is a schematic diagram of a structure of still another communications apparatus according to an embodiment of this application.

For example, FIG. 21*b* is a schematic diagram of a structure of another terminal device 2100 according to an embodiment of this application. The terminal device may perform the operations performed by the first terminal device in the foregoing method embodiments.

For ease of description, FIG. 21*b* shows only main components of the terminal device. As shown in FIG. 21*b*, the terminal device 2100 includes a processor, a memory, a radio frequency circuit, an antenna, and an input/output apparatus. The processor is mainly configured to: process a communications protocol and communications data, control the entire terminal device, execute a software program, and process data of the software program, for example, configured to support the terminal device in executing the procedures described in FIG. 3 to FIG. 17. The memory is configured to store the software program and the data. The radio frequency circuit is mainly configured to: perform conversion between a baseband signal and a radio frequency signal, and process the radio frequency signal. The antenna is mainly configured to receive and send radio frequency signals in a form of an electromagnetic wave. The terminal device 2100 may further include the input/output apparatus, such as a touchscreen, a display, or a keyboard, which is mainly configured to: receive data entered by a user, and output data to the user. It should be noted that some types of terminal devices may have no input/output apparatus.

After the terminal device is powered on, the processor may read a software program in a storage unit, explain and execute the software program, and process data of the software program. When data needs to be sent wirelessly, the processor performs baseband processing on the to-be-sent data, and outputs a baseband signal to a radio frequency circuit. The radio frequency circuit performs radio frequency processing on the baseband signal, and then sends a radio frequency signal in an electromagnetic wave form by using the antenna. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 21b shows only one memory and only one processor. Actually, the terminal device may include a plurality of processors and a plurality of memories. A memory may also be referred to as a storage medium, a storage device, or the like. This is not limited in embodiments of this application.

In an optional implementation, the processor may include a baseband processor and a central processing unit (CPU). The baseband processor is mainly configured to process a communications protocol and communications data. The CPU is mainly configured to: control the entire terminal device, execute a software program, and process data of the software program. Optionally, the processor may alternatively be a network processor (NP) or a combination of a CPU and an NP. The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory (volatile memory), for example, a random access memory (RAM); or the memory may include a non-volatile memory, for example, a flash memory, a hard disk drive (HDD), or a solid-state drive (SSD); or the memory may include a combination of the foregoing types of memories.

For example, in embodiments of this application, as shown in FIG. 21b, the antenna and the radio frequency circuit that have a transceiver function may be considered as a communications unit 2101 of the terminal device 2100, and the processor having a processing function may be considered as a processing unit 2102 of the terminal device 2100.

The communications unit 2101 may also be referred to as a transceiver, a transceiver apparatus, or the like, and is configured to implement a transceiver function. Optionally, a component that is in the communications unit 2101 and that is configured to implement a receiving function may be considered as a receiving unit, and a component that is in the communications unit 2101 and that is configured to implement a sending function may be considered as a sending unit. In other words, the communications unit 2101 includes the receiving unit and the sending unit. For example, the receiving unit may also be referred to as a receiver or a receiver circuit, and the sending unit may also be referred to as a transmitter or a transmitter circuit.

In some embodiments, the communications unit 2101 and the processing unit 2102 may be integrated into one component, or may be separated as different components. In addition, the processor and the memory may be integrated into one component, or may be separated as different components.

The communications unit 2101 may be configured to perform receiving and sending operations of the first terminal device in the foregoing method embodiments. The processing unit 2102 may be configured to perform a data processing operation of the first terminal device in the foregoing method embodiments.

An embodiment of the present disclosure further provides a computer-readable storage medium. The computer-readable storage medium stores instructions. When the instructions are run on a processor, the method procedures in the foregoing method embodiments are implemented.

An embodiment of the present disclosure further provides a computer program product. When the computer program product runs on a processor, the method procedures in the foregoing method embodiments are implemented.

It should be noted that, for ease of description, the foregoing method embodiments are expressed as combinations of a series of actions. However, a person skilled in the art should know that the present disclosure is not limited to the described action sequence, because some steps may be performed in other sequences or performed simultaneously according to the present disclosure. In addition, a person skilled in the art should also understand that all the embodiments described in this specification belong to example embodiments, and the involved actions and modules are not necessarily mandatory to the present disclosure.

Descriptions of embodiments provided in this application may be mutually referenced, and the descriptions of embodiments have different focuses. For a part not described in detail in an embodiment, refer to related descriptions of another embodiment. For ease and brevity of description, for example, for functions and performed steps of the apparatuses and devices provided in embodiments of this application, refer to related descriptions of the method embodiments of this application. The method embodiments and the apparatus embodiments may also be referenced, combined, or cited to each other.

Finally, it should be noted that the foregoing embodiments are merely intended to describe the technical solutions of this application, but not to limit this application. Although this application is described in detail with reference to the foregoing embodiments, a person of ordinary skill in the art should understand that they can still make modifications to the technical solutions described in the foregoing embodiments or make equivalent replacements to some or all technical features thereof, without departing from the scope of the technical solutions of embodiments of this application.

What is claimed is:

1. An identity authentication method, wherein the method comprises:
    receiving, by a first network device, a first request from a first terminal device, wherein the first request carries first authentication indication information and an unmanned aerial system (UAS) identifier of the first terminal device, wherein the first authentication indication information is used to request to perform UAS authentication on the first terminal device;

determining, by the first network device, based on a UAS authentication status of the first terminal device and first information, to perform UAS authentication on the first terminal device, wherein the UAS authentication status of the first terminal device indicates that UAS authentication on the first terminal device is to be performed, and wherein the first information indicates that UAS authentication on the first terminal device is allowed;

sending, by the first network device, the UAS identifier of the first terminal device to a second network device;

performing, by the second network device, UAS authentication on the first terminal device based on the UAS identifier;

sending, by the second network device, a UAS authentication result of the first terminal device to the first network device; and sending, by the first network device, the UAS authentication result of the first terminal device to the first terminal device.

2. The method according to claim 1, wherein the first authentication indication information is UAS type information of the first terminal device, and the UAS type information indicates a device type of the first terminal device in a UAS.

3. The method according to claim 1,
wherein the first request carries UAS type information of the first terminal device, and the UAS type information indicates the device type of the first terminal device in the UAS; and
wherein the determining, by the first network device, to perform UAS authentication on the first terminal device further comprises:
determining, by the first network device based on the received UAS type information, to perform UAS authentication on the first terminal device.

4. The method according to claim 1, wherein the first information comprises a first list of devices for which UAS authentication are not allowed and the first list does not include the first terminal device; or a second list of devices for which UAS authentication are allowed and the second list includes the first terminal device.

5. The method according to claim 1, wherein the method further comprises:
updating, by the first network device, the UAS authentication status of the first terminal device based on the UAS authentication result.

6. An identity authentication method, wherein the method comprises:
receiving, by a first network device, a first request from a first terminal device, wherein the first request carries first authentication indication information and an unmanned aerial system (UAS) identifier of the first terminal device, the first authentication indication information is used to request to perform UAS authentication on the first terminal device, wherein the first terminal device is a device in a UAS;
determining, by the first network device, based on a UAS authentication status of the first terminal device and first information, to perform UAS authentication on the first terminal device, wherein the UAS authentication status of the first terminal device indicates that UAS authentication on the first terminal device is to be performed, and wherein the first information indicates that UAS authentication on the first terminal device is allowed;

sending, by the first network device, the UAS identifier of the first terminal device to a second network device;

receiving, by the first network device, a UAS authentication result of the first terminal device from the second network device; and sending, by the first network device, the UAS authentication result of the first terminal device to the first terminal device.

7. The method according to claim 6, wherein the first information comprises a first list of devices for which UAS authentication are not allowed and the first list does not include the first terminal device, or a second list of devices for which UAS authentication are allowed and the second list includes the first terminal device.

8. The method according to claim 6, wherein the first request carries UAS type information of the first terminal device, and the UAS type information indicates the device type of the first terminal device in the UAS, and wherein the method further comprises:
sending, by the first network device, the UAS type information of the first terminal device to the second network device.

9. The method according to claim 6, wherein the method her further comprises:
updating, by the first network device, the UAS authentication status of the first terminal device based on the UAS authentication result.

10. A communications apparatus, wherein the communications apparatus comprises:
at least one processor; and
a memory coupled to the processor and having program instructions stored thereon that, when executed by the at least one processor, cause the communications apparatus to:
receive a first request from a first terminal device, wherein the first request carries first authentication indication information and an unmanned aerial system (UAS) identifier of the first terminal device, the first authentication indication information is used to request to perform UAS authentication on the first terminal device, and the first terminal device is a device in a UAS;
determine, based on a UAS authentication status of the first terminal device and first information, to perform UAS authentication on the first terminal device, wherein the UAS authentication status of the first terminal device indicates that UAS authentication on the first terminal device is to be performed, and wherein the first information indicates that UAS authentication on the first terminal device is allowed;
send the UAS identifier of the first terminal device to a second network device;
receive a UAS authentication result of the first terminal device from the second network device; and
send the UAS authentication result of the first terminal device to the first terminal device.

11. The communications apparatus according to claim 10, wherein the first information comprises a first list of devices for which UAS authentication are not allowed and the first list does not include the first terminal device, or a second list of devices for which UAS authentication are allowed and the second list includes the first terminal device.

12. The communications apparatus according to claim 10, wherein the first request carries UAS type information of the first terminal device, and the UAS type information indicates a device type of the first terminal device in the UAS, and wherein the program instructions further cause the communications apparatus to:

send the UAS type information of the first terminal device to the second network device.

13. The communications apparatus according to claim 10, wherein the program instructions further cause the communications apparatus to update the UAS authentication status of the first terminal device based on the UAS authentication result.

14. A system, comprising: a first network device and a second network device, wherein
the first network device is configured to:
receive a first request from a first terminal device, wherein the first request carries first authentication indication information and an unmanned aerial system (UAS) identifier of the first terminal device, wherein the first authentication indication information is used to request to perform UAS authentication on the first terminal device;
determine, based on a UAS authentication status of the first terminal device and first information, to perform UAS authentication on the first terminal device, wherein the UAS authentication status of the first terminal device indicates that UAS authentication on the first terminal device is to be performed, and wherein the first information indicates that UAS authentication on the first terminal device is allowed;
send the UAS identifier of the first terminal device to the second network device;
receive a UAS authentication result of the first terminal device from the second network device; and
send the UAS authentication result of the first terminal device to the first terminal device; and wherein the second network device is configured to:
perform UAS authentication on the first terminal device based on the UAS identifier; and
send the UAS authentication result of the first terminal device to the first network device.

15. The system according to claim 14, wherein the first request carries UAS type information of the first terminal device, and the UAS type information indicates the device type of the first terminal device in the UAS; and
wherein the determining to perform UAS authentication on the first terminal device further comprises:
determining, based on the received UAS type information, to perform UAS authentication on the first terminal device.

16. The system according to claim 14, wherein the first information comprises a first list of devices for which UAS authentication are not allowed and the first list does not include the first terminal device, or a second list of devices for which UAS authentication are allowed and the second list includes the first terminal device.

17. The system according to claim 14, wherein the first network device is further configured to: update the UAS authentication status of the first terminal device based on the UAS authentication result.

* * * * *